United States Patent
Katayose et al.

(10) Patent No.: US 9,213,171 B2
(45) Date of Patent: Dec. 15, 2015

(54) ZOOM LENS HAVING OPTICAL PATH BENDING MEMBER AND IMAGE PICKUP APPARATUS EQUIPPED WITH SAME

(71) Applicant: OLYMPUS CORPORATION, Tokyo (JP)

(72) Inventors: Masato Katayose, Tokyo (JP); Kenji Ono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/323,686

(22) Filed: Jul. 3, 2014

(65) Prior Publication Data

US 2014/0320703 A1 Oct. 30, 2014

Related U.S. Application Data

(62) Division of application No. 14/052,216, filed on Oct. 11, 2013, now Pat. No. 8,810,917, which is a division of application No. 13/298,880, filed on Nov. 17, 2011, now Pat. No. 8,587,876.

(30) Foreign Application Priority Data

Nov. 17, 2010 (JP) ................................. 2010-256490
Nov. 17, 2010 (JP) ................................. 2010-256491
Dec. 16, 2010 (JP) ................................. 2010-280560

(51) Int. Cl.
| | | |
|---|---|---|
| G02B 15/14 | (2006.01) | |
| H04N 5/232 | (2006.01) | |
| G02B 15/15 | (2006.01) | |
| G02B 15/177 | (2006.01) | |
| H04N 5/262 | (2006.01) | |

(52) U.S. Cl.
CPC .............. *G02B 15/15* (2013.01); *G02B 15/177* (2013.01); *H04N 5/23296* (2013.01); *H04N 5/262* (2013.01)

(58) Field of Classification Search
CPC .. G02B 15/14; G02B 15/177; H04N 5/23296; H04N 5/262
See application file for complete search history.

(56) References Cited

U.S. PATENT DOCUMENTS

| | | |
|---|---|---|
| 7,079,325 B2 | 7/2006 | Konno |
| 7,365,910 B2 | 4/2008 | Ishii et al. |
| 7,436,599 B2 | 10/2008 | Mihara et al. |
| 7,471,453 B2 | 12/2008 | Bito et al. |
| 7,623,297 B2 | 11/2009 | Shinohara |

(Continued)

FOREIGN PATENT DOCUMENTS

| | | |
|---|---|---|
| JP | 2003-043354 | 2/2003 |
| JP | 2003-302575 | 10/2003 |

(Continued)

*Primary Examiner* — David N Spector
(74) *Attorney, Agent, or Firm* — Kenyon & Kenyon LLP

(57) ABSTRACT

A zoom lens includes, in order from the object side to the image side, a first lens unit having a negative refractive power, a second lens unit having a positive refractive power, and a third lens unit including a lens. The distance between the first lens unit and the second lens unit is smaller at the telephoto end than at the wide angle end, and the distance between the second lens unit and the third lens unit changes during zooming from the wide angle end to the telephoto end. The first lens unit consists, in order from the object side, of a front sub lens unit having a negative refractive power, an optical path bending member, and a rear sub lens unit having a positive refractive power. The front sub lens unit includes a biconcave single lens, and the rear sub lens unit includes one or two single lenses.

14 Claims, 24 Drawing Sheets

(56) References Cited

U.S. PATENT DOCUMENTS

| | | |
|---|---|---|
| 7,684,117 B2 | 3/2010 | Bito et al. |
| 7,692,863 B2 | 4/2010 | Bito et al. |
| 7,859,764 B2 | 12/2010 | Fukuta et al. |
| 7,872,806 B2 | 1/2011 | Mihara et al. |
| 2011/0075270 A1 | 3/2011 | Mihara et al. |
| 2012/0327276 A1 | 12/2012 | Ono et al. |

FOREIGN PATENT DOCUMENTS

| | | |
|---|---|---|
| JP | 2004-309684 | 11/2004 |
| JP | 2004-340995 | 12/2004 |
| JP | 2007-164157 | 6/2007 |
| JP | 2007-197594 | 8/2007 |
| JP | 2007-248796 | 9/2007 |
| JP | 2008-276260 | 11/2008 |
| JP | 2010-160278 | 7/2010 |
| JP | 2011-059496 | 3/2011 |

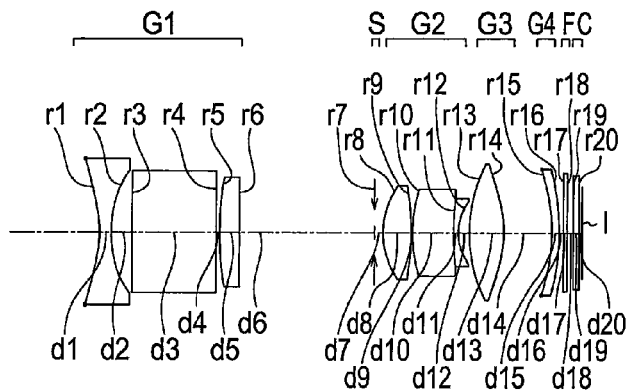
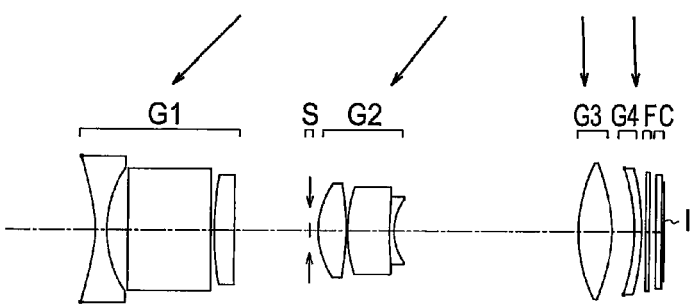
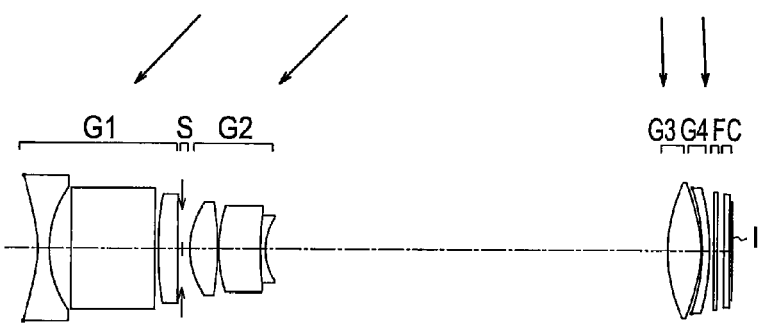

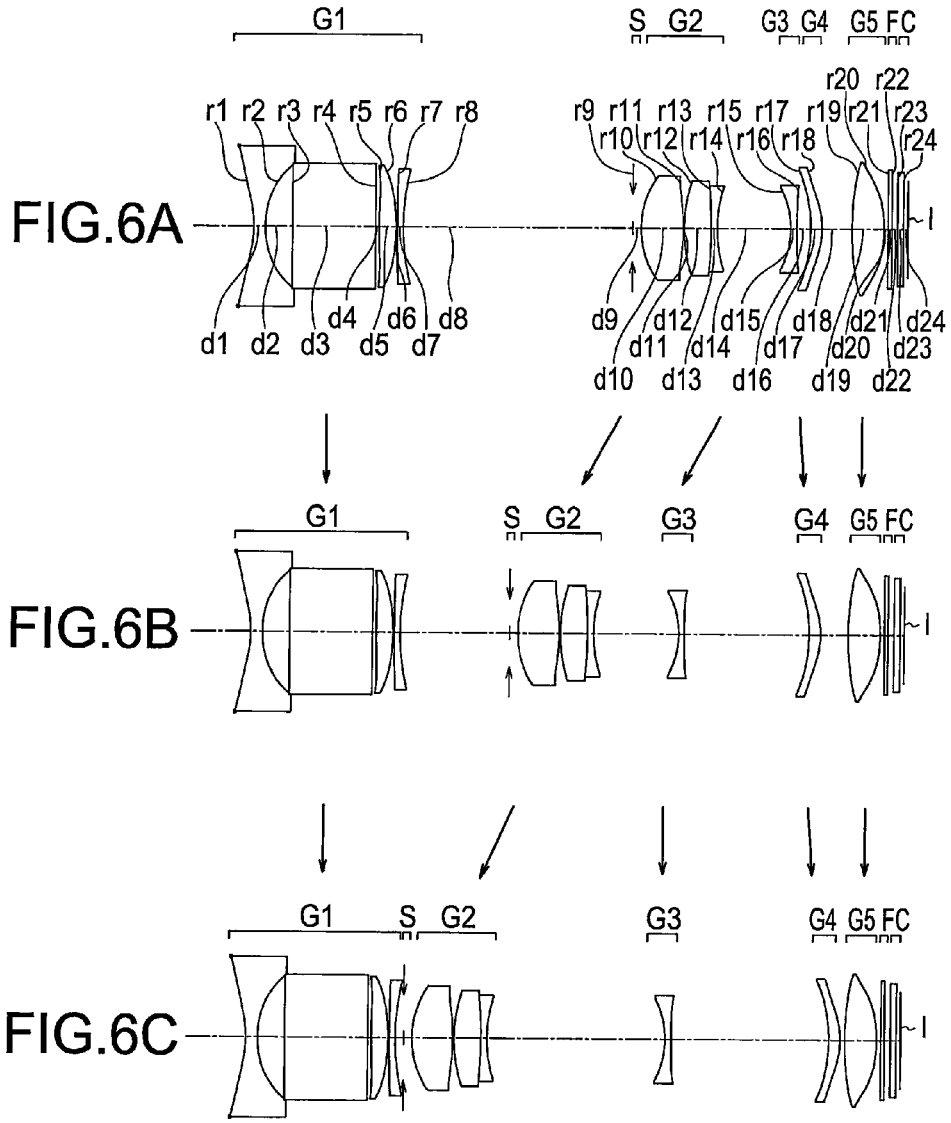

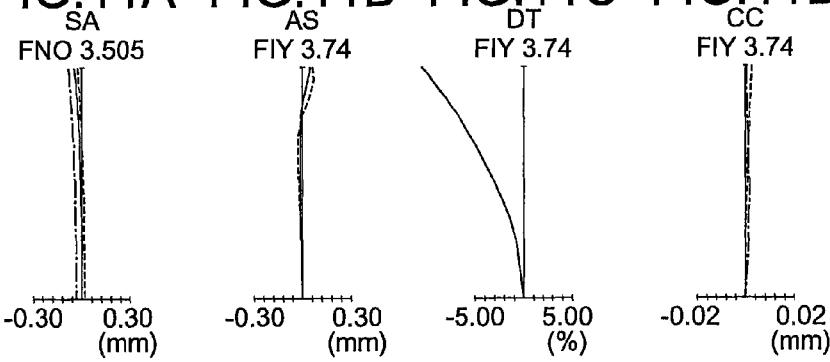
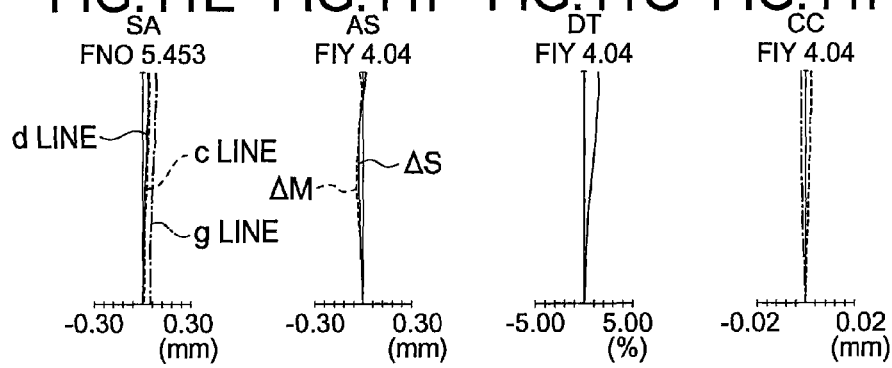
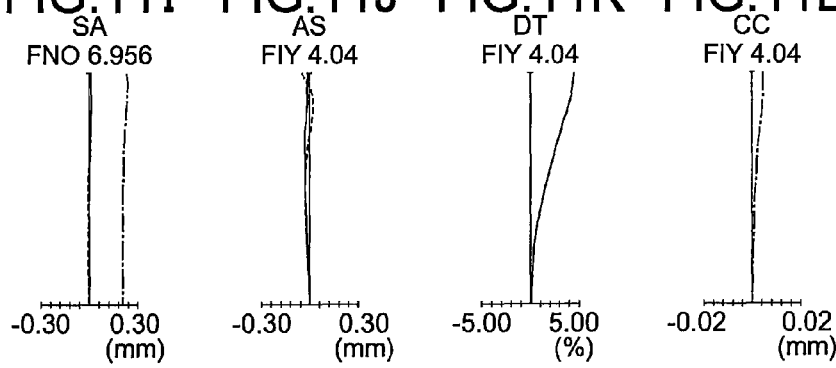

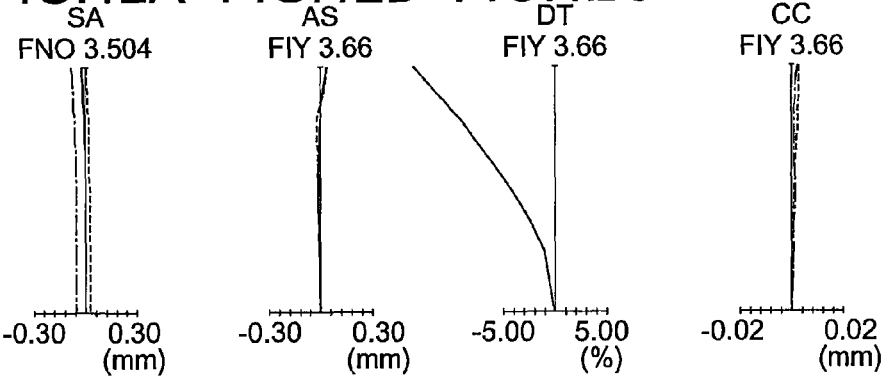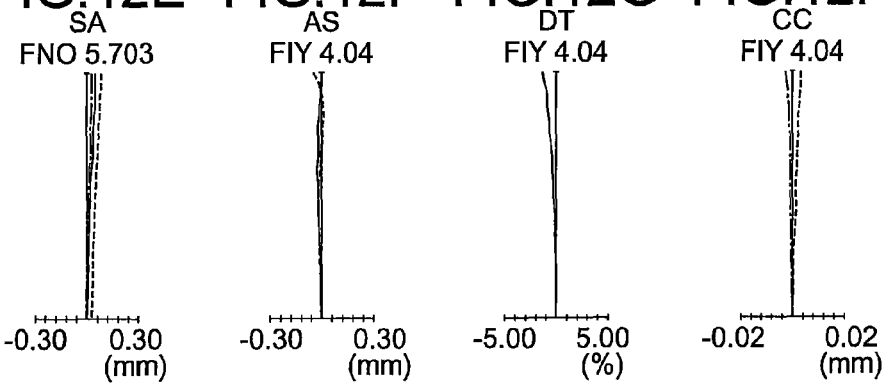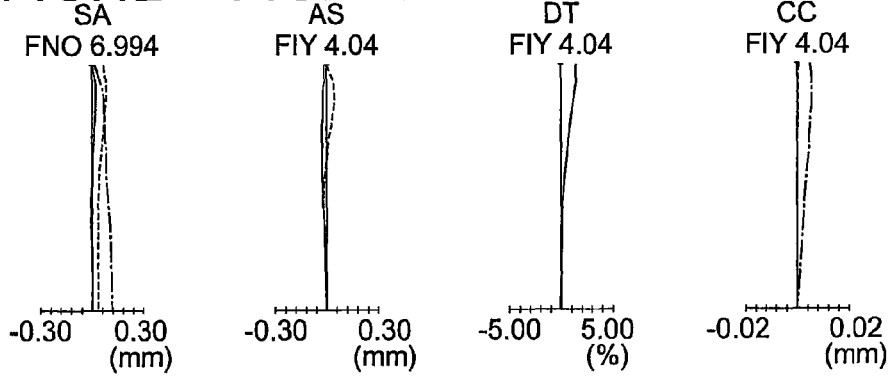

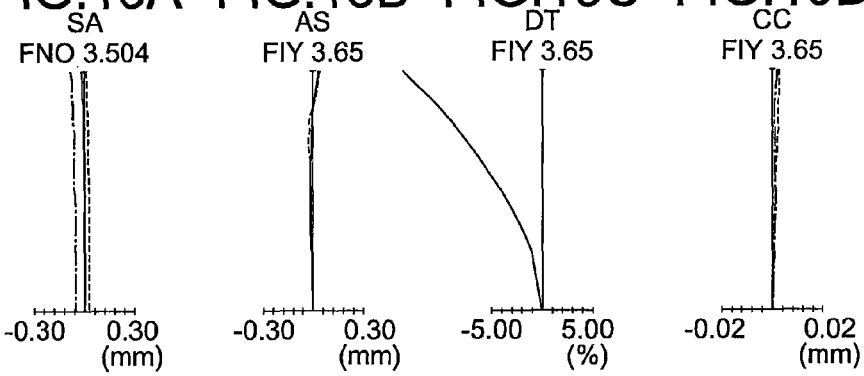
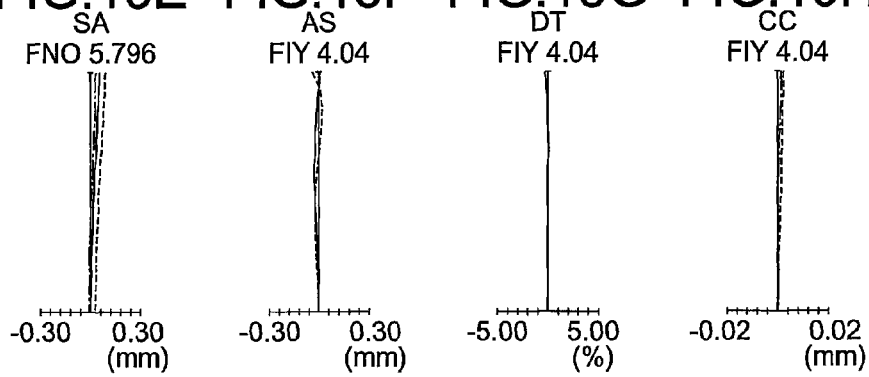
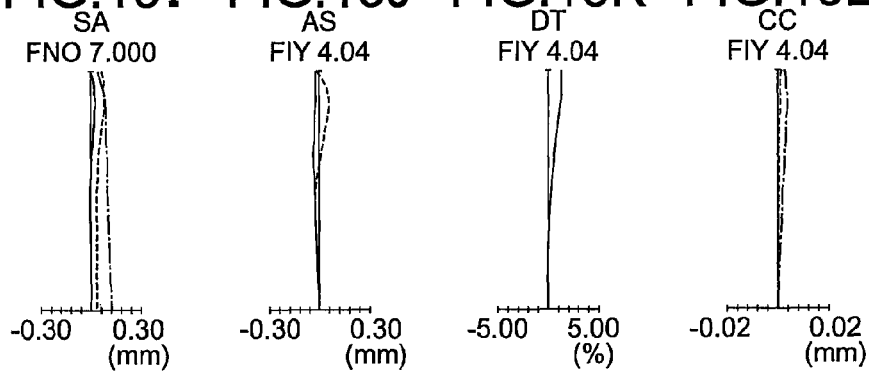

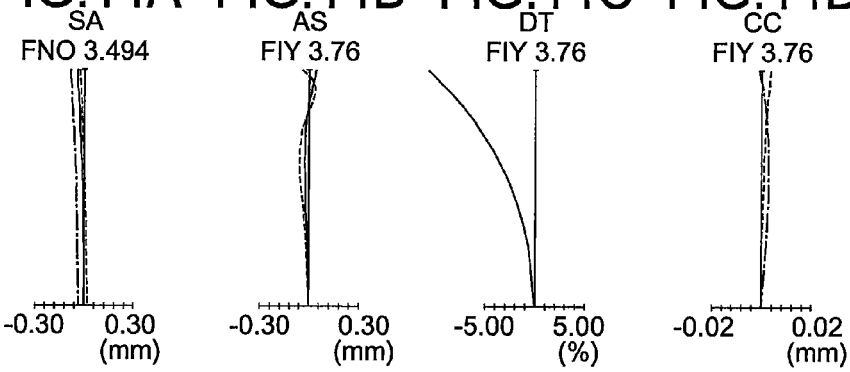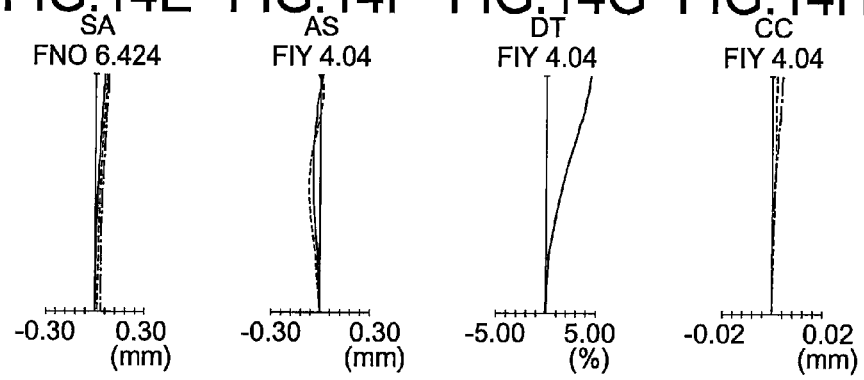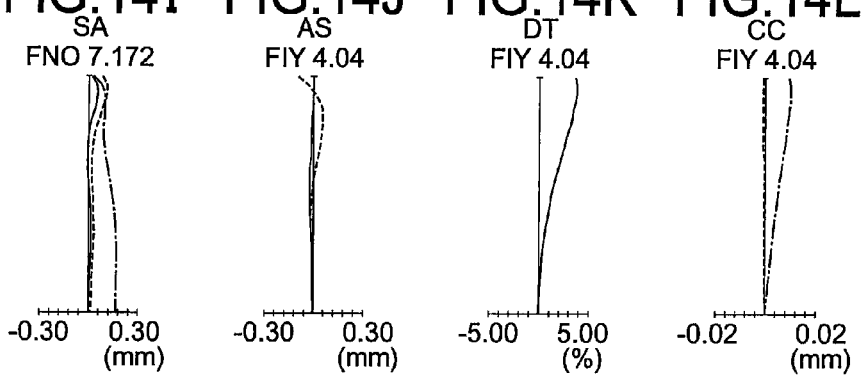

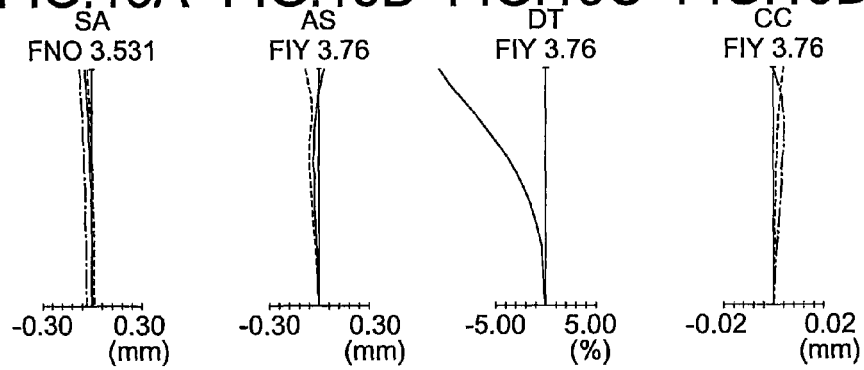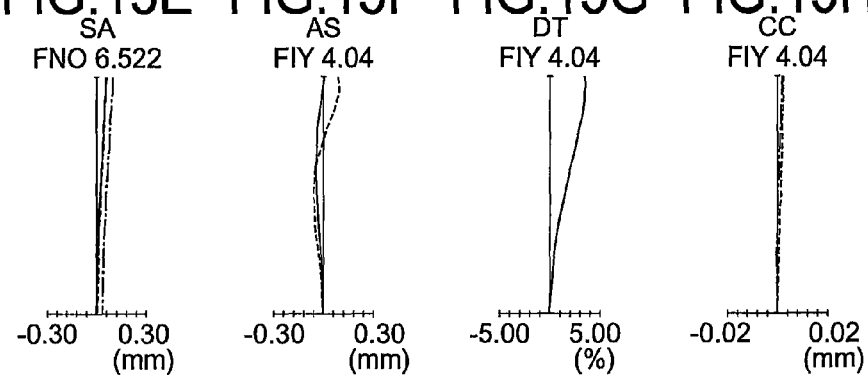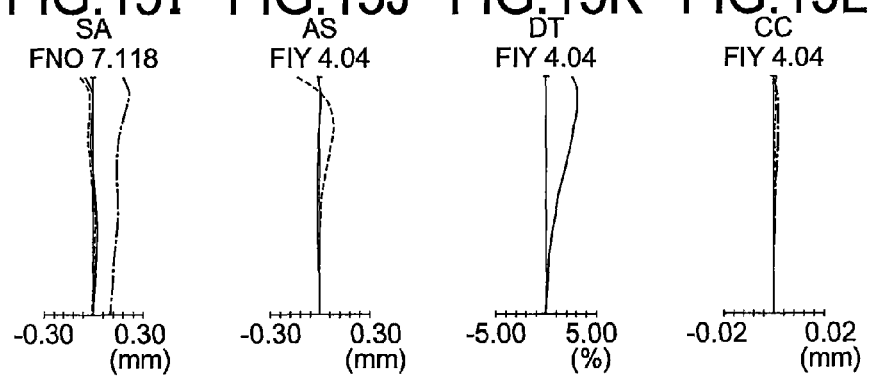

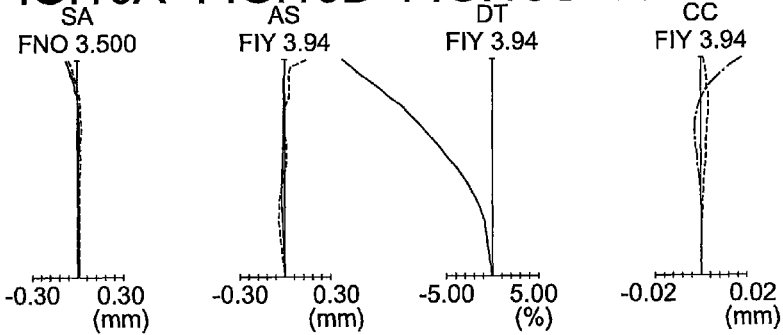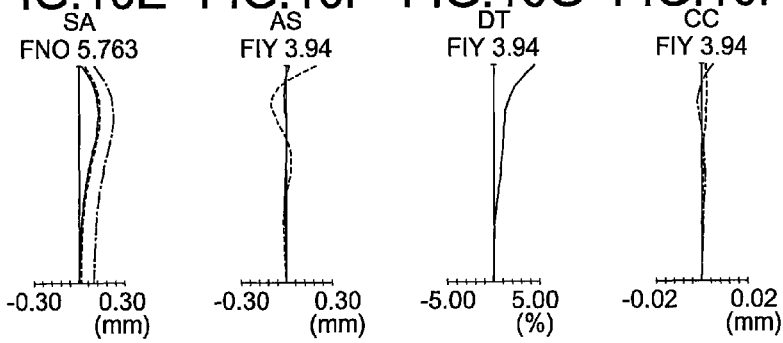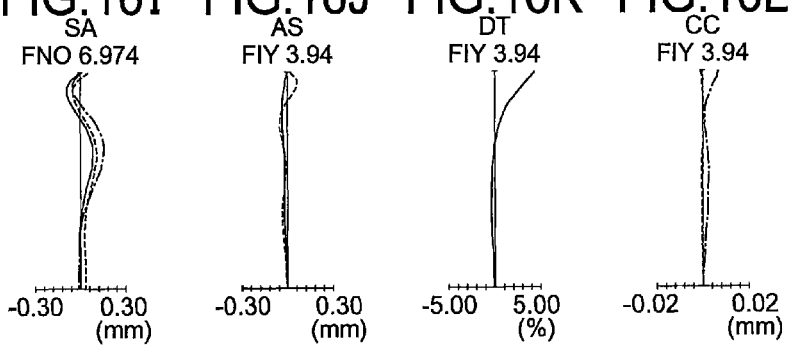

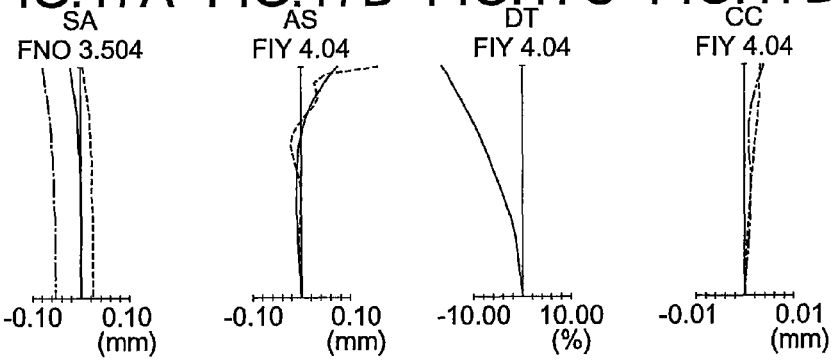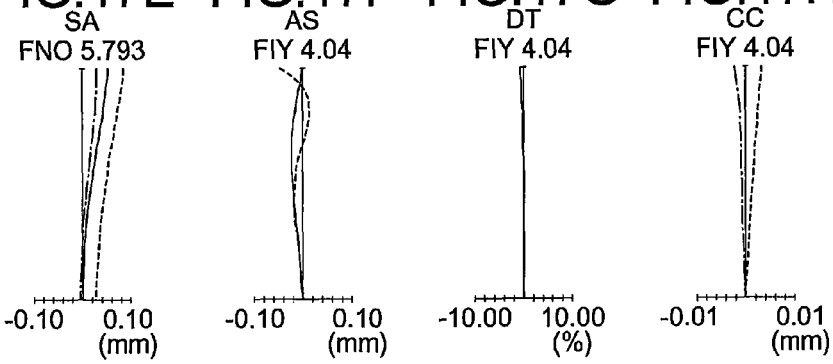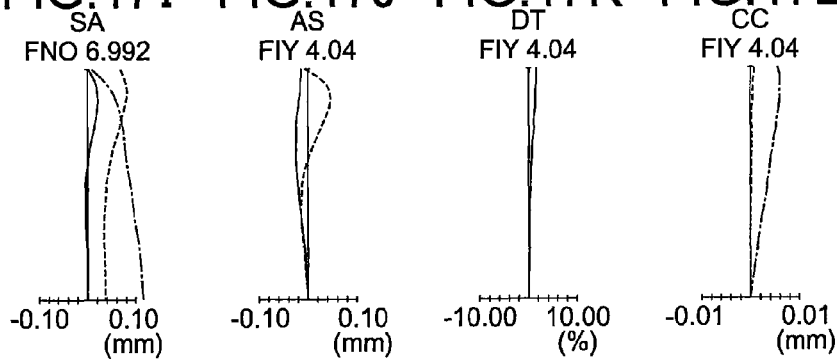

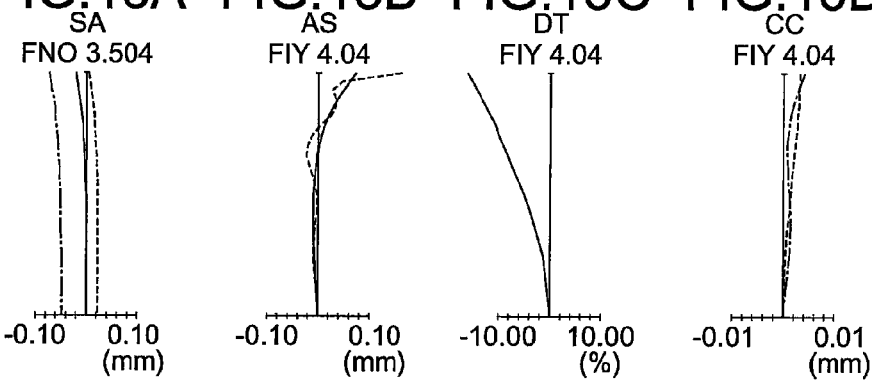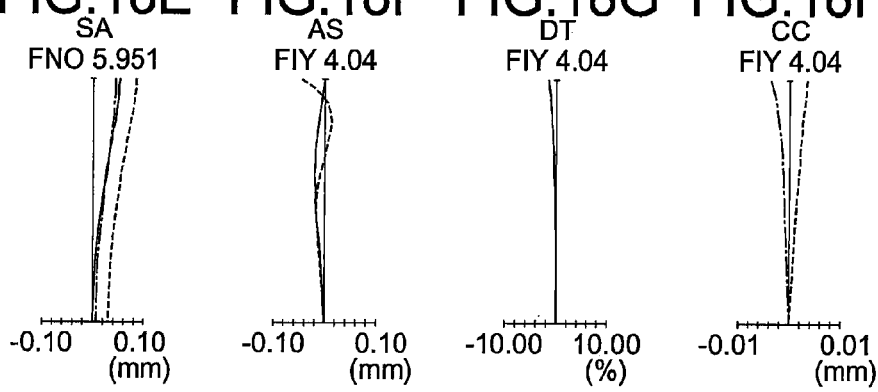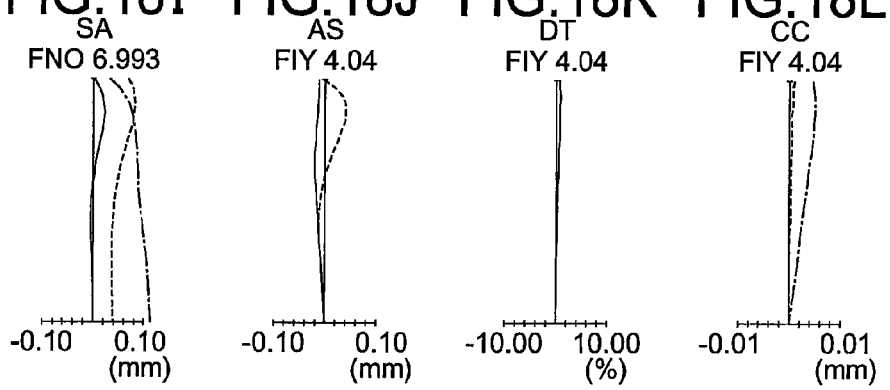

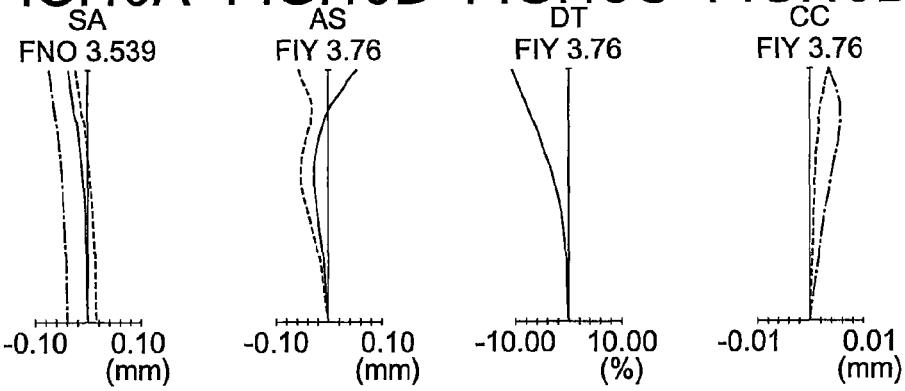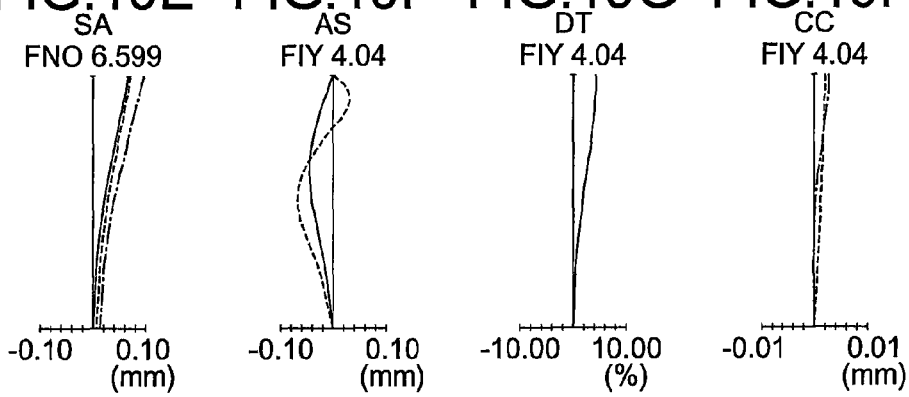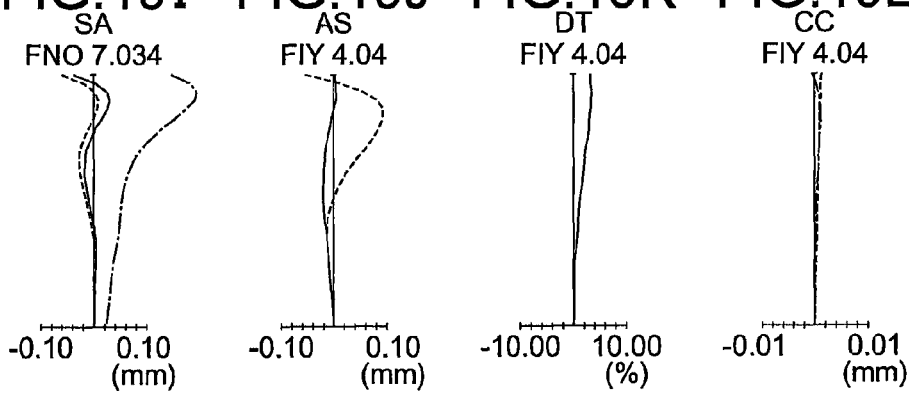

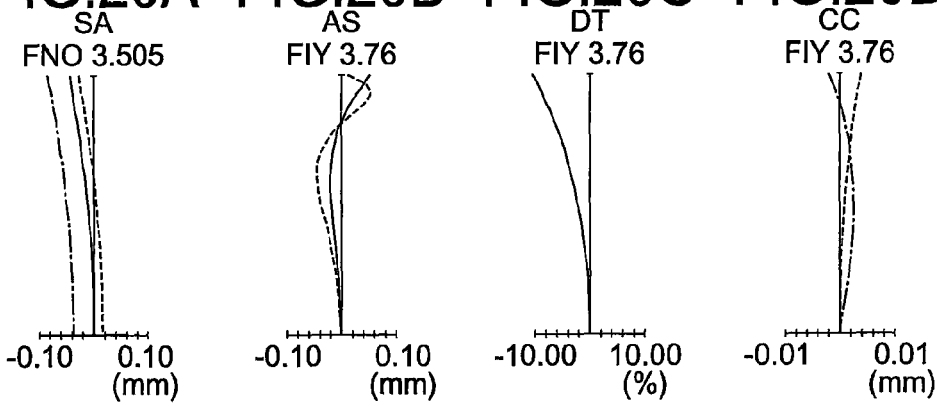
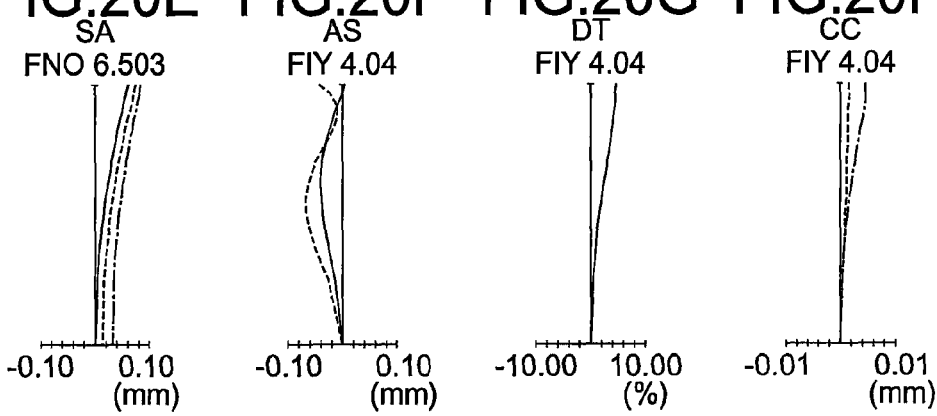
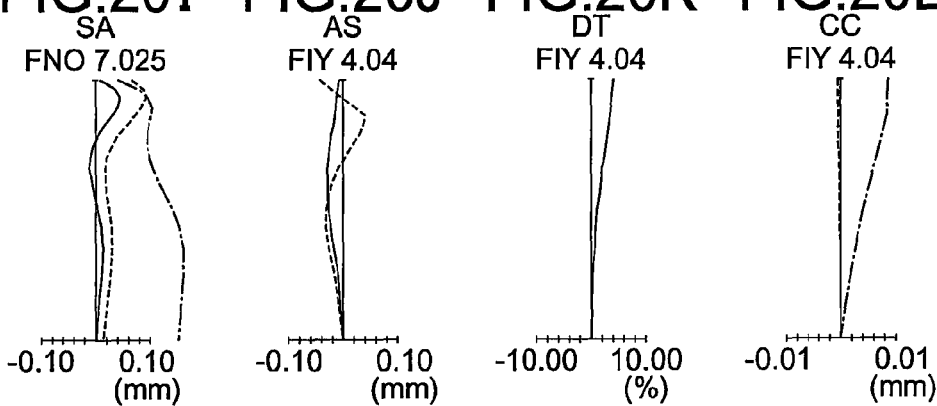

ZOOM LENS HAVING OPTICAL PATH BENDING MEMBER AND IMAGE PICKUP APPARATUS EQUIPPED WITH SAME

CROSS-REFERENCE TO RELATED APPLICATION

The present application is a divisional application of U.S. patent application Ser. No. 14/052,216, filed on Oct. 11, 2013, which is a divisional application of U.S. patent application Ser. No. 13/298,880, filed on Nov. 17, 2011, which is based upon and claims the benefit of priority from the prior Japanese Patent Application No. 2010-256490filed on Nov. 17, 2010, Japanese Patent Application No. 2010-256491 filed on Nov. 17, 2010 and Japanese Patent Application No. 2010-280560 filed on Dec. 16, 2010; the entire contents of which are incorporated herein by reference.

BACKGROUND OF THE INVENTION

1. Field of the Invention

The present invention relates to a zoom lens having an optical path bending member provided in the optical path and an image pickup apparatus equipped with such a zoom lens.

2. Description of the Related Art

There have been known zoom lenses having a reflecting member provided in the optical path that bends the optical path thereby slimming the optical system. Specifically, in a known type of zoom lens, a lens unit having a negative refractive power is disposed closest to the object side among the lens units in the zoom lens (which will be hereinafter referred to as the "negative-lead type") and a reflecting member is provided in this lens unit having a negative refractive power. In another known type of zoom lens, a lens unit having a positive refractive power is disposed closest to the object side among the lens units in the zoom lens (which will be hereinafter referred to as the "positive-lead type").

The negative-lead type zoom lenses have advantages over the positive-lead type zoom lenses in that the number of lens units can be made smaller and that adverse effects caused by decentering of lens units such as deterioration in the imaging performance can be made smaller. While many conventional negative-lead type zoom lenses have a zoom ratio of approximately 3, zoom lenses having a high zoom ratio have also been developed recently as disclosed in Japanese Patent Application Laid-Open NO. 2010-160278.

SUMMARY OF THE INVENTION

A zoom lens according to a first aspect of the present invention comprises, in order from the object side to the image side:
a first lens unit having a negative refractive power;
a second lens unit having a positive refractive power; and
a third lens unit comprising a lens, wherein
the distance between the first lens unit and the second lens unit is smaller at the telephoto end than at the wide angle end,
the distance between the second lens unit and the third lens unit changes during zooming from the wide angle end to the telephoto end,
the first lens unit consists, in order from the object side, of a front sub lens unit having a negative refractive power, an optical path bending member, and a rear sub lens unit having a positive refractive power,
the front sub lens unit comprises a biconcave single lens,
the rear sub lens unit comprises a positive single lens,
the total number of lenses in the front sub lens unit is one, the total number of lenses in the rear sub lens unit is two or less,
the total number of positive lenses in the rear sub lens unit is one, and
the zoom lens satisfies the following conditional expressions (1) to (4):

$$-4 < f_{1G}/f_T < -0.01 \quad (1),$$
$$1.3 < |\beta_{2T}/\beta_{2W}| < 30 \quad (2),$$
$$0.1 < f_{1FN}/f_{1G} < 10 \quad (3),$$
$$-16 < f_{1RP}/f_{1G} < -1.2 \quad (4),$$

where $f_{1G}$ is the focal length of the first lens unit, $f_T$ is the focal length of the entire zoom lens system at the telephoto end, $\beta_{2T}$ is the lateral magnification of the second lens unit at the telephoto end, $\beta_{2W}$ is the lateral magnification of the second lens unit at the wide angle end, $f_{1FN}$ is the focal length of the biconcave single lens in the front sub lens unit, and $f_{1RP}$ is the focal length of the positive lens in the rear sub lens unit.

A zoom lens according to a second aspect of the present invention comprises, in order from the object side to the image side:
a first lens unit having a negative refractive power;
a second lens unit having a positive refractive power; and
a third lens unit comprising a lens, wherein
the distance between the first lens unit and the second lens unit is smaller at the telephoto end than at the wide angle end,
the distance between the second lens unit and the third lens unit changes during zooming from the wide angle end to the telephoto end,
the first lens unit consists, in order from the object side, of a front sub lens unit having a negative refractive power, an optical path bending member, and a rear sub lens unit having a positive refractive power,
the front sub lens unit comprises a biconcave single lens,
the rear sub lens unit comprises a positive single lens and a negative single lens,
the total number of lenses in the front sub lens unit is one, and
the total number of lenses in the rear sub lens unit is two.

A zoom lens according to a third aspect of the present invention comprises, in order from the object side to the image side:
a first lens unit having a negative refractive power;
a second lens unit having a positive refractive power; and
a third lens unit comprising a lens, wherein
the distance between the first lens unit and the second lens unit is smaller at the telephoto end than at the wide angle end,
the distance between the second lens unit and the third lens unit changes during zooming from the wide angle end to the telephoto end,
the first lens unit consists, in order from the object side, of a front sub lens unit having a negative refractive power, an optical path bending member, and a rear sub lens unit having a positive refractive power,
the front sub lens unit comprises a biconcave single lens,
the rear sub lens unit comprises a positive lens,
the total number of lenses in the front sub lens unit is one,
the total number of positive lenses in the rear sub lens unit is one,
the biconcave single lens in the front sub lens unit and the positive lens in the rear sub lens unit are made of a plastic material, and the zoom lens satisfies the following conditional expressions (8) and (9):

$$-0.3 < N_{1FN} - N_{1RP} < 0.19 \quad (8),$$

and $$10.5 < \nu_{1FN} - \nu_{1RP} < 50 \quad (9),$$

where $N_{1FN}$ is the refractive index of the biconcave single lens in the front sub lens unit for the d-line, $N_{1RP}$ is the refractive index of the positive lens in the rear sub lens unit for the d-line, $v_{1FN}$ is the Abbe constant of the biconcave single lens in the front sub lens unit, and $v_{1RP}$ is the Abbe constant of the positive lens in the rear sub lens unit.

A zoom lens according to a fourth aspect of the present invention comprises, in order from the object side to the image side:
 a first lens unit having a negative refractive power;
 a second lens unit having a positive refractive power; and
 a third lens unit comprising a lens, wherein
 the distance between the first lens unit and the second lens unit is smaller at the telephoto end than at the wide angle end,
 the distance between the second lens unit and the third lens unit changes during zooming from the wide angle end to the telephoto end,
 the first lens unit comprises, in order from the object side, a front sub lens unit having a negative refractive power, an optical path bending member, and a rear sub lens unit having a positive refractive power,
 the front sub lens unit comprises a negative lens,
 the rear sub lens unit comprises a positive lens, and
 the negative lens and the positive lens are plastic lenses.

A zoom lens according to a fifth aspect of the present invention comprises, in order from the object side to the image side:
 a first lens unit having a negative refractive power;
 a second lens unit having a positive refractive power;
 a third lens unit having a positive refractive power; and
 a fourth lens unit comprising a lens component, wherein
 the distance between the first lens unit and the second lens unit is smaller at the telephoto end than at the wide angle end,
 the distance between the second lens unit and the third lens unit is larger at the telephoto end than at the wide angle end,
 the distance between the third lens unit and the fourth lens unit is smaller at the telephoto end than at the wide angle end,
 the first lens unit comprises an optical path bending member,
 the third lens unit comprises a lens component having a positive refractive power,
 the total number of lens components in the third lens unit is one,
 the zoom lens is a four-unit zoom lens, and
 the zoom lens satisfies the following conditional expressions (19), (20), and (21):

$$1.3 < \beta_{2T}/\beta_{2W} < 3.8 \quad (19),$$

$$1.1 < \beta_{3T}/\beta_{3W} < 4.0 \quad (20),$$

and $$-0.23 < f_W/f_{4G} < 0.23 \quad (21),$$

where $\beta_{2T}$ is the lateral magnification of the second lens unit at the telephoto end, $\beta_{2W}$ is the lateral magnification of the second lens unit at the wide angle end, $\beta_{3T}$ is the lateral magnification of the third lens unit at the telephoto end, $\beta_{3W}$ is the lateral magnification of the third lens unit at the wide angle end, $f_{4G}$ is the focal length of the fourth lens unit, $f_W$ is the focal length of the entire four-unit zoom lens at the wide angle end, and the lens component refers to a lens member whose effective surfaces that are in contact with air include only two surfaces, one being an object side surface and the other being an image side surface.

An image pickup apparatus comprising:
 the above-described zoom lens according to anyone of the first to fifth aspects of the present invention;
 an image pickup element disposed on the image side of the zoom lens; and
 an image processing section that processes a signal output from the image pickup element.

BRIEF DESCRIPTION OF THE DRAWINGS

FIGS. 4A, 4B, and 4C are cross sectional views of a zoom lens according to a fourth example of the present invention, similar to FIGS. 1A, 1B, and 1C;

FIGS. 6A, 6B, and 6C are cross sectional views of a zoom lens according to a sixth example of the present invention, similar to FIGS. 1A, 1B, and 1C;

FIGS. 11A, 11B, 11C, 11D, 11E, 11F, 11G, 11H, 11I, 11J, 11K, and 11L show aberrations of the zoom lens according to the first example in the state in which the zoom lens is focused on an object point at infinity;

FIGS. 12A, 12B, 12C, 12D, 12E, 12F, 12G, 12H, 12I, 12J, 12K, and 12L show aberrations of the zoom lens according to the second example in the state in which the zoom lens is focused on an object point at infinity;

FIGS. 13A, 13B, 13C, 13D, 13E, 13F, 13G, 13H, 13I, 13J, 13K, and 13L show aberrations of the zoom lens according to the third example in the state in which the zoom lens is focused on an object point at infinity;

FIGS. 14A, 14B, 14C, 14D, 14E, 14F, 14G, 14H, 14I, 14J, 14K, and 14L show aberrations of the zoom lens according to the fourth example in the state in which the zoom lens is focused on an object point at infinity;

FIGS. 15A, 15B, 15C, 15D, 15E, 15F, 15G, 15H, 15I, 15J, 15K, and 15L show aberrations of the zoom lens according to the fifth example in the state in which the zoom lens is focused on an object point at infinity;

FIGS. 16A, 16B, 16C, 16D, 16E, 16F, 16G, 16H, 16I, 16J, 16K, and 16L show aberrations of the zoom lens according to the sixth example in the state in which the zoom lens is focused on an object point at infinity;

FIGS. 17A, 17B, 17C, 17D, 17E, 17F, 17G, 17H, 17I, 17J, 17K, and 17L show aberrations of the zoom lens according to the seventh example in the state in which the zoom lens is focused on an object point at infinity;

FIGS. 18A, 18B, 18C, 18D, 18E, 18F, 18G, 18H, 18I, 18J, 18K, and 18L show aberrations of the zoom lens according to the eighth example in the state in which the zoom lens is focused on an object point at infinity;

FIGS. 19A, 19B, 19C, 19D, 19E, 19F, 19G, 19H, 19I, 19J, 19K, and 19L show aberrations of the zoom lens according to the ninth example in the state in which the zoom lens is focused on an object point at infinity;

FIGS. 20A, 20B, 20C, 20D, 20E, 20F, 20G, 20H, 20I, 20J, 20K, and 20L show aberrations of the zoom lens according to the tenth example in the state in which the zoom lens is focused on an object point at infinity;

DETAILED DESCRIPTION OF THE INVENTION

Figure 1A:
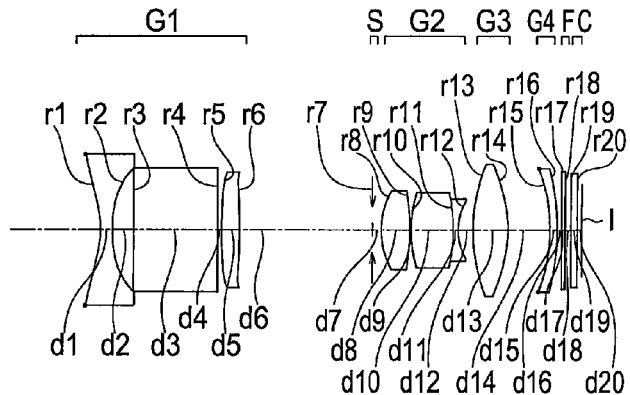
FIGS. 1A, 1B, and 1C are cross sectional views of a zoom lens according to a first example of the present invention in the state in which the zoom lens is focused on an object point at infinity respectively at the wide angle end (FIG. 1A), in an intermediate state (FIG. 1B), and at the telephoto end (FIG. 1C)

A zoom lens according to a first mode of the present invention includes at least, in order from the object side to the image side, a first lens unit having a negative refractive power, a second lens unit having a positive refractive power, and a third lens unit including a lens, wherein the distance between the first lens unit and the second lens unit is smaller at the telephoto end than at the wide angle end, the distance between the second lens unit and the third lens unit changes during zooming from the wide angle end to the telephoto end, the first lens unit consists, in order from the object side, of a front sub lens unit having a negative refractive power, an optical path bending member (i.e. a member that bends the optical path), and a rear sub lens unit having a positive refractive power, the front sub lens unit includes a biconcave single lens, the rear sub lens unit includes one or two single lenses, the total number of positive lenses in the rear sub lens unit is one, and the zoom lens satisfies the following conditional expressions (1) to (4):

$$-4 < f_{1G}/f_T < -0.01 \quad (1),$$

$$1.3 < |\beta_{2T}/\beta_{2W}| < 30 \quad (2),$$

$$0.1 < f_{1FN}/f_{1G} < 10 \quad (3),$$

$$-16 < f_{1RP}/f_{1G} < -1.2 \quad (4),$$

where $f_{1G}$ is the focal length of the first lens unit, $f_T$ is the focal length of the entire zoom lens system at the telephoto end, $\beta_{2T}$ is the lateral magnification of the second lens unit at the telephoto end, $\beta_{2W}$ is the lateral magnification of the second lens unit at the wide angle end, $f_{1FN}$ is the focal length of the biconcave single lens in the front sub lens unit, and $f_{1RP}$ is the focal length of the positive lens in the rear sub lens unit.

The zoom lens according to the first mode of the present invention is a negative-lead type zoom lens and has an optical path bending member in the optical system. The optical path bending member facilitates slimming and size reduction of the optical system. The first lens unit having a negative refractive power and the second lens unit having a positive refractive power have the function of changing the magnification. To achieve a high zoom ratio with this configuration, it is necessary for the first lens unit and the second lens unit to have appropriately high magnification changing function. To this end, it is preferred that the first lens unit has a somewhat high negative refractive power. In addition, from the economical point of view, it is preferred that the first lens can be produced at low cost.

In the zoom lens according to the first mode of the present invention, the first lens unit is composed of a front sub lens unit having a negative refractive power, an optical path bending member, and a rear sub lens unit having a positive refractive power, and the front sub lens unit includes a biconcave single lens. With this configuration, the first lens unit can have an appropriate negative refractive power, and axial aberrations generated near the telephoto end can easily be made small. In addition, since the number of lenses in the front sub lens unit is one, cost reduction can be achieved.

In the zoom lens according to the first mode of the present invention, the rear sub lens unit includes one or two signal lenses. In the case where the rear sub lens unit includes one single lens, the single lens is a positive lens, and in the case where the rear sub lens unit includes two single lenses, one of the single lenses is a positive lens. With the use of the positive lens, a reduction in aberrations in the first lens unit is achieved. In the latter case, if the positive lens is cemented to the other single lens, manufacturing cost for cementing will be incurred. Composing the rear sub lens unit only of single lenses leads to a cost reduction.

As described above, in the zoom lens according to the first mode of the present invention, all the lenses in the first lens unit are single lenses. This is cost effective.

In the zoom lens according to the first mode of the present invention, the positive lens in the rear sub lens unit is a single lens. If the refractive power of this positive lens is too high, decentering aberration will be liable to be generated by it when it is decentered. In view of this, the zoom lens according to the first mode of the present invention is designed to satisfy conditional expression (1).

Conditional expression (1) specifies a preferred range of the negative refractive power in the first lens unit. If the negative refractive power in the first lens unit is set appropriately, it is possible to design the positive lens in the first lens unit to have a moderate refractive power consequently. This will lead to a reduction in the adverse effects (generation of decentering aberrations) caused by decentering in the first lens unit and allow the first lens unit to provide the magnification change as needed.

If the lower limit of conditional expression (1) is reached, or not to be below the lower limit of conditional expression (1), the refractive power of the first lens unit can be prevented from becoming unduly low (or lower than needed). In consequence, an appropriately large angle of view can be achieved, and the second lens unit can provide appropriate magnification changing function.

If the upper limit of conditional expression (1) is not exceeded, the refractive power of the first lens unit can be prevented from becoming unduly high (higher than needed). In consequence, aberrations generated in the first lens unit can be made small.

Conditional expression (2) specifies a preferred range of the amount of change in the magnification (or magnification change ratio) of the second lens unit. It is preferred that the second lens unit satisfies conditional expression (2) while the first lens unit satisfies conditional expression (1).

If the lower limit of conditional expression (2) is reached, the amount of change in the magnification of the second lens unit can be prevented from becoming unduly small. Then, the second lens unit can provide the magnification change as much as needed, and therefore the other lens units need not provide a burden, for example unduly large magnification change. Consequently, aberrations generated by the other lens units can be made small.

If the upper limit of conditional expression (2) is not exceeded, the amount of change in the magnification of the second lens unit can be prevented from becoming unduly large. In consequence, the amount of movement of the second lens unit can be made small, and it is possible to make the optical system compact while achieving a desired zoom ratio.

Conditional expression (3) specifies a preferred range of the refractive power of the biconcave single lens in the front sub lens unit.

If the lower limit of conditional expression (3) is reached, the refractive power of the biconcave single lens can be prevented from becoming unduly high. In consequence, aberrations generated by the biconcave single lens can be made small.

If the upper limit of conditional expression (3) is not exceeded, the refractive power of the biconcave single lens can be prevented from becoming unduly low. Then, the first lens unit can have an appropriate negative refractive power, because the front sub lens unit has a major part of the negative refractive power of the first lens unit.

Conditional expression (4) specifies a preferred range of the refractive power of the positive lens in the rear sub lens unit.

If the lower limit of conditional expression (4) is reached, the refractive power of the positive lens can be prevented from becoming unduly low. Then, aberrations generated by the negative lens in the first lens unit can be corrected by the positive lens, and correction of aberrations in the first lens unit can be achieved satisfactorily.

If the upper limit of conditional expression (4) is not exceeded, the refractive power of the positive lens can be prevented from becoming unduly high. Then, the negative refractive power of the first lens unit as a whole can be prevented from becoming unduly low. Therefore, the first lens unit can have an appropriate negative refractive power.

In the zoom lens according to the first mode of the present invention having the above-described configuration, it is preferred that both surfaces of the biconcave single lens in the front sub lens unit be aspheric surfaces. The aspheric surfaces facilitate control of off-axis aberrations at the wide angle end of the zoom range and control of high order curvature of field at the wide angle end of the zoom range.

In the zoom lens according to the first mode of the present invention having the above-described configuration, it is preferred that the biconcave single lens in the front sub lens unit satisfies the following conditional expression (5):

$$-1 < (r_{1FNO} + r_{1FNI})/(r_{1FNO} - r_{1FNI}) < 0.7 \quad (5),$$

where $r_{1FNO}$ is the paraxial radius of curvature of the object side surface of the biconcave single lens in the front sub lens unit, and $r_{1FNI}$ is the paraxial radius of curvature of the image side surface of the biconcave single lens in the front sub lens unit.

Conditional expression (5) specifies a preferred range relating to the shape of the biconcave single lens. If conditional expression (5) is satisfied, the optical system can have good optical performance while being compact in size.

If the lower limit of conditional expression (5) is reached, this can easily be designed to have an appropriate negative refractive power while having a biconcave shape. In addition, the angle of incidence of off-axis principal rays on the object side surface of the biconcave single lens can be made small. Therefore, off-axis aberrations can be controlled.

If the upper limit of conditional expression (5) is not exceeded, the position of the entrance pupil can be made closer to the object side. Therefore, the optical system can be made compact in size.

In the zoom lens according to the first mode of the present invention, it is preferred that the biconcave single lens in the front sub lens unit satisfies the following conditional expression (6):

$$0.03 < D_{1FNon}/D_{1FNoff} < 0.31 \quad (6)$$

where $D_{1FNon}$ is the thickness of the biconcave single lens in the front sub lens unit on the optical axis, and $D_{1Fnoff}$ is the thickness of the biconcave single lens in the front sub lens unit along the direction of the optical axis at the position of the largest effective diameter.

Conditional expression (6) specifies a preferred range of the thickness of the biconcave single lens. If conditional expression (6) is satisfied, this lens can have a necessary radius of curvature while having appropriate strength.

If the lower limit of conditional expression (6) is reached, the thickness of the biconcave single lens on the optical axis can be prevented from becoming unduly small. Then, this lens can have appropriate strength and therefore can be manufactured without difficulties.

If the upper limit of conditional expression (6) is not exceeded, the biconcave single lens can have a large difference in thickness between its portion on the optical axis and its periphery. Then, the radius of curvature of this lens can be made smaller, and this lens can have an appropriately high refractive power even if it is made of a material having a low refractive index. In consequence, it is possible to bend rays greatly even if, for example, a material having a low refractive index is used in this lens. This is advantageous for achieving a wide angle of view.

In the zoom lens according to the first mode of the present invention having the above-described configuration, it is preferred that the positive lens in the rear sub lens unit satisfies the following conditional expression (7):

$$0.02 < D_{1RP}/D_{1G} < 0.3 \quad (7),$$

where $D_{1RP}$ is the thickness of the positive lens in the rear sub lens unit on the optical axis measured along the optical axis, and $D_{1G}$ is the thickness of the first lens unit on the optical axis measured along the optical axis.

Conditional expression (7) specifies a preferred range relating to the thickness of the positive lens in the rear sub lens unit on the optical axis measured along the optical axis. If conditional expression (7) is satisfied, the chromatic aberration of magnification at the wide angle end and at the telephoto end can be corrected satisfactorily.

If the lower limit of conditional expression (7) is reached, the thickness of the positive lens on the optical axis can be prevented from becoming unduly small. Then, this positive lens can have appropriate strength and therefore can be manufactured without difficulties. In addition, since this positive lens can have an appropriately large thickness, the lens surfaces of this lens can be have a shape with a small radius of curvature. Therefore, this positive lens can have a high refractive power.

If the upper limit of conditional expression (7) is not exceeded, the thickness of the positive lens on the optical axis can be prevented from becoming unduly large. In consequence, chromatic aberration of magnification at the wide angle end and the telephoto end can be corrected efficiently.

In the zoom lens according to the first mode of the present invention having the above-described configuration, it is preferred that the biconcave single lens in the front sub lens unit and the positive lens in the rear sub lens unit be both made of a plastic material.

Using plastic lenses as the biconcave single lens in the front sub lens unit and the positive lens in the rear sub lens unit can lead to a cost reduction. While the use of plastic lenses is advantageous for cost reduction, plastic lenses are disadvantageous in that their focal length will change greatly with a change in the temperature. However, if the aforementioned two lenses are plastic lenses, changes in their focal length caused by a change in the temperature can cancel out each other, because the lens in the front sub lens unit is a negative lens and the lens in the rear sub lens unit is a positive lens. Therefore, cost reduction and good optical performance can both be achieved.

In the zoom lens according to the first mode of the present invention, in the case where the biconcave single lens in the front sub lens unit and the positive lens in the rear sub lens unit are made of a plastic material, it is preferred that these lenses be bi-aspheric lenses (i.e. lenses that are aspheric on both surfaces).

If the biconcave single lens in the front sub lens unit and the positive lens in the rear sub lens unit are bi-aspheric lenses, both the object side surface and the image side surface of them can have the function of correcting aberrations by the aspheric surfaces. Thus, in the front sub lens unit, the use of a bi-aspheric lens as the biconcave single lens is advantageous for making the refractive power of this lens appropriately high while keeping good optical performance. In particular the use of a bi-aspheric lens facilitates control of off-axis aberrations at the wide angle end and is advantageous for control of high order curvature of field at the wide angle end. Moreover, as the biconcave single lens is a plastic lens, aspheric surfaces can be produced more easily than in the case of glass aspheric lenses. In addition, as these two lenses are made of a plastic material, cost reduction can be expected.

In the zoom lens according to the first mode of the present invention, the biconcave single lens in the front sub lens unit and the positive lens in the rear sub lens unit may be made of a glass material instead of a plastic material.

In the case of glass lenses, changes in the focal length with changes in the temperature hardly occur. Therefore, if the biconcave single lens in the front sub lens unit and the positive lens in the rear sub lens unit are made of a glass material, their focal length can be prevented from changing greatly even when the temperature changes. If glass materials are used, materials having a high refractive index are available. Therefore, monochromatic aberration and chromatic aberration can be reduced.

In the zoom lens according to the first mode of the present invention having the above-described configuration, it is preferred that the biconcave single lens in the front sub lens unit and the positive lens in the rear sub lens unit satisfy the following conditional expressions (8) and (9):

$$-0.3 < N_{1FN} - N_{1RP} < 0.19 \quad (8),$$

and $$10.5 < v_{1FN} - v_{1RP} < 50 \quad (9),$$

where $N_{1FN}$ is the refractive index of the biconcave single lens in the front sub lens unit for the d-line, $N_{1RP}$ is the refractive index of the positive lens in the rear sub lens unit for the d-line, $v_{1FN}$ is the Abbe constant of the biconcave single lens in the front sub lens unit, and $v_{1RP}$ is the Abbe constant of the positive lens in the rear sub lens unit.

Conditional expression (8) specifies a preferred range concerning the difference between the refractive index of the biconcave single lens and the refractive index of the positive lens. Conditional expression (9) specifies a preferred range concerning the difference between the Abbe constant of the biconcave single lens and the Abbe constant of the positive lens. Satisfying conditional expressions (8) and (9) is advantageous for aberration correction, cost reduction, and size reduction.

If conditional expression (9) is satisfied while the lower limit of conditional expression (8) is reached, the cost of the material of the lenses can be made low.

If the upper limit of conditional expression (8) is not exceeded, the position of the entrance pupil can be made closer to the object side. This is advantageous for reduction in the size of the optical system.

If the lower limit of conditional expression (9) is reached, the generation of chromatic aberration in the first lens unit can be controlled efficiently.

Not exceeding the upper limit of conditional expression (9) is advantageous for reduction in the cost of the lens material.

In the zoom lens according to the first mode of the present invention, it is also preferred that the rear sub lens unit consists only of the positive lens. Then, the number of lenses is small, thus facilitating further cost reduction.

In the zoom lens according to the first mode of the present invention, it is also preferred that the rear sub lens unit includes the positive lens and a negative lens that is disposed on the image side of the positive lens. With this configuration, monochromatic aberration and chromatic aberration can be corrected more satisfactorily.

In addition, in the zoom lens according to the first mode of the present invention, it is preferred that the air layer between the positive lens and the negative lens in the rear sub lens unit have a positive refractive power and the positive lens and the negative lens in the rear sub lens unit satisfy the following conditional expression (10):

$$-1 < (r_{1RPI} + r_{1RNO})/(r_{1RPI} - r_{1RNO}) < 1 \quad (10),$$

where $r_{1RPI}$ is the paraxial radius of curvature of the image side surface of the positive lens in the rear sub lens unit, and $r_{1RNO}$ is the paraxial radius of curvature of the object side surface of the negative lens in the rear sub lens unit.

Conditional expression (10) specifies a preferred range of a factor relating to the shape of the air layer formed between the positive lens and the negative lens in the rear sub lens unit.

If the lower limit of conditional expression (10) is reached, curvature of field at the wide angle end can easily be controlled.

If the upper limit of conditional expression (10) is not exceeded, chromatic aberration at the telephoto end can easily be controlled.

In the zoom lens according to the first mode of the present invention, it is preferred that the negative lens in the rear sub lens unit satisfies the following conditional expression (11):

$$0.1 < f_{1RN}/f_{1G} < 10 \quad (11),$$

where $f_{1RN}$ is the focal length of the negative lens in the rear sub lens unit, and $f_{1G}$ is the focal length of the first lens unit.

Conditional expression (11) specifies a preferred range relating to the refractive power of the negative lens in the rear sub lens unit. As described above, the first lens unit includes the biconcave single lens in the front sub lens unit and the positive lens and the negative lens in the rear sub lens unit. Therefore, the negative refractive power of the first lens unit can appropriately distributed to the two negative lenses. If conditional expression (11) is satisfied, the negative lens in the rear sub lens unit can have an appropriate negative refractive power. In other words, the negative refractive power in the first lens unit can be distributed to the biconcave single lens in the front sub lens unit and the negative lens in the rear sub lens unit in a well balanced manner. In consequence, while the first lens unit can have an appropriate negative refractive power, chromatic aberrations generated in the lenses can be controlled by these lenses.

If the lower limit of conditional expression (11) is reached, the refractive power of the negative lens in the rear sub lens unit can be prevented from becoming unduly high. Then, correction of aberrations by the negative lens in the rear sub lens unit is facilitated.

If the upper limit of conditional expression (11) is not exceeded, the refractive power of the negative lens in the rear sub lens unit can be prevented from becoming unduly low. Then, the biconcave single lens in the front sub lens unit need not have unnecessarily high refractive power. Therefore, generation of aberrations in the front sub lens unit can be controlled.

A zoom lens according to a second mode of the present invention includes at least, in order from the object side to the image side, a first lens unit having a negative refractive power, a second lens unit having a positive refractive power, and a third lens unit including a lens, wherein the distance between the first lens unit and the second lens unit is smaller at the telephoto end than at the wide angle end, the distance between the second lens unit and the third lens unit changes during zooming from the wide angle end to the telephoto end, the first lens unit consists, in order from the object side, of a front sub lens unit having a negative refractive power, an optical path bending member, and a rear sub lens unit having a positive refractive power, the front sub lens unit includes a biconcave single lens, and the rear sub lens unit includes two single lenses including a positive lens and a negative lens.

The basic lens configuration of the zoom lens according to the second mode of the present invention is similar to the zoom lens according to the first mode, and the zoom lens according to the second mode has the advantages basically same as those of the zoom lens according to the first mode. In addition, the rear sub lens unit in the zoom lens according to the second mode has two single lenses including a positive lens and a negative lens. Therefore, better reduction of chromatic aberration can be achieved.

A zoom lens according to a third mode of the present invention includes at least, in order from the object side to the image side, a first lens unit having a negative refractive power, a second lens unit having a positive refractive power, and a third lens unit including a lens, wherein the distance between the first lens unit and the second lens unit is smaller at the telephoto end than at the wide angle end, the distance between the second lens unit and the third lens unit changes during zooming from the wide angle end to the telephoto end, the first lens unit consists, in order from the object side, of a front sub lens unit having a negative refractive power, an optical path bending member, and a rear sub lens unit having a positive refractive power, the front sub lens unit includes a biconcave single lens, the rear sub lens unit includes a positive lens, the biconcave single lens in the front sub lens unit and the positive lens in the rear sub lens unit are made of a plastic material, and the zoom lens satisfies the following conditional expressions (8) and (9):

$$-0.3 < N_{1FN} - N_{1RP} < 0.19 \quad (8),$$

and $$10.5 < v_{1FN} - v_{1RP} < 50 \quad (9),$$

where $N_{1FN}$ is the refractive index of the biconcave single lens in the front sub lens unit for the d-line, $N_{1RP}$ is the refractive index of the positive lens in the rear sub lens unit for the d-line, $v_{1FN}$ is the Abbe constant of the biconcave single lens in the front sub lens unit, and $v_{1RP}$ is the Abbe constant of the positive lens in the rear sub lens unit.

The basic lens configuration of the zoom lens according to the third mode of the present invention is similar to the zoom lens according to the first mode, and the zoom lens according to the third mode has the advantages basically same as those of the zoom lens according to the first mode. In addition, the zoom lens according to the third mode satisfies conditional expressions (8) and (9). Therefore, it is possible to achieve both cost reduction and reduction of chromatic aberrations. Conditional expressions (8) and (9) have already been discussed above.

In the zoom lenses according to the first to third modes of the present invention, the focusing operation may be performed by, but not limited to, advancing the first lens unit toward the object side for example. Alternatively, the lens unit advanced for focusing may be a lens unit disposed closer to the image side than the second lens unit. In particular, it is preferred that the third or subsequent lens unit be advanced for focusing, because the third and subsequent lens units can be designed to be light in weight. Alternatively, the focusing operation may be performed by moving an image pickup element along the direction of the optical axis.

The first lens unit and the image pickup element may be stationary during zooming from the wide angle end to the telephoto end. Alternatively, the first lens unit may be fixed on the body of the image pickup apparatus while the image pickup element is adapted to move, or still alternatively, the image pickup element may be fixed on the body of the image pickup apparatus while the first lens unit is adapted to move. In other words, the overall length of the zoom lens may change during zooming from the wide angle end to the telephoto end.

It is preferred that two or more of the above described features be adopted in combination. The conditional expressions described in the description of the zoom lens according to the first mode of the present invention can also be applied to the zoom lenses according to the second and third modes of the present invention. Then, each conditional expression may be applied individually, or two or more of the conditional expressions may be applied in combination.

A zoom lens according to a fourth mode of the present invention includes at least, in order from the object side to the image side, a first lens unit having a negative refractive power, a second lens unit having a positive refractive power, and a third lens unit including a lens, wherein the distance between the first lens unit and the second lens unit is smaller at the telephoto end than at the wide angle end, the distance between the second lens unit and the third lens unit changes during zooming from the wide angle end to the telephoto end, the first lens unit includes, in order from the object side, a front sub lens unit having a negative refractive power, an optical path bending member, and a rear sub lens unit having a positive refractive power, the front sub lens unit includes a negative lens, the rear sub lens unit includes a positive lens, and the negative lens and the positive lens are plastic lenses.

The zoom lens according to the fourth mode of the present invention is a negative-lead type zoom lens and has an optical path bending member in the optical system. The optical path bending member facilitates slimming and size reduction of the optical system. The first lens unit having a negative refractive power and the second lens unit having a positive refractive power have the function of changing the magnification.

To achieve a high zoom ratio with this configuration, it is necessary for the first lens unit and the second lens unit to have appropriately high magnification changing function. To this end, it is preferred that the first lens unit has a somewhat high negative refractive power. In addition, from the economical point of view, it is preferred that the first lens can be produced at low cost.

In the zoom lens according to the fourth mode of the present invention, the first lens unit includes a front sub lens unit having a negative refractive power, an optical path bending member, and a rear sub lens unit having a positive refractive power, and the front sub lens unit includes a negative lens. With this configuration, the first lens unit can have an appropriate negative refractive power, and axial aberrations generated near the telephoto end can easily be made small.

In the zoom lens according to the fourth mode of the present invention, the rear sub lens unit includes a positive lens. With this positive lens, aberrations in the first lens unit are reduced.

Moreover, in the zoom lens according to the fourth mode of the present invention, the materials of the negative lens in the front sub lens unit and the positive lens in the rear sub lens unit are plastic. In consequence, the cost of the optical system can be reduced.

While the use of plastic lenses is advantageous for cost reduction, plastic lenses are disadvantageous in that their focal length will change greatly with a change in the temperature. However, if the aforementioned two lenses are plastic lenses, changes in their focal length caused by changes in the temperature can be cancelled by each other, because the lens in the front sub lens unit is a negative lens and the lens in the rear sub lens unit is a positive lens. Therefore, a cost reduction and good optical performance can both be achieved.

As described above, the use of plastic lenses in the first lens unit in the zoom lens according to the fourth mode of the present invention is advantageous for cost reduction.

In the zoom lens according to the fourth mode of the present invention having the above-described configuration, it is preferred that at least one of the negative lens in the front sub lens unit and the positive lens in the rear sub lens unit satisfy the following conditional expressions (12) and (13):

$$-0.3 < N'_{1FN} - N_{1RP} < 0.2 \quad (12),$$

and $$10.5 < v'_{1FN} - v_{1RP} < 50 \quad (13),$$

where $N'_{1FN}$ is the refractive index of the negative lens in the front sub lens unit for the d-line, $N_{1RP}$ is the refractive index of the positive lens in the rear sub lens unit for the d-line, $v'_{1FN}$ is the Abbe constant of the negative lens in the front sub lens unit, and $v_{1RP}$ is the Abbe constant of the positive lens in the rear sub lens unit.

Conditional expression (12) specifies a preferred range of the difference between the refractive index of the negative lens and the refractive index of the positive lens. Conditional expression (13) specifies a preferred range of the difference between the Abbe constant of the negative lens and the Abbe constant of the positive lens. Satisfying conditional expressions (12) and (13) is advantageous for aberration correction, cost reduction, and size reduction.

If conditional expression (13) is satisfied while the lower limit of conditional expression (12) is reached, the cost of the material of the lenses can be made low.

If the upper limit of conditional expression (12) is not exceeded, the position of the entrance pupil can be made closer to the object side. This is advantageous for reduction in the size of the optical system.

If the lower limit of conditional expression (13) is reached, the generation of chromatic aberration in the first lens unit can be controlled efficiently.

Not exceeding the upper limit of conditional expression (13) is advantageous for reduction in the cost of the lens material.

In the zoom lens according the present invention having the above-described configuration, it is also preferred that the front sub lens unit consist of one negative lens, the rear sub lens unit consist of two or less lenses, and the number of positive lenses in the rear sub lens unit be one.

With this configuration, the first lens unit includes only three lenses. This is advantageous for reduction in the cost of the optical system.

In the zoom lens according to the present invention having the above described configuration, it is preferred that the negative lens in the front sub lens unit and the positive lens in the rear sub lens unit satisfy the following conditional expressions (14) to (16):

$$150E-7/°C. < \alpha_{FN} < 1000E-7/°C. \quad (14),$$

$$150E-7/°C. < \alpha_{RP} < 1000E-7/°C. \quad (15),$$

and $$0/°C. \leq |\alpha_{FN} - \alpha_{RP}| \leq 200E-7/°C. \quad (16),$$

where $\alpha_{FN}$ is the average linear expansion coefficient of the negative lens in the front sub lens unit, $\alpha_{RP}$ is the average linear expansion coefficient of the positive lens in the rear sub lens unit, and "E-7" stands for "×10$^{-7}$".

Conditional expressions (14) and (15) specify preferred ranges of the average linear expansion coefficient of the negative lens in the front sub lens unit and the positive lens in the rear sub lens unit respectively.

If the lower limits of conditional expressions (14) and (15) are reached, low cost plastic materials can be used. This contributes to cost reduction while keeping the performance of the optical system.

If the upper limits of conditional expressions (14) and (15) are not exceeded, changes in the focal length and aberrations in the respective lenses with changes in the temperature can be prevented from becoming large.

Conditional expression (16) specifies a preferred range of the difference in the average linear expansion coefficient between the two plastic lenses. As described above, the lens in the front sub lens unit is a negative lens, while the lens in the rear sub lens unit is a positive lens. In consequence, if conditional expression (16) is satisfied, changes in the focal length in theses lenses with a change in the temperature can cancel out each other.

If the upper limit of conditional expression (16) is not exceeded, changes in the focal length in the two lenses (which are the positive lens an the negative lens) with a change in the temperature can cancel out each other. Therefore, deterioration in the performance of the optical system with changes in the temperature can be prevented. The lower limit of conditional expression (16) is necessarily reached.

The average linear expansion ratio mentioned here is defined as follows according to Japanese Industrial Standard:

$$\alpha_{SP} = \frac{\Delta L_{spm} - \Delta L_{Refm}}{L_0 \times (T_2 - T_1)} + \alpha_{Ref},$$

where $\alpha_{sp}$ is the average linear expansion coefficient (° C.$^{-1}$), $L_0$ is the length of a specimen at room temperature, $T_1$ is the lowest temperature (° C.) in the temperature range for which the average linear expansion coefficient is to be determined, $T_2$ is the highest temperature (° C.) in the temperature range for which the average linear expansion coefficient is to be determined, $\Delta L_{spm}$ is the measured difference (μm) between the length of the specimen at temperature $T_1$ and the length of the specimen at temperature $T_2$ (i.e. [length at $T_2$]−[length at $T_1$]), $\Delta L_{Refm}$ is the measured difference (μm) between the length of a standard specimen for length calibration at temperature $T_1$ and the length of the standard specimen at temperature $T_2$ (i.e. [length at $T_2$]−[length at $T_1$]), and $\alpha_{Ref}$ is the calculated value of the average linear expansion coefficient of the standard specimen for length calibration in the range of $T_2$ to $T_2$.

In the zoom lens according to the fourth mode of the present invention, it is preferred that the negative lens in the front sub lens unit be a biconcave single lens. The biconcave lens shape extends the possible range of the negative refractive power and allows to achieve an appropriate refractive power advantageously.

In addition, in the zoom lens according to the fourth mode of the present invention, it is preferred that the biconcave single lens in the front sub lens unit be a bi-aspheric lens.

If the biconcave single lens in the front sub lens unit is a bi-aspheric lens, both the object side surface and the image side surface of it can have the function of correcting aberrations by the aspheric surfaces. Thus, the use of a bi-aspheric lens as the biconcave single lens is advantageous for making the refractive power of this lens appropriately high while keeping good optical performance. In particular, the use of a bi-aspheric lens facilitates control of off-axis aberrations at the wide angle end and is advantageous for correction of high order curvature of field at the wide angle end. Moreover, as the biconcave single lens is made of a plastic material, aspheric surfaces can be produced more easily than in the case of glass aspheric lenses. In addition, as this lens is made of a plastic material, cost reduction can be expected.

In the zoom lens according to the fourth mode of the present invention, it is preferred that the object side surface of the biconcave single lens in the front sub lens unit have an aspheric surface shape having a negative curvature that decreases away from the optical axis and that the image side surface of the biconcave single lens have an aspheric surface shape having a positive curvature that increases away from the optical axis.

With this configuration, good correction of spherical aberration can be achieved at the telephoto end, and correction of off-axis aberrations such as coma can be achieved at the wide angle end. Thus, correction of such aberrations can advantageously be achieved. Moreover, it is possible to control the extension of the object side lens surface toward the object side and to decrease the effective diameter of the lens accordingly. In consequence, the optical system can be made compact.

In the zoom lens according to the fourth mode of the present invention, it is preferred that the aspheric surface shapes of the object side surface and the image side surface of the biconcave single lens satisfy the following conditional expressions (17) and (18):

$$-0.1 < \Delta ASP_{FNO}/f_{FN} < 0 \quad (17),$$

and $$-0.1 < \Delta ASP_{FNI}/f_{FN} < 0 \quad (18),$$

where $f_{FN}$ is the focal length of the biconcave single lens, $\Delta ASP_{FNO}$ is the aspheric deviation of the object side surface of the biconcave single lens at the height of the axial marginal ray at the telephoto end, and $\Delta ASP_{FNI}$ is the aspheric deviation of the image side surface of the biconcave single lens at the height of an axial marginal ray at the telephoto end, wherein the aspheric deviation is the distance along the direction of the optical axis between the aspheric surface and a reference spherical surface having a vertex located at the vertex of the aspheric surface and having a radius of curvature equal to the paraxial radius of curvature of the aspheric surface, and the aspheric deviation takes positive values when the aspheric surface is located on the image side of the reference spherical surface.

Conditional expressions (17) and (18) specify a preferred range of the aspheric deviation of the aspheric surfaces of the biconcave single lens.

If the upper limits of conditional expressions (17) and (18) are not exceeded, the aspheric deviations in the respective surfaces of the biconcave single lens can be prevented becoming unduly small. This allows the lens to have necessary aspheric surface shapes in the peripheral region of it. In consequence, good correction of spherical aberration can be achieved near the telephoto end, and correction of off-axis aberrations such as coma can be achieved m near the wide angle end.

If the lower limits of conditional expressions (17) and (18) are reached, the aspheric deviations in the respective surfaces of the biconcave single lens can be prevented becoming unduly large. Then, the accuracy in shaping the spherical surfaces can easily be kept high, and control of decentering aberrations that might be caused when decentering of the lens occurs is facilitated.

It is also preferred that the zoom lens according to the fourth mode of the present invention satisfy conditional expression (5) described above.

It is also preferred that the zoom lens according to the fourth mode of the present invention having the above-described configuration satisfy conditional expression (6) described above.

It is also preferred that the zoom lens according to the fourth mode of the present invention having the above-described configuration satisfy conditional expressions (3) and (4) described above.

It is also preferred that the zoom lens according to the fourth mode of the present invention having the above-described configuration satisfy conditional expression (7) described above.

In the zoom lens according to the fourth mode of the present invention, it is preferred that the positive lens in the rear sub lens unit be a bi-aspheric lens.

Since the positive lens in the rear sub lens unit is a plastic lens, it is possible to make its both surfaces aspheric at low cost. Therefore, improvement of the performance of the optical system and cost reduction can be achieved at the same time.

In the zoom lens according to the fourth mode of the present invention, it is preferred that the rear sub lens unit consists of only one positive lens. Then, the number of lenses is small, thus facilitating further cost reduction.

In the zoom lens according to the fourth mode of the present invention, it is also preferred that the rear sub lens unit includes one positive lens and one negative lens that is disposed on the image side of the positive lens. With this configuration, monochromatic aberration and chromatic aberration can be corrected more satisfactorily.

In addition, in the zoom lens according to the fourth mode of the present invention, it is preferred that the air layer between the positive lens and the negative lens in the rear sub lens unit have a positive refractive power and the positive lens and the negative lens in the rear sub lens unit satisfy conditional expression (10) described above.

In the zoom lens according to the fourth mode of the present invention, it is also preferred that the negative lens in the rear sub lens unit satisfy conditional expression (11) described above.

It is more preferred that two or more of the above-described features be adopted in combination.

A four-unit zoom lens according to a fifth mode of the present invention includes, in order from the object side to the image side, a first lens unit having a negative refractive power, a second lens unit having a positive refractive power, a third lens unit having a positive refractive power, and a fourth lens unit comprising a lens component, wherein the distance between the first lens unit and the second lens unit is smaller at the telephoto end than at the wide angle end, the distance between the second lens unit and the third lens unit is larger at the telephoto end than at the wide angle end, the distance between the third lens unit and the fourth lens unit is smaller at the telephoto end than at the wide angle end, the first lens unit includes an optical path bending member, the third lens unit consists of one lens component having a positive refractive power, and the zoom lens satisfies the following conditional expressions (19), (20), and (21):

$$1.3 < \beta_{2T}/\beta_{2W} < 3.8 \quad (19),$$

$$1.1 < \beta_{3T}/\beta_{3W} < 4.0 \quad (20),$$

and $$-0.23 < f_W/f_{4G} < 0.23 \quad (21),$$

where $\beta_{2T}$ is the lateral magnification of the second lens unit at the telephoto end, $\beta_{2W}$ is the lateral magnification of the second lens unit at the wide angle end, $\beta_{3T}$ is the lateral magnification of the third lens unit at the telephoto end, $\beta_{3W}$ is the lateral magnification of the third lens unit at the wide angle end, $f_{4G}$ is the focal length of the fourth lens unit, $f_W$ is the focal length of the entire four-unit zoom lens at the wide angle end, and the lens component refers to a lens member whose effective surfaces that are in contact with air include only two surfaces, one being an object side surface and the other being an image side surface.

The four-unit zoom lens according the fifth mode of the present invention is a negative-lead type zoom lens (i.e. zoom lens with the first lens unit having a negative refractive power) and has an optical path bending member in the optical system. The optical path bending member facilitates slimming and size reduction of the optical system. In the four-unit zoom lens according to the present invention, the second lens unit having a positive refractive power and the third lens unit having a positive refractive power have the magnifying function. The fourth lens unit has the function of locating the exit pupil at a position at an appropriately large distance from the image plane. Moreover, the fourth lens unit has the function of correcting curvature of field.

In the four-unit zoom lens according to the present invention, the distance between the first lens unit and the second lens unit is smaller at the telephoto end than at the wide angle end. With this feature, the second lens unit can provide an appropriately magnifying function. In addition, the distance between the second lens unit and the third lens unit is larger at the telephoto end than at the wide angle end, and the distance between the third lens unit and the fourth lens unit is smaller at the telephoto end than at the wide angle end. With this feature, the third lens unit can readily provide a magnifying function. With these features the four-unit zoom lens according to the present invention has advantages over prior art arrangements in increasing the zoom ratio.

In the four-unit zoom lens according to the present invention, since the third lens unit consists of one lens component, the overall length of the third lens unit can be made short. Consequently, it is possible to provide large variable inter-unit distances in front and rear of the third lens unit (or a large space allowing the movement of the third lens unit). Therefore, it is possible to achieve both size reduction and high zoom ratio.

It is preferred that the four-unit zoom lens according to the present invention having the above configuration satisfy conditional expressions (19), (20), and (21). Conditional expressions (19), (20), and (21) allow the second, third and fourth lens units to exercise their functions appropriately.

Conditional expression (19) specifies a preferred range of the magnification change (the amount of magnification change) provided by the second lens unit.

If the lower limit of conditional expression (19) is reached, the magnification change provided by the second lens unit can be prevented from becoming unduly small. Then, the second lens unit can provide the magnification change as much as needed, and therefore the second lens unit can have the magnifying function. In addition, the other lens units need not provide unduly large magnification change, and therefore aberrations generated by the other lens units can be made small.

If the upper limit of conditional expression (19) is not exceeded, the magnification change provided by the second lens unit can be prevented from becoming unduly large. In consequence, the amount of movement of the second lens unit can be made small, and it is possible to make the optical system compact.

Conditional expression (20) specifies a preferred range of the magnification change provided by the third lens unit.

If the lower limit of conditional expression (20) is reached, the magnification change provided by the third lens unit can be prevented from becoming unduly small. Then, the third lens unit can provide the magnification change as much as needed, and therefore the third lens unit can have the magnifying function. In consequence, the third lens unit can provide a desired magnifying function in cooperation with the second lens unit. Therefore, it is possible to achieve a high zoom ratio.

If the upper limit of conditional expression (20) is not exceeded, the magnification change provided by the third lens unit can be prevented from becoming unduly large. In consequence, the amount of movement of the third lens unit can be made small, and it is possible to make the optical system compact.

Conditional expression (21) specifies a preferred range relating to the refractive power of the fourth lens unit. As described above, the fourth lens unit has the function of locating the exit pupil at a position at an appropriately large distance from the image plane and the function of correcting curvature of field. If conditional expression (3) is satisfied, the fourth lens unit can exercise this function.

If the lower limit of conditional expression (21) is reached, the negative refractive power of the fourth lens unit can be prevented from becoming unduly low. This is advantageous for achieving the telecentricity in the focal length range near the wide angle end as well as correction of curvature of field.

If the upper limit of conditional expression (21) is not exceeded, the positive refractive power of the fourth lens unit can be prevented from becoming unduly large. This is advantageous for reduction in the thickness of the fourth lens unit on the optical axis.

In the four-unit zoom lens according to the present invention having the above-described configuration, it is preferred that the second lens unit and the third lens unit satisfy at least one of the following conditional expressions (22) and (23):

$$0.2 < f_{2G}/f_T < 0.85 \qquad (22),$$

and $$0.1 < f_{3G}/f_T < 1.5 \qquad (23),$$

where $f_{2G}$ is the focal length of the second lens unit, $f_{3G}$ is the focal length of the third lens unit, and $f_T$ is the focal length of the entire four-unit zoom lens system at the telephoto end.

Conditional expression (22) specifies a preferred range relating to the positive refractive power of the second lens unit.

If the lower limit of conditional expression (22) is reached, the positive refractive power of the second lens unit can be prevented from becoming unduly large. In consequence, aberrations in the second lens unit can be made small.

If the upper limit of conditional expression (22) is not exceeded, the positive refractive power of the second lens unit can be prevented from becoming unduly small. Then, the second lens unit can have a refractive power as high as needed. This allows the second lens unit to have the magnifying function.

Conditional expression (23) specifies a preferred range relating to the positive refractive power of the third lens unit.

If the lower limit of conditional expression (23) is reached, the positive refractive power of the third lens unit can be prevented from becoming unduly large. In consequence, aberrations in the third lens unit can be made small.

If the upper limit of conditional expression (23) is not exceeded, the positive refractive power of the third lens unit can be prevented from becoming unduly small. Then, the third lens unit can have a refractive power as high as needed. This allows the third lens unit to have the magnifying function.

In the four-unit zoom lens according to the present invention having the above-described configuration, it is preferred that the fourth lens unit consists of one lens component. Here, the term "lens component" refers to a lens member whose effective surfaces that are in contact with air include only two surfaces, one being an object side surface and the other being an image side surface. Composing the fourth lens unit only of one lens component is advantageous for slimming of the fourth lens unit. In addition, this configuration is also advantageous for reduction in the size of the four-unit zoom lens and allows a large change in the distance between the third lens unit and the fourth lens unit.

In the four-unit zoom lens according to the present invention having the above-described configuration, it is preferred that the fourth lens unit has a meniscus shape having a concave surface facing the object side. If the fourth lens unit has this shape, the angle of incidence on the fourth lens unit of rays (off-axis principal rays) exiting from the third lens unit and the exit angle of ray exiting from the fourth lens unit will be appropriately small. This is advantageous for correction of off-axis aberrations.

In the four-unit zoom lens according to the present invention, it is preferred that the fourth lens unit satisfies the following conditional expression (24):

$$0.000001 < |D_4/f_{4G}| < 0.07 \qquad (24),$$

where $D_4$ is the thickness of the fourth lens unit on the optical axis.

Conditional expression (24) specifies a preferred range concerning the thickness of the fourth lens unit on the optical axis.

If the lower limit of conditional expression (24) is reached, the thickness of the fourth lens unit on the optical axis can be prevented from becoming unduly small. Then, the lens can have a certain degree of strength. Consequently, this lens can easily be manufactured. Moreover, as the lens has an appropriately large thickness, it can have a lens surface with a small radius of curvature. Therefore, the lens can have an appropriately high refractive power.

If the upper limit of conditional expression (24) is not exceeded, the thickness of the fourth lens unit on the optical axis can be prevented from becoming unduly large. This is advantageous for reduction in the overall length and allows a large change in the unit distance.

In the four-unit zoom lens according to the present invention having the above-described configuration, it is preferred that the fourth lens unit has an aspheric surface. Having an aspheric surface in the fourth lens unit enables better correction of curvature of field.

In the four-unit zoom lens according to the present invention having the above-described configuration, it is preferred that the fourth lens unit be composed of a single lens(es). Composing the fourth lens unit of single lenses, in particular only one single lens, is advantageous for cost reduction and for slimming.

In the four-unit zoom lens according to the present invention having the above-described configuration, it is preferred that the fourth lens unit be fixed on the optical axis relative to an image pickup surface during zooming from the wide angle end to the telephoto end. Since in this configuration the fourth lens unit can be disposed (or held) integrally with the image pickup surface, cost reduction can be achieved.

In the four-unit zoom lens according to the present invention having the above-described configuration, it is preferred that the lens component in the third lens unit have a biconvex shape. If the third lens unit has a biconvex shape, the two surfaces thereof can each provide a refractive power and aberration correction. With this shape, therefore, the third lens unit can advantageously provide an appropriately large positive refractive power and reduction of aberrations.

In the four-unit zoom lens according to the present invention having the above-described configuration, it is preferred that the lens component in the third lens unit satisfies the following conditional expression (25):

$$0.01 < (r_{3O}+r_{3I})/(r_{3O}-r_{3I}) < 0.4 \qquad (25),$$

where $r_{3O}$ is the paraxial radius of curvature of the object side surface of the lens component in the third lens unit, and $r_{3I}$ is the paraxial radius of curvature of the image side surface of the lens component in the third lens unit.

Conditional expression (25) specifies a preferred range of a shape factor concerning the shape of the lens component in the third lens unit. If conditional expression (25) is satisfied, the third lens unit can have an appropriate positive refractive power that is necessary for zooming, and well balanced correction of aberrations can be achieved.

In the four-unit zoom lens according to the present invention having the above-described configuration, it is preferred that the lens component in the third lens unit is a single lens. Composing the third lens unit of a single lens is advantageous for cost reduction.

In the four-unit zoom lens according to the present invention having the above-described configuration, it is preferred that the second lens unit includes two or less positive lenses and one or no negative lens. If the second lens unit is composed of three lenses, the overall length of the second lens unit can be made short. It is possible advantageously to provide large variable inter-unit distances in front and rear of the second lens unit. In addition, with the use of positive lenses and a negative lens, aberrations generated in the second lens unit can be made small.

In the four-unit zoom lens according to the present invention having the above-described configuration, it is preferred that the first lens unit consists, in order from the object side, of a front sub lens unit having a negative refractive power, the optical path bending member, and a rear sub lens unit having a positive refractive power, the front sub lens unit includes one biconcave single lens, the rear sub lens unit includes one or two single lenses, and the total number of positive lenses in the rear sub lens unit be one.

In the four-unit zoom lens according to the present invention, the first lens unit having a negative refractive power also contributes to the magnification change function. When a high zoom ratio is to be achieved, it is necessary that the first lens unit also has the function of changing the magnification. To this end, it is preferred that the first lens unit has a somewhat high negative refractive power. In addition, from the economical point of view, it is preferred that the first lens unit can be produced at low cost.

In the four-unit zoom lens according to the present invention, the first lens unit is composed of a front sub lens unit having a negative refractive power, an optical path bending member, and a rear sub lens unit having a positive refractive power, and the front sub lens unit includes a biconcave single lens. With this configuration, the first lens unit can have an appropriate negative refractive power, and axial aberrations generated near the telephoto end can easily be made small. In addition, since the number of lenses in the front sub lens unit is one, cost reduction can be achieved.

In the four-unit zoom lens according to the present invention, the rear sub lens unit includes one or two signal lenses. In the case where the rear sub lens unit includes one single lens, the single lens is a positive lens, and in the case where the rear sub lens unit includes two single lenses, one of the single lenses is a positive lens. With the use of the positive lens, a reduction in aberrations in the first lens unit is achieved. In the latter case, if the positive lens is cemented to the other single lens, manufacturing cost for cementing will be incurred. Composing the rear sub lens unit only of single lenses leads to a cost reduction.

As described above, in the four-unit zoom lens according to the present invention, all the lenses in the first lens unit are single lenses. This is cost effective.

It is also preferred that the four-unit zoom lens according to the present invention having the above-described configuration satisfy conditional expressions (3) and (4) described above.

In the four-unit zoom lens according to the present invention having the above-described configuration, it is also preferred that both surfaces of the biconcave single lens in the front sub lens unit be aspheric surfaces. The aspheric surfaces facilitate control of off-axis aberrations at the wide angle end and control of high order curvature of field at the wide angle end.

It is also preferred that the four-unit zoom lens according to the present invention having the above-described configuration satisfy conditional expression (5) described above.

In the four-unit zoom lens according to the present invention having the above-described configuration, it is also preferred that the biconcave single lens in the front sub lens unit satisfy conditional expression (6) described above.

In the four-unit zoom lens according to the present invention having the above-described configuration, it is also preferred that the positive lens in the rear sub lens unit satisfy conditional expression (7) described above.

In the four-unit zoom lens according to the present invention having the above-described configuration, it is also preferred that the biconcave single lens in the front sub lens unit and the positive lens in the rear sub lens unit be both made of a plastic material.

Using plastic lenses as the biconcave single lens in the front sub lens unit and the positive lens in the rear sub lens unit can lead to a cost reduction. While the use of plastic lenses is advantageous for cost reduction, plastic lenses are disadvantageous in that their focal length will change greatly with a change in the temperature. However, if the aforementioned two lenses are plastic lenses, changes in their focal length caused by a change in the temperature can cancel out each other, because the lens in the front sub lens unit is a negative lens and the lens in the rear sub lens unit is a positive lens. Therefore, cost reduction and good optical performance can both be achieved.

In the four-unit zoom lens according to the present invention, in the case where the biconcave single lens in the front sub lens unit and the positive lens in the rear sub lens unit are made of a plastic material, it is preferred that these lenses be bi-aspheric lenses.

If the biconcave single lens in the front sub lens unit and the positive lens in the rear sub lens unit are bi-aspheric lenses, both the object side surface and the image side surface of them can have the function of correcting aberrations by the aspheric surfaces. Thus, in the front sub lens unit, the use of a bi-aspheric lens as the biconcave single lens is advantageous for making the refractive power of this lens appropriately high while keeping good optical performance. In particular, the use of a bi-aspheric lens facilitates control of off-axis aberrations at the wide angle end and is advantageous for control of high order curvature of field at the wide angle end. Moreover, as the biconcave single lens is a plastic lens, aspheric surfaces can be produced more easily than in the case of glass aspheric lenses. In addition, as these two lenses are made of a plastic material, cost reduction can be expected.

In the four-unit zoom lens according to the present invention, the biconcave single lens in the front sub lens unit and the positive lens in the rear sub lens unit may be made of a glass material instead of a plastic material.

In the case of glass lenses, changes in the focal length with changes in the temperature hardly occur. Therefore, if the biconcave single lens in the front sub lens unit and the positive lens in the rear sub lens unit are made of a glass material, their focal length can be prevented from changing greatly even when the temperature changes. If glass materials are used, materials having a high refractive index are available. Therefore, monochromatic aberration and chromatic aberration can be reduced.

In the four-unit zoom lens according to the present invention, it is also preferred that the biconcave single lens in the front sub lens unit and the positive lens in the rear sub lens unit satisfy conditional expressions (8) and (9) described above.

In the four-unit zoom lens according to the present invention, it is also preferred that the rear sub lens unit consists only of the positive lens. Then, the number of lenses is small, thus facilitating further cost reduction.

In the four-unit zoom lens according to the present invention, the focusing operation may be performed by, but not limited to, advancing the first lens unit toward the object side for example. Alternatively, the lens unit advanced for focusing may be a lens unit disposed closer to the image side than the second lens unit. In particular, it is preferred that the third or subsequent lens unit be advanced for focusing, because the third and subsequent lens units can be designed to be light in weight. Alternatively, the focusing operation may be performed by moving an image pickup element along the direction of the optical axis.

The first lens unit and the image pickup element may be stationary during zooming from the wide angle end to the telephoto end. Alternatively, the first lens unit may be fixed on the body of the image pickup apparatus while the image pickup element is adapted to move, or still alternatively, the image pickup element may be fixed on the body of the image pickup apparatus while the first lens unit is adapted to move. In other words, the overall length of the zoom lens may change during zooming from the wide angle end to the telephoto end.

It is preferred that two or more of the above described features be adopted in combination.

An image pickup apparatus according to the present invention includes a zoom lens, an image pickup element disposed on the image side of the zoom lens, and an image processing section that processes a signal output from the image pickup element, wherein the zoom lens is one of the above-described a first to fourth modes or a four-unit zoom lenses according to the fifth mode.

The zoom lenses according to the present invention described above have barrel distortion in the focal length range near the wide angle end. The zoom lens is adapted to have barrel distortion in the effective image pickup area of the image pickup element. Consequently, an image of an object picked up by the image pickup element has barrel distortion. The image pickup apparatus according to the present invention has an image processing section that correct barrel distortion. The image pickup apparatus is adapted to reproduce, display, and/or store an image of the object rectified as a rectangular shape by the image processing section.

In the image processing section, correction of distortion may be performed separately for signals of different colors. Thus, chromatic aberration of magnification can be corrected electrically. The image processing section may be adapted to correct brightness fall-off in the peripheral region, image blur and/or aberrations.

In the image pickup apparatus according to the invention, it is preferred that the distance from the first lens unit to the image pickup element change during zooming from the wide angle end to the telephoto end. This will lead to an increase in the degree of freedom in the zoom lens design, enabling a reduction in the number of movable lens units and excellent optical performance.

It is more preferred that the conditional expressions described in the foregoing be modified as follows. With the following modifications, the advantageous effects described with the respective conditional expressions can be achieved more effectively.

It is preferred that the lower limit value in conditional expression (1) be −3, more preferably −2, still more preferably −0.9.

It is preferred that the upper limit value in conditional expression (1) be −0.2, more preferably −0.4, still more preferably −0.6.

It is preferred that the lower limit value in conditional expression (2) be 1.5, more preferably 1.7, still more preferably 2.

It is preferred that the upper limit value in conditional expression (2) be 20, more preferably 10, still more preferably 3.

It is preferred that the lower limit value in conditional expression (3) be 0.3, more preferably 0.41, still more preferably 0.5.

It is preferred that the upper limit value in conditional expression (3) be 5, more preferably 3, still more preferably 1, still more preferably 0.7.

It is preferred that the lower limit value in conditional expression (4) be −10, more preferably −5, still more preferably −3.5.

It is preferred that the upper limit value in conditional expression (4) be −1.5, more preferably −1.7, still more preferably −1.8, still more preferably −1.9.

It is preferred that the lower limit value in conditional expression (5) be −0.7, more preferably −0.5, still more preferably −0.35.

It is preferred that the upper limit value in conditional expression (5) be 0.5, more preferably 0.32, still more preferably 0.1.

It is preferred that the lower limit value in conditional expression (6) be 0.06, more preferably 0.1, still more preferably 0.15.

It is preferred that the upper limit value in conditional expression (6) be 0.27, more preferably 0.24, still more preferably 0.22.

It is preferred that the lower limit value in conditional expression (7) be 0.05, more preferably 0.07, still more preferably 0.1.

It is preferred that the upper limit value in conditional expression (7) be 0.25, more preferably 0.19, still more preferably 0.15.

In the case where the relevant lens is made of a plastic material, it is preferred that the lower limit value of conditional expression (8) be −0.25, more preferably −0.2, still more preferably −0.15.

In the case where the relevant lens is made of a plastic material, it is preferred that the upper limit value of conditional expression (8) be 0.15, more preferably 0.1, still more preferably 0.05, still more preferably −0.05.

In the case where the relevant lens is made of a glass material, it is preferred that the lower limit value of conditional expression (8) be −0.28, more preferably −0.26, still more preferably −0.24.

In the case where the relevant lens is made of a glass material, it is preferred that the upper limit value of conditional expression (8) be 0.1, more preferably 0.05, still more preferably −0.05, still more preferably −0.1.

In the case where the relevant lens is made of a plastic material, it is preferred that the lower limit value of conditional expression (9) be 15, more preferably 20, still more preferably 25.

In the case where the relevant lens is made of a plastic material, it is preferred that the upper limit value of conditional expression (9) be 45, more preferably 40, still more preferably 33.

In the case where the relevant lens is made of a glass material, it is preferred that the lower limit value of conditional expression (9) be 13, more preferably 15, still more preferably 18.

In the case where the relevant lens is made of a glass material, it is preferred that the upper limit value of conditional expression (9) be 40, more preferably 35, still more preferably 30.

It is preferred that the lower limit value in conditional expression (10) be −0.9, more preferably −0.8, still more preferably −0.75.

It is preferred that the upper limit value in conditional expression (10) be 0.7, more preferably 0.4, still more preferably −0.3, still more preferably −0.6.

It is preferred that the lower limit value in conditional expression (11) be 1, more preferably 1.5, still more preferably 2, still more preferably 2.5.

It is preferred that the upper limit value in conditional expression (11) be 8, more preferably 6, still more preferably 4.

It is preferred that the lower limit value in conditional expression (12) be −0.25, more preferably −0.2, still more preferably −0.15.

It is preferred that the upper limit value in conditional expression (12) be 0.15, more preferably 0.1, still more preferably 0.05, still more preferably −0.05.

It is preferred that the lower limit value in conditional expression (13) be 15, more preferably 20, still more preferably 25.

It is preferred that the upper limit value in conditional expression (13) be 45, more preferably 40, still more preferably 33.

It is preferred that the lower limit value in conditional expression (14) be 200E−7, more preferably 300E−7, still more preferably 400E−7, still more preferably 500E−7.

It is preferred that the upper limit value in conditional expression (14) be 900E−7, more preferably 800E−7, still more preferably 700E−7.

It is preferred that the lower limit value in conditional expression (15) be 200E−7, more preferably 300E−7, still more preferably 400E−7, still more preferably 500E−7.

It is preferred that the upper limit value in conditional expression (15) be 900E−7, more preferably 800E−7, still more preferably 700E−7.

It is preferred that the upper limit value in conditional expression (16) be 170E−7, more preferably 150E−7, still more preferably 120E−7, still more preferably 80E−7.

It is preferred that the lower limit value in conditional expression (17) be −0.05, more preferably −0.01, still more preferably −0.005, still more preferably −0.001.

It is preferred that the upper limit value in conditional expression (17) be −0.0001, more preferably −0.0003, still more preferably −0.0005.

It is preferred that the lower limit value in conditional expression (18) be −0.05, more preferably −0.01, still more preferably −0.005, still more preferably −0.001.

It is preferred that the upper limit value in conditional expression (18) be −0.0001, more preferably −0.0002, still more preferably −0.0004.

It is preferred that the lower limit value in conditional expression (19) be 1.4, more preferably 1.5, still more preferably 2.0.

It is preferred that the upper limit value in conditional expression (19) be 3.5, more preferably 3.0.

It is preferred that the lower limit value in conditional expression (20) be 1.2, more preferably 1.3, still more preferably 1.4.

It is preferred that the upper limit value in conditional expression (20) be 3.5, more preferably 3.0, more preferably 2.0.

It is preferred that the upper limit value in conditional expression (21) be 0.20, more preferably 0.15.

It is preferred that the lower limit value in conditional expression (21) be −0.20, more preferably −0.15.

It is preferred that the lower limit value in conditional expression (22) be 0.3, more preferably 0.4.

It is preferred that the upper limit value in conditional expression (22) be 0.8, more preferably 0.75.

It is preferred that the lower limit value in conditional expression (23) be 0.2, more preferably 0.3.

It is preferred that the upper limit value in conditional expression (23) be 0.75, more preferably 0.65.

It is preferred that the upper limit value in conditional expression (24) be 0.06, more preferably 0.05.

It is preferred that the lower limit value in conditional expression (25) be 0.05, more preferably 0.1.

It is preferred that the upper limit value in conditional expression (25) be 0.3, more preferably 0.2.

In the foregoing description, the focal length refers to the paraxial focal length. When applied to a zoom lens capable of focusing, the above-described features of the optical system and conditional expressions should be interpreted as those for the state in which the zoom lens is focused on an object at the longest distance (or an object at infinity), unless stated otherwise.

According to the present invention, it is possible in a negative-lead zoom lens having an optical path bending member provided in the optical path to achieve high optical performance and cost reduction. It is also possible to provide an image pickup apparatus equipped with such a zoom lens.

In the following, examples of the zoom lens and the image pickup apparatus according to the present invention will be described in detail with reference to the drawings. It should be understood that the present invention is not limited by the examples.

In the following, zoom lenses according to first to tenth examples of the present invention will be described. FIGS. 1A to 10A, 1B to 10B, and 1C to 10C are cross sectional views of the zoom lenses according to the first to tenth examples in the state in which the zoom lenses are focused on an object point at infinity respectively at the wide angle end, in an intermediate state, and at the telephoto end. In FIGS. 1A to 10C, a first lens unit is denoted by G1, a second lens unit is denoted by G2, a third lens unit is denoted by G3, a fourth lens unit is denoted by G4, a fifth lens unit is denoted by G5, an infrared cut filter is denoted by F, a cover glass is denoted by C, and the image plane is denoted by I.

FIGS. 1A, 2A, 3A, 4A, 5A, 6A, 7A, 8A, 9A, and 10A are cross sectional views of the zoom lens according to the respective examples in the state in which the zoom lens is focused on an object point at infinity at the wide angle end.

FIGS. 1B, 2B, 3B, 4B, 5B, 6B, 7B, 8B, 9B, and 10B are cross sectional views of the zoom lens according to the respective examples in the state in which the zoom lens is focused on an object point at infinity in the intermediate state.

FIGS. 1C, 2C, 3C, 4C, 5C, 6C, 7C, 8C, 9C, and 10C are cross sectional views of the zoom lens according to the respective examples in the state in which the zoom lens is focused on an object point at infinity at the telephoto end.

The infrared cut filter F may be a low pass filter having coating (multi-layer coating) for cutting infrared light. The cover glass C is a plane parallel plate that an electronic image pickup element has. The cover glass C may have coating for cutting infrared light applied on its surface. The cover glass C may have the function of a low pass filter. The plane parallel plate F may be adapted not to have the function of a low pass filter.

In all the examples, the aperture stop S moves integrally with the second lens unit G2. All the numerical data presented below are for the state in which the zoom lens is focused on an object at infinity. In the numerical data, dimensions are in millimeters and angles are in degrees. It is preferred that the focusing operation is performed by moving the lens located closest to the image side. Zoom data will be presented for the wide angle end (WE) of the zoom range, an intermediate focal length state (ST), and the telephoto end (TE) of the zoom range.

In all the examples, it is preferred that the focusing operation be performed by moving the third lens unit G3. In the zoom lenses according to the first to fifth examples, the focusing operation from a long distance to a short distance is performed by moving the third lens unit G3 having a positive refractive power toward the object side. In the zoom lens according to the sixth example, the focusing operation from a long distance to a short distance is performed by moving the third lens unit G3 having a negative refractive power toward the image side. The way of focusing is not limited to the above, but the focusing operation may be performed by moving the image pickup element in the direction along the optical axis.

As will be understood from the cross sectional views, the movement of the lens units in relation to the image pickup surface, which is fixed, are illustrated. Thus, in the cross sectional views of the zoom lenses according to the first to fifth, seventh, and eighth examples, how the first lens unit G1 moves is illustrated. However, if the first lens unit G1 is stationary during zooming, the sealing performance of the apparatus can be enhanced. Therefore, it is preferred that the first lens unit G1 be kept stationary while the image pickup element be moved. In the zoom lens according to the sixth example, the first lens unit G1 and the image pickup element are both stationary during zooming.

In the zoom lenses according to the examples, the reflecting member constitutes the optical path bending member. Specifically, the reflecting member is a prism. Alternatively, the reflecting member may be a mirror.

Figure 1B:
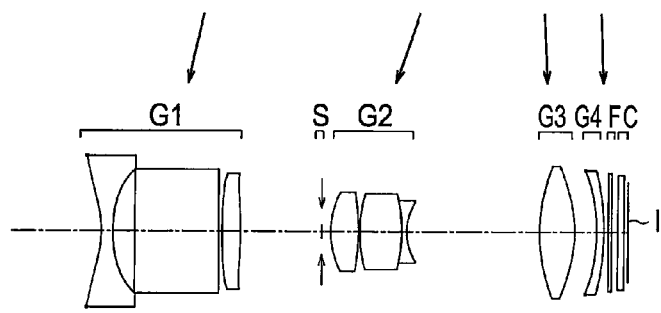
Figure 1C:
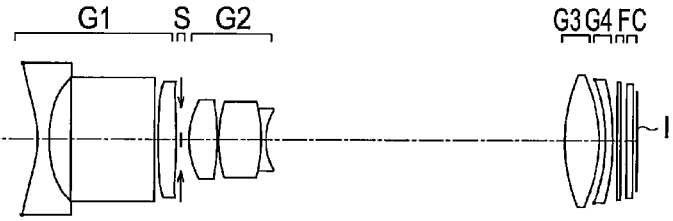

As shown in FIGS. 1A, 1B, and 1C, the zoom lens according to the first example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves toward the object side, the second lens unit G2 moves toward the object side, the third lens unit G3 moves toward the image side, and the fourth lens unit G4 is stationary. The zoom lens according to the first example is a four-unit zoom lens in which the distances between the lens units change as above.

The first lens unit G1 is composed of a biconcave negative lens, a reflecting member, and a biconvex positive lens. The second lens unit G2 is composed of a biconvex positive lens, and a cemented lens made up of a biconvex positive lens and a biconcave negative lens. The third lens unit G3 is composed of biconvex positive lens. The fourth lens unit G4 is composed of a positive meniscus lens having a concave surface facing the object side. The lens elements in each of the lens units are arranged in the mentioned order from the object side.

There are eight aspheric surfaces, which include both surfaces of the biconcave negative lens in the first lens unit G1, both surfaces of the biconvex positive lens in the first lens unit G1, both surfaces of the biconvex positive lens in the second lens unit G2, the image side surface of the biconvex positive lens in the third lens unit G3, and the object side surface of the positive meniscus lens having a concave surface facing the object side in the fourth lens unit G4.

Figure 2A:
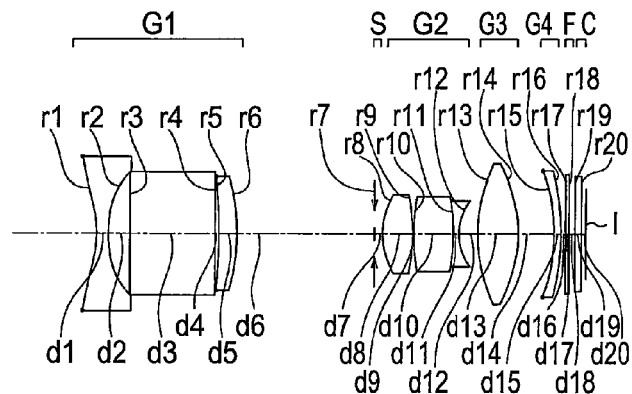
FIGS. 2A, 2B, and 2C are cross sectional views of a zoom lens according to a second example of the present invention, similar to FIGS. 1A, 1B, and 1C.
Figure 2B:
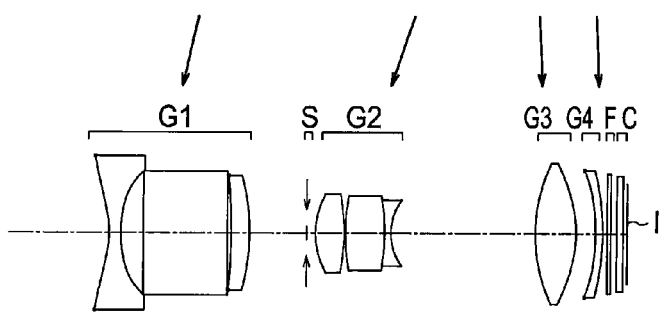
Figure 2C:
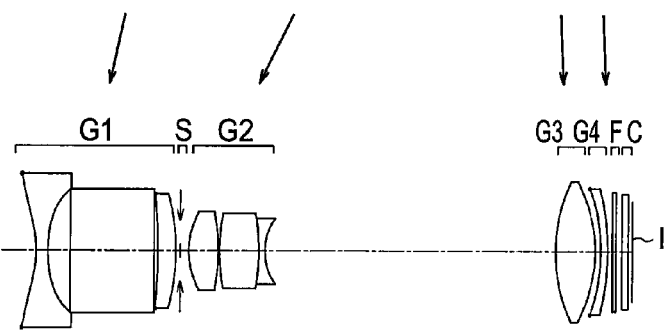

As shown in FIGS. 2A, 2B, and 2C, the zoom lens according to the second example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves toward the object side, the second lens unit G2 moves toward the object side, the third lens unit G3 moves toward the image side, and the fourth lens unit G4 is stationary. The zoom lens according to the second example is a four-unit zoom lens in which the distances between the lens units change as above.

The first lens unit G1 is composed of a biconcave negative lens, a reflecting member, and a positive meniscus lens having a concave surface facing the object side. The second lens unit G2 is composed of a biconvex positive lens, and a cemented lens made up of a biconvex positive lens and a biconcave negative lens. The third lens unit G3 is composed of biconvex positive lens. The fourth lens unit G4 is composed of a positive meniscus lens having a concave surface facing the object side. The lens elements in each of the lens units are arranged in the mentioned order from the object side.

There are eight aspheric surfaces, which include both surfaces of the biconcave negative lens in the first lens unit G1, both surfaces of the positive meniscus lens having a concave surface facing the object side in the first lens unit G1, both surfaces of the biconvex positive lens in the second lens unit G2, the image side surface of the biconvex positive lens in the third lens unit G3, and the object side surface of the positive meniscus lens having a concave surface facing the object side in the fourth lens unit G4.

Figure 3A:
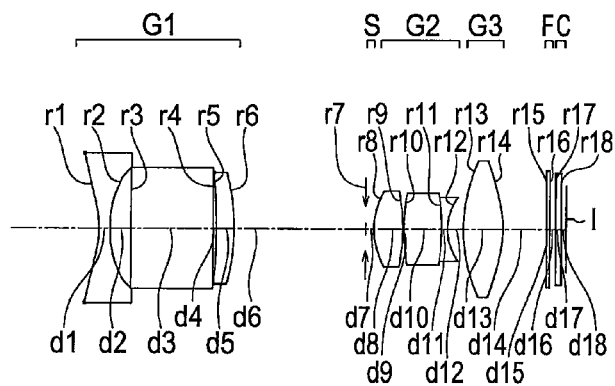
FIGS. 3A, 3B, and 3C are cross sectional views of a zoom lens according to a third example of the present invention, similar to FIGS. 1A, 1B, and 1C.
Figure 3B:
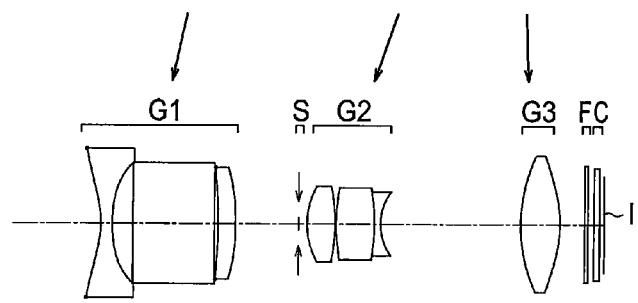
Figure 3C:
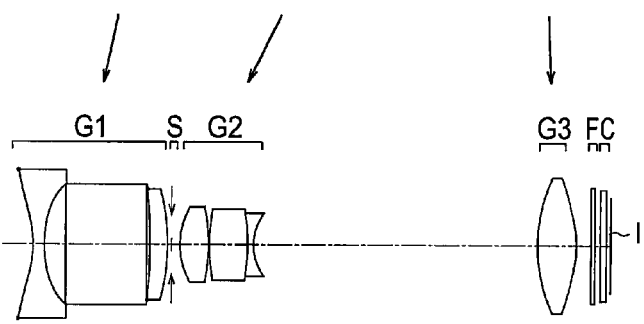

As shown in FIGS. 3A, 3B, and 3C, the zoom lens according to the third example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves toward the object side, the second lens unit G2 moves toward the object side, and the third lens unit G3 moves toward the image side. The zoom lens according to the third example is a three-unit zoom lens in which the distances between the lens units change as above.

The first lens unit G1 is composed of a biconcave negative lens, a reflecting member, and a positive meniscus lens having a concave surface facing the object side. The second lens unit G2 is composed of a biconvex positive lens, and a cemented lens made up of a biconvex positive lens and a biconcave negative lens. The third lens unit G3 is composed of biconvex positive lens. The lens elements in each of the lens units are arranged in the mentioned order from the object side.

There are seven aspheric surfaces, which include both surfaces of the biconcave negative lens in the first lens unit G1, both surfaces of the positive meniscus lens having a concave surface facing the object side in the first lens unit G1, both surfaces of the biconvex positive lens in the second lens unit G2, and the image side surface of the biconvex positive lens in the third lens unit G3.

As shown in FIGS. 4A, 4B, and 4C, the zoom lens according to the fourth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves toward the object side, the second lens unit G2 moves toward the object side, the third lens unit G3 moves toward the image side, and the fourth lens unit G4 is stationary. The zoom lens according to the fourth example is a four-unit zoom lens in which the distances between the lens units change as above.

The first lens unit G1 is composed of a biconcave negative lens, a reflecting member, and a biconvex positive lens. The second lens unit G2 is composed of a biconvex positive lens, and a cemented lens made up of a positive meniscus lens having a convex surface facing the object side and a negative meniscus lens having a convex surface facing the object side. The third lens unit G3 is composed of biconvex positive lens. The fourth lens unit G4 is composed of a positive meniscus lens having a concave surface facing the object side. The lens elements in each of the lens units are arranged in the mentioned order from the object side.

There are eight aspheric surfaces, which include both surfaces of the biconcave negative lens in the first lens unit G1, both surfaces of the biconvex positive lens in the first lens unit G1, both surfaces of the biconvex positive lens in the second lens unit G2, the image side surface of the biconvex positive lens in the third lens unit G3, and the object side surface of the positive meniscus lens having a concave surface facing the object side in the fourth lens unit G4.

Figure 5A:
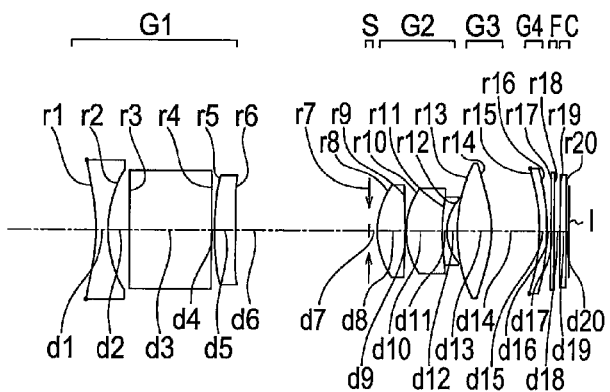
FIGS. 5A, 5B, and 5C are cross sectional views of a zoom lens according to a fifth example of the present invention, similar to FIGS. 1A, 1B, and 1C.
Figure 5B:
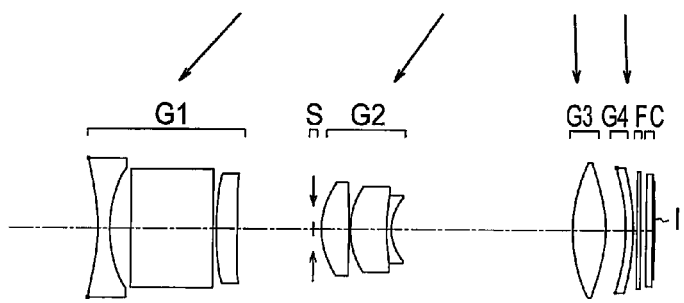
Figure 5C:
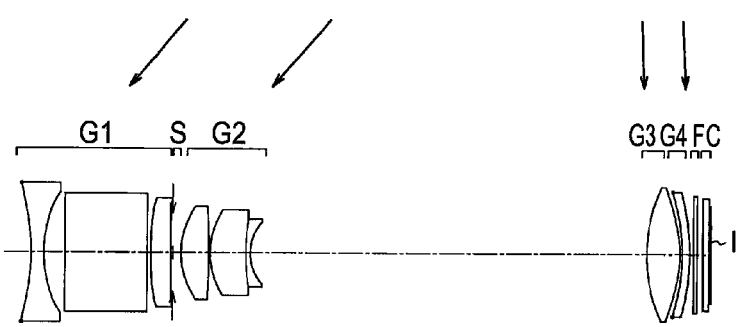

As shown in FIGS. 5A, 5B, and 5C, the zoom lens according to the fifth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves toward the object side, the second lens unit G2 moves toward the object side, the third lens unit G3 moves toward the image side, and the fourth lens unit G4 is stationary. The zoom lens according to the fifth example is a four-unit zoom lens in which the distances between the lens units change as above.

The first lens unit G1 is composed of a biconcave negative lens, a reflecting member, and a biconvex positive lens. The second lens unit G2 is composed of a biconvex positive lens, and a cemented lens made up of a positive meniscus lens having a convex surface facing the object side and a negative meniscus lens having a convex surface facing the object side. The third lens unit G3 is composed of biconvex positive lens. The fourth lens unit G4 is composed of a positive meniscus lens having a concave surface facing the object side. The lens elements in each of the lens units are arranged in the mentioned order from the object side.

There are eight aspheric surfaces, which include both surfaces of the biconcave negative lens in the first lens unit G1, both surfaces of the biconvex positive lens in the first lens unit G1, both surfaces of the biconvex positive lens in the second lens unit G2, the image side surface of the biconvex positive lens in the third lens unit G3, and the object side surface of the positive meniscus lens having a concave surface facing the object side in the fourth lens unit G4.

As shown in FIGS. 6A, 6B, and 6C, the zoom lens according to the sixth example includes, in order from the object side, a first lens unit G1 having a negative refractive power, an aperture stop S, a second lens unit G2 having a positive refractive power, a third lens unit G3 having a positive refractive power, a fourth lens unit G4 having a positive refractive power, and a fifth lens unit G5 having a positive refracting power.

During zooming from the wide angle end to the telephoto end, the first lens unit G1 is stationary, the second lens unit G2 moves toward the object side, the third lens unit G3 moves toward the object side, the fourth lens unit G4 moves toward the image side, and the fifth lens unit G5 is stationary. The zoom lens according to the sixth example is a five-unit zoom lens in which the distances between the lens units change as above.

The first lens unit G1 is composed of a biconcave negative lens, a reflecting member, a biconvex positive lens, and a negative meniscus lens having a convex surface facing the object side. The second lens unit G2 is composed of a biconvex positive lens, and a cemented lens made up of a biconvex positive lens and a biconcave negative lens. The third lens unit G3 is composed of a biconcave negative lens. The fourth lens unit G4 is composed of a positive meniscus lens having a concave surface facing the object side. The fifth lens unit G5 is composed of a biconvex positive lens. The lens elements in each of the lens units are arranged in the mentioned order from the object side.

There are ten aspheric surfaces, which include both surfaces of the biconcave negative lens in the first lens unit G1, both surfaces of the biconvex positive lens in the first lens unit G1, both surfaces of the biconvex positive lens in the second lens unit G2, the image side surface of the biconcave negative lens in the third lens unit G3, the object side surface of the positive meniscus lens having a concave surface facing the object side in the fourth lens unit G4, and both surfaces of the biconvex positive lens in the fifth lens unit G5.

Figure 7A:
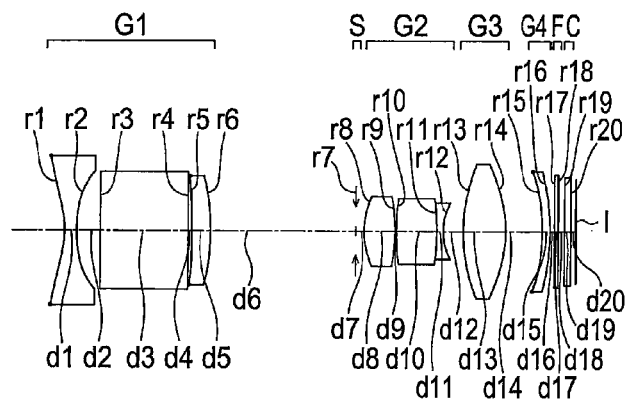
FIGS. 7A, 7B, and 7C are cross sectional views of a zoom lens according to a seventh example of the present invention, similar to FIGS. 1A, 1B, and 1C.
Figure 7B:
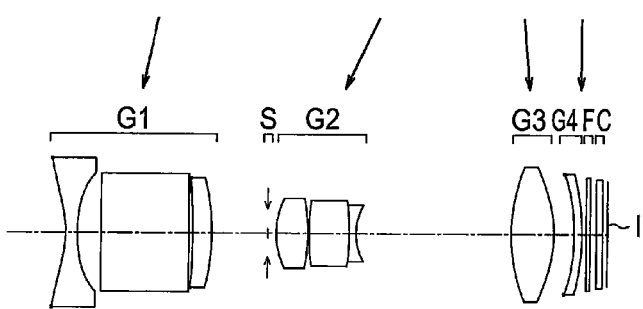
Figure 7C:
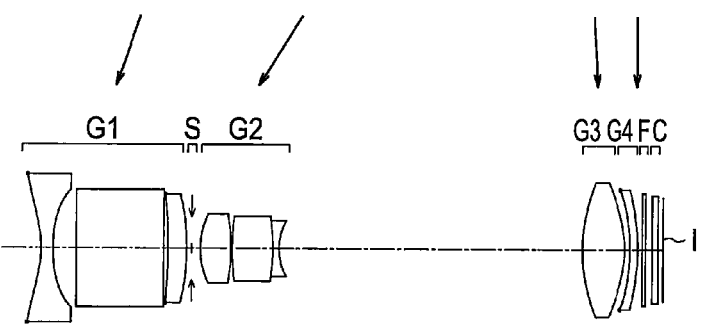

As shown in FIGS. 7A, 7B, and 7C, the zoom lens according to the seventh example includes, in order from the object side, a first lens unit G1 having a negative refractive power, an aperture stop S, a second lens unit G2 having a positive refractive power, a third lens unit G3 having a positive refractive power, and a fourth lens unit G4 having a negative refractive power.

During zooming from the wide angle end to the telephoto end, the first lens unit G1 moves toward the object side, the second lens unit G2 moves toward the object side, the third lens unit G3 moves toward the image side, and the fourth lens unit G4 is stationary. The zoom lens according to the seventh example is a four-unit zoom lens in which the distances between the lens units change as above.

The first lens unit G1 is composed of a biconcave negative lens, a reflecting member, and a positive meniscus lens having a concave surface facing the object side. The second lens unit G2 is composed of a biconvex positive lens, and a cemented lens made up of a biconvex positive lens and a biconcave negative lens. The third lens unit G3 is composed of biconvex positive lens. The fourth lens unit G4 is composed of a negative meniscus lens having a concave surface facing the object side. The lens elements in each of the lens units are arranged in the mentioned order from the object side.

There are eight aspheric surfaces, which include both surfaces of the biconcave negative lens in the first lens unit G1, both surfaces of the positive meniscus lens having a concave surface facing the object side in the first lens unit G1, both surfaces of the biconvex positive lens in the second lens unit G2, the image side surface of the biconvex positive lens in the third lens unit G3, and the object side surface of the negative meniscus lens having a concave surface facing the object side in the fourth lens unit G4.

Figure 8A:
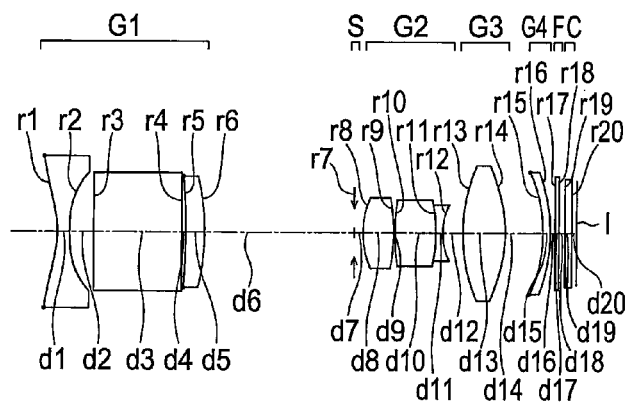
FIGS. 8A, 8B, and 8C are cross sectional views of a zoom lens according to an eighth example of the present invention, similar to FIGS. 1A, 1B, and 1C.
Figure 8B:
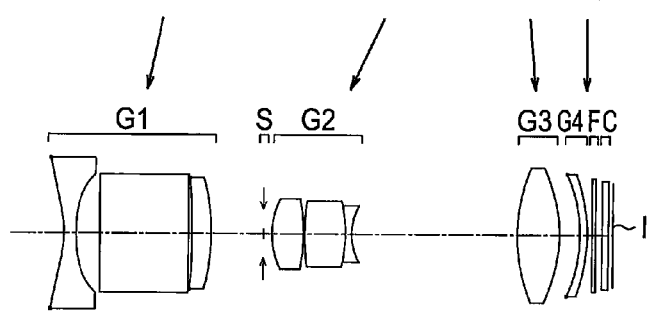
Figure 8C:
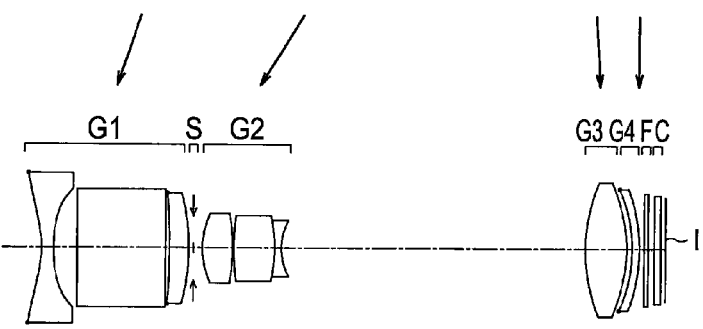

As shown in FIGS. 8A, 8B, and 8C, the zoom lens according to the eighth example includes, in order from the object side, a first lens unit G1 having a negative refractive power, an aperture stop S, a second lens unit G2 having a positive refractive power, a third lens unit G3 having a positive refractive power, and a fourth lens unit G4 having a negative refractive power.

During zooming from the wide angle end to the telephoto end, the first lens unit G1 moves toward the object side, the second lens unit G2 moves toward the object side, the third lens unit G3 moves toward the image side, and the fourth lens unit G4 is stationary. The zoom lens according to the eighth example is a four-unit zoom lens in which the distances between the lens units change as above.

The first lens unit G1 is composed of a biconcave negative lens, a reflecting member, and a positive meniscus lens having a concave surface facing the object side. The second lens unit G2 is composed of a biconvex positive lens, and a cemented lens made up of a biconvex positive lens and a biconcave negative lens. The third lens unit G3 is composed of biconvex positive lens. The fourth lens unit G4 is composed of a negative meniscus lens having a concave surface facing the object side. The lens elements in each of the lens units are arranged in the mentioned order from the object side.

There are eight aspheric surfaces, which include both surfaces of the biconcave negative lens in the first lens unit G1, both surfaces of the positive meniscus lens having a concave surface facing the object side in the first lens unit G1, both surfaces of the biconvex positive lens in the second lens unit G2, the image side surface of the biconvex positive lens in the third lens unit G3, and the object side surface of the negative meniscus lens having a concave surface facing the object side in the fourth lens unit G4.

Figure 9A:
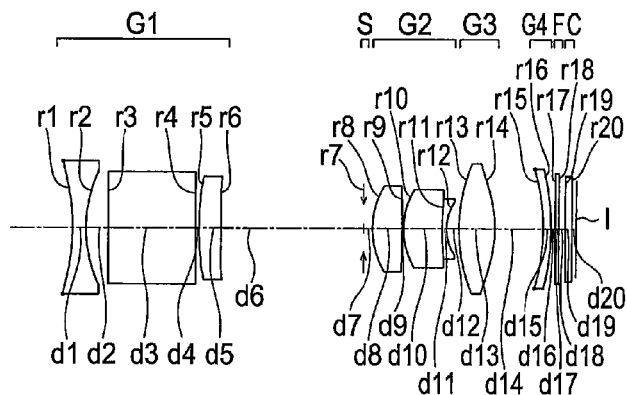
FIGS. 9A, 9B, and 9C are cross sectional views of a zoom lens according to a ninth example of the present invention, similar to FIGS. 1A, 1B, and 1C.
Figure 9B:
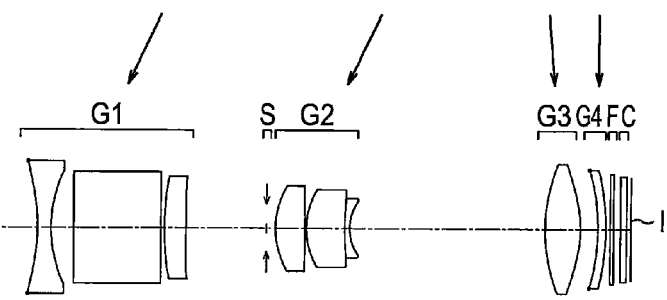
Figure 9C:
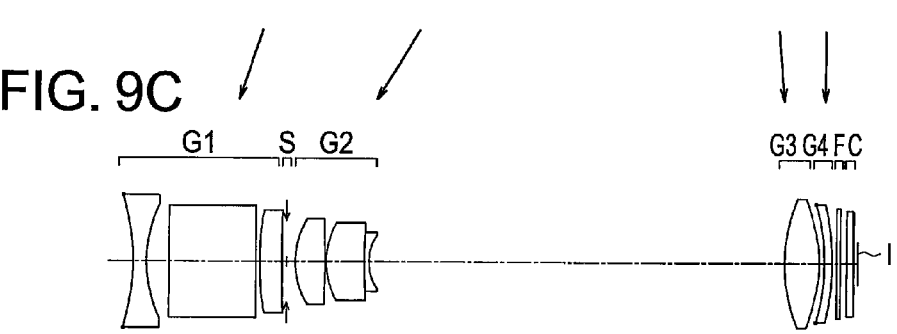

As shown in FIGS. 9A, 9B, and 9C, the zoom lens according to the ninth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves toward the object side, the second lens unit G2 moves toward the object side, the third lens unit G3 moves toward the image side, and the fourth lens unit G4 is stationary. The zoom lens according to the ninth example is a four-unit zoom lens in which the distances between the lens units change as above.

The first lens unit G1 is composed of a biconcave negative lens, a reflecting member, and a biconvex positive lens. The second lens unit G2 is composed of a biconvex positive lens, and a cemented lens made up of a positive meniscus lens having a convex surface facing the object side and a negative meniscus lens having a convex surface facing the object side. The third lens unit G3 is composed of biconvex positive lens. The fourth lens unit G4 is composed of a positive meniscus lens having a concave surface facing the object side. The lens elements in each of the lens units are arranged in the mentioned order from the object side.

There are eight aspheric surfaces, which include both surfaces of the biconcave negative lens in the first lens unit G1, both surfaces of the biconvex positive lens in the first lens unit G1, both surfaces of the biconvex positive lens in the second lens unit G2, the image side surface of the biconvex positive lens in the third lens unit G3, and the object side surface of the positive meniscus lens having a concave surface facing the object side in the fourth lens unit G4.

Figure 10A:
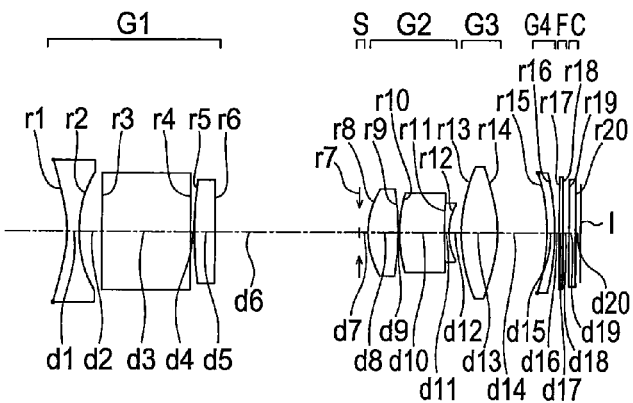
FIGS. 10A, 10B, and 10C are cross sectional views of a zoom lens according to a tenth example of the present invention, similar to FIGS. 1A, 1B, and 1C.
Figure 10B:
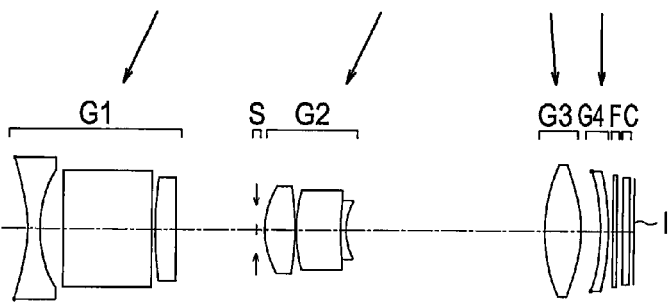
Figure 10C:
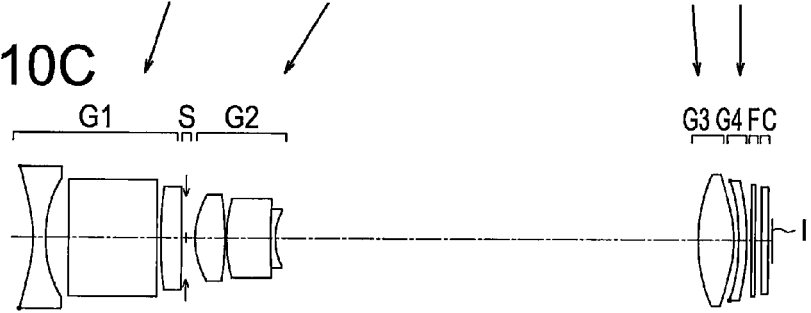

As shown in FIGS. 10A, 10B, and 10C, the zoom lens according to the tenth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves toward the object side, the second lens unit G2 moves toward the object side, the third lens unit G3 moves toward the image side, and the fourth lens unit G4 is stationary. The zoom lens according to the tenth example is a four-unit zoom lens in which the distances between the lens units change as above.

The first lens unit G1 is composed of a biconcave negative lens, a reflecting member, and a biconvex positive lens. The second lens unit G2 is composed of a biconvex positive lens, and a cemented lens made up of a positive meniscus lens having a convex surface facing the object side and a negative meniscus lens having a convex surface facing the object side. The third lens unit G3 is composed of biconvex positive lens. The fourth lens unit G4 is composed of a positive meniscus lens having a concave surface facing the object side. The lens elements in each of the lens units are arranged in the mentioned order from the object side.

There are eight aspheric surfaces, which include both surfaces of the biconcave negative lens in the first lens unit G1, both surfaces of the biconvex positive lens in the first lens unit G1, both surfaces of the biconvex positive lens in the second lens unit G2, the image side surface of the biconvex positive lens in the third lens unit G3, and the object side surface of the positive meniscus lens having a concave surface facing the object side in the fourth lens unit G4.

Numerical data of each embodiment described above is shown below. Apart from symbols described above, f denotes a focal length of the entire zoom lens system, each of f1, f2, . . . denotes a focal length of each lens unit, fb denotes a back focus, IH denote an image height, $F_{NO}$ denotes an F number, ω denotes a half angle of filed, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of νd1, νd2, . . . denotes an Abbe constant for each lens.

Further, * denotes an aspheric data,

The overall length of the lens system which will be described later is a length which is obtained by adding the back focus to a distance from the first lens surface up to the last lens surface. fb (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

EXAMPLE 1

| Unit mm | | | | |
|---|---|---|---|---|
| Surface data | | | | |
| Surface no. | r | d | nd | νd |
| Object plane | ∞ | ∞ | | |
| 1* | −7.487 | 0.97 | 1.53110 | 55.91 |
| 2* | 12.191 | 1.79 | | |

-continued

| Unit mm | | | | |
|---|---|---|---|---|
| 3 | ∞ | 7.00 | 1.88300 | 40.80 |
| 4 | ∞ | 0.30 | | |
| 5* | 30.132 | 1.50 | 1.63493 | 23.90 |
| 6* | −70.000 | Variable | | |
| 7 (Stop) | ∞ | 0.70 | | |
| 8* | 6.129 | 2.38 | 1.49700 | 81.54 |
| 9* | −16.278 | 0.11 | | |
| 10 | 11.001 | 3.49 | 1.76182 | 26.52 |
| 11 | −12.852 | 0.40 | 1.84666 | 23.78 |
| 12 | 4.540 | Variable | | |
| 13 | 14.287 | 2.90 | 1.53110 | 55.91 |
| 14* | −9.746 | Variable | | |
| 15* | −20.000 | 0.61 | 1.53110 | 55.91 |
| 16 | −20.000 | 0.35 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical surface data

1st surface k = 0.000
A4 = 2.08019e−03, A6 = −3.26772e−05, A8 = 3.75554e−07

2nd surface k = 3.328
A4 = 6.58910e−04, A6 = 1.88880e−05, A8 = −7.45717e−07

5th surface k = 0.000
A4 = −6.95567e−04, A6 = 3.74130e−05, A8 = 1.19289e−07

6th surface k = 0.000
A4 = −5.64334e−04, A6 = 2.76133e−05, A8 = 3.58379e−07

8th surface k = 0.000
A4 = −3.97291e−04, A6 = 9.65125e−07

9th surface k = 0.000
A4 = 4.58180e−04

14th surface k = 0.000
A4 = 4.52981e−04, A6 = 2.25500e−09

15th surface k = 0.000
A4 = −9.19140e−04, A6 = 1.88942e−05

Zoom data

| | Wide angle | Intermediate | Telephoto |
|---|---|---|---|
| Image height | 3.74 | 4.04 | 4.04 |
| Focal length | 5.10 | 8.91 | 19.16 |
| Fno. | 3.51 | 5.45 | 6.96 |
| Angle of field 2ω | 78.75 | 48.16 | 22.80 |
| d6 | 11.09 | 6.77 | 0.40 |
| d12 | 1.22 | 11.03 | 24.87 |
| d14 | 3.49 | 1.85 | 0.51 |
| fb(in air) | 1.71 | 1.71 | 1.71 |
| Lens total length (in air) | 39.73 | 43.51 | 49.62 |

Unit focal length

| f1 = −15.65 | f2 = 13.93 | f3 = 11.39 | f4 = 3550.96 |

EXAMPLE 2

| Unit mm | | | | |
|---|---|---|---|---|
| Surface data | | | | |
| Surface no. | r | d | nd | vd |
| Object plane | ∞ | ∞ | | |
| 1* | −7.729 | 0.97 | 1.53110 | 55.91 |
| 2* | 12.902 | 1.85 | | |
| 3 | ∞ | 7.00 | 1.88300 | 40.80 |
| 4 | ∞ | 0.30 | | |
| 5* | −134.950 | 1.50 | 1.63493 | 23.90 |
| 6* | −22.715 | Variable | | |
| 7 (Stop) | ∞ | 0.70 | | |
| 8* | 6.120 | 2.45 | 1.58313 | 59.46 |
| 9* | −14.173 | 0.10 | | |
| 10 | 17.067 | 3.22 | 1.67790 | 55.34 |
| 11 | −17.947 | 0.52 | 1.80000 | 29.84 |
| 12 | 4.546 | Variable | | |
| 13 | 13.438 | 3.35 | 1.51633 | 64.06 |
| 14* | −9.462 | Variable | | |
| 15* | −20.000 | 0.61 | 1.53110 | 55.91 |
| 16 | −20.000 | 0.35 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical surface data

1st surface k = 0.000
A4 = 2.04598e−03, A6 = −3.13038e−05, A8 = 3.26785e−07

2nd surface k = 4.133
A4 = 8.63342e−04, A6 = 1.65689e−05, A8 = −6.97112e−07

5th surface k = 0.000
A4 = −8.92289e−04, A6 = 2.82135e−05

6th surface k = 0.000
A4 = −7.62040e−04, A6 = 2.03867e−05

8th surface k = 0.000
A4 = −5.15115e−04, A6 = 6.61255e−07

9th surface k = 0.000
A4 = 4.90565e−04

14th surface k = 0.000
A4 = 4.90118e−04, A6 = −2.65331e−06

15th surface k = 0.000
A4 = −4.70846e−04, A6 = 4.96149e−06

Zoom data

| | Wide angle | Intermediate | Telephoto |
|---|---|---|---|
| Image height | 3.66 | 4.04 | 4.04 |
| Focal length | 4.93 | 9.74 | 18.55 |
| Fno. | 3.50 | 5.70 | 6.99 |
| Angle of field 2ω | 81.47 | 45.58 | 24.22 |
| d6 | 11.44 | 4.77 | 0.40 |
| d12 | 1.54 | 11.94 | 24.09 |

-continued

| Unit mm | | | |
|---|---|---|---|
| d14 | 2.94 | 1.65 | 0.41 |
| fb (in air) | 1.73 | 1.73 | 1.73 |
| Lens total length (in air) | 40.28 | 42.67 | 49.22 |

| Unit focal length | | | |
|---|---|---|---|
| f1 = −14.47 | f2 = 13.19 | f3 = 11.32 | f4 = 3550.96 |

EXAMPLE 3

Unit mm

Surface data

| Surface no. | r | d | nd | νd |
|---|---|---|---|---|
| Object plane | ∞ | ∞ | | |
| 1* | −7.723 | 0.97 | 1.53110 | 55.91 |
| 2* | 13.321 | 1.80 | | |
| 3 | ∞ | 7.00 | 1.88300 | 40.80 |
| 4 | ∞ | 0.30 | | |
| 5* | −103.204 | 1.50 | 1.63493 | 23.90 |
| 6* | −22.075 | Variable | | |
| 7 (Stop) | ∞ | 0.70 | | |
| 8* | 6.017 | 2.45 | 1.58313 | 59.46 |
| 9* | −14.331 | 0.10 | | |
| 10 | 17.521 | 3.22 | 1.67790 | 55.34 |
| 11 | −18.644 | 0.52 | 1.80000 | 29.84 |
| 12 | 4.514 | Variable | | |
| 13 | 13.564 | 3.35 | 1.51633 | 64.06 |
| 14* | −9.459 | Variable | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

Aspherical surface data

1st surface k = 0.000
A4 = 2.01100e−03, A6 = −3.17633e−05, A8 = 3.40021e−07
2nd surface k = 4.850
A4 = 8.04082e−04, A6 = 1.24917e−05, A8 = −7.81066e−07
5th surface k = 0.000
A4 = −7.28518e−04, A6 = 2.32616e−05
6th surface k = 0.000
A4 = −6.16676e−04, A6 = 1.63810e−05
8th surface k = 0.000
A4 = −5.63612e−04, A6 = −1.78863e−06
9th surface k = 0.000
14th surface k = 0.000
A4 = 8.10896e−04, A6 = −6.04860e−06

-continued

Unit mm

Zoom data

| | Wide angle | Intermediate | Telephoto |
|---|---|---|---|
| Image height | 3.65 | 4.04 | 4.04 |
| Focal length | 4.93 | 9.67 | 18.57 |
| Fno. | 3.50 | 5.80 | 7.00 |
| Angle of field 2ω | 81.34 | 45.46 | 24.23 |
| d6 | 11.25 | 5.38 | 0.40 |
| d12 | 1.37 | 12.01 | 24.28 |
| d14 | 3.72 | 2.11 | 1.25 |
| fb (in air) | 5.15 | 3.48 | 2.63 |
| Lens total length (in air) | 39.67 | 42.78 | 49.23 |

| Unit focal length | | |
|---|---|---|
| f1 = −14.48 | f2 = 13.14 | f3 = 11.36 |

EXAMPLE 4

Unit mm

Surface data

| Surface no. | r | d | nd | νd |
|---|---|---|---|---|
| Object plane | ∞ | ∞ | | |
| 1* | −9.238 | 0.97 | 1.57099 | 50.80 |
| 2* | 10.198 | 1.79 | | |
| 3 | ∞ | 7.00 | 1.88300 | 40.80 |
| 4 | ∞ | 0.30 | | |
| 5* | 27.577 | 1.65 | 1.80486 | 24.74 |
| 6* | −248.615 | Variable | | |
| 7 (Stop) | ∞ | 0.70 | | |
| 8* | 6.102 | 2.35 | 1.49710 | 81.56 |
| 9* | −19.452 | 0.11 | | |
| 10 | 11.396 | 3.49 | 1.76182 | 26.52 |
| 11 | 26.986 | 0.40 | 1.84666 | 23.78 |
| 12 | 4.483 | Variable | | |
| 13 | 12.551 | 2.84 | 1.49710 | 81.56 |
| 14* | −9.264 | Variable | | |
| 15* | −20.000 | 0.61 | 1.53110 | 55.91 |
| 16 | −20.000 | 0.35 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.20 | | |
| Image plane (Light receiving surface) | ∞ | | | |

Aspherical surface data

1st surface k = 0.000
A4 = 1.24123e−03, A6 = −1.88658e−05, A8 = 1.76166e−07
2nd surface k = −0.149
A4 = 3.28576e−04, A6 = 1.19173e−05, A8 = −4.04660e−07
5th surface k = 0.000
A4 = −1.45448e−04, A6 = 8.41788e−06, A8 = 1.74649e−07
6th surface k = 0.000
A4 = −7.60953e−05, A6 = 2.36680e−06, A8 = 4.22615e−07
8th surface k = 0.000
A4 = −4.94460e−04, A6 = −6.93478e−06

| Unit mm |
|---|

9th surface k = 0.000
A4 = 2.28491e−04

14th surface k = 0.000
A4 = 6.95504e−04, A6 = −1.77725e−06

15th surface k = 0.000
A4 = −7.44516e−04, A6 = 1.84347e−05

| Zoom data | | | |
|---|---|---|---|
| | Wide angle | Intermediate | Telephoto |
| Image height | 3.76 | 4.04 | 4.04 |
| Focal length | 5.09 | 10.70 | 24.97 |
| Fno. | 3.49 | 6.42 | 7.17 |
| Angle of field2ω | 79.33 | 39.72 | 17.72 |
| d6 | 11.29 | 6.29 | 0.32 |
| d12 | 0.90 | 15.44 | 33.67 |
| d14 | 4.03 | 1.83 | 0.08 |
| fb (in air) | 1.55 | 1.55 | 1.55 |
| Lens total length (in air) | 40.07 | 47.34 | 57.86 |

| Unit focal length | | | |
|---|---|---|---|
| f1 = −15.75 | f2 = 14.81 | f3 = 11.21 | f4 = 3550.96 |

EXAMPLE 5

| Unit mm |
|---|

| Surface data | | | | |
|---|---|---|---|---|
| Surface no. | r | d | nd | vd |
| Object plane | ∞ | ∞ | | |
| 1* | −18.216 | 1.07 | 1.73077 | 40.51 |
| 2* | 8.915 | 1.79 | | |
| 3 | ∞ | 7.00 | 1.88300 | 40.80 |
| 4 | ∞ | 0.30 | | |
| 5* | 28.919 | 1.76 | 1.92286 | 20.88 |
| 6* | −513.186 | Variable | | |
| 7 (Stop) | ∞ | 0.70 | | |
| 8* | 6.418 | 2.35 | 1.49710 | 81.56 |
| 9* | −40.841 | 0.11 | | |
| 10 | 6.321 | 3.06 | 1.55332 | 71.68 |
| 11 | 16.806 | 0.40 | 1.80000 | 29.84 |
| 12 | 3.917 | Variable | | |
| 13 | 12.842 | 2.84 | 1.49710 | 81.56 |
| 14* | −9.729 | Variable | | |
| 15* | −20.000 | 0.61 | 1.53110 | 55.91 |
| 16 | −20.000 | 0.35 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.20 | | |
| Image plane (Light receiving surface) | ∞ | | | |

| Aspherical surface data |
|---|

1st surface k = 0.000
A4 = −2.63657e−04, A6 = 1.77497e−05, A8 = −1.81542e−07

2nd surface k = −1.425
A4 = −6.38603e−04, A6 = 2.69705e−05, A8 = 1.09615e−07

5th surface k = 0.000
A4 = −4.86450e−05, A6 = 1.37828e−05, A8 = 2.19119e−07

6th surface k = 0.000
A4 = −1.25722e−05, A6 = 1.01429e−05, A8 = 4.24691e−07

8th surface k = 0.000
A4 = −1.98072e−04, A6 = −9.73181e−07

9th surface k = 0.000
A4 = 3.50148e−04

14th surface k = 0.000
A4 = 6.32017e−04, A6 = −1.49821e−06

15th surface k = 0.000
A4 = −7.22139e−04, A6 = 2.07229e−05

| Zoom data | | | |
|---|---|---|---|
| | Wide angle | Intermediate | Telephoto |
| Image height | 3.76 | 4.04 | 4.04 |
| Focal length | 5.08 | 10.70 | 24.89 |
| Fno. | 3.53 | 6.52 | 7.12 |
| Angle of field2ω | 79.43 | 40.06 | 17.95 |
| d6 | 11.29 | 6.49 | 0.17 |
| d12 | 0.88 | 15.36 | 33.63 |
| d14 | 4.11 | 1.66 | 0.18 |
| fb (in air) | 1.53 | 1.53 | 1.53 |
| Lens total length (in air) | 39.89 | 47.03 | 57.52 |

| Unit focal length | | | |
|---|---|---|---|
| f1 = −15.35 | f2 = 14.57 | f3 = 11.62 | f4 = 3550.96 |

EXAMPLE 6

| Unit mm |
|---|

| Surface data | | | | |
|---|---|---|---|---|
| Surface no. | r | d | nd | vd |
| Object plane | ∞ | ∞ | | |
| 1* | −8.064 | 0.97 | 1.53110 | 55.91 |
| 2* | 7.911 | 2.31 | | |
| 3 | ∞ | 7.00 | 1.88300 | 40.80 |
| 4 | ∞ | 0.30 | | |
| 5* | 38.761 | 1.42 | 1.63493 | 23.90 |
| 6* | −17.817 | 0.10 | | |
| 7 | 115.199 | 0.50 | 1.73800 | 32.26 |
| 8 | 19.007 | Variable | | |
| 9 (Stop) | ∞ | 0.70 | | |
| 10* | 7.442 | 3.50 | 1.49700 | 81.54 |
| 11* | −16.608 | 0.10 | | |
| 12 | 12.189 | 2.25 | 1.55880 | 62.55 |
| 13 | −38.244 | 0.50 | 1.72825 | 28.46 |
| 14 | 10.486 | Variable | | |
| 15 | −7.127 | 0.50 | 1.48749 | 70.23 |
| 16* | 117.173 | Variable | | |
| 17 | −12.335 | 0.96 | 1.53110 | 55.91 |
| 18* | −6.212 | Variable | | |

-continued

Unit mm

| | | | | |
|---|---|---|---|---|
| 19* | 22.356 | 2.69 | 1.53110 | 55.91 |
| 20* | −15.107 | 0.35 | | |
| 21 | ∞ | 0.30 | 1.51633 | 64.14 |
| 22 | ∞ | 0.50 | | |
| 23 | ∞ | 0.50 | 1.51633 | 64.14 |
| 24 | ∞ | 0.37 | | |
| Image plane (Light receiving surface) | ∞ | | | |

Aspherical surface data

1st surface k = 0.000
A4 = 1.92254e−03, A6 = −3.05452e−05, A8 = 2.95162e−07,
A10 = −1.96811e−10
2nd surface k = 0.000
A4 = 3.00358e−04, A6 = 5.85037e−05, A8 = −2.09886e−06,
A10 = 1.94417e−08
5th surface k = 0.000
A4 = −7.55038e−04, A6 = 6.27574e−06
6th surface k = 0.000
A4 = −5.69667e−04, A6 = 7.47124e−07
10th surface k = 0.000
A4 = −1.16640e−04, A6 = −5.81051e−06, A8 = 8.88556e−07,
A10 = 6.10606e−09
11th surface k = 0.000
A4 = 3.62002e−04, A6 = −1.98208e−06, A8 = 6.94737e−07,
A10 = 3.69823e−08
16th surface k = 0.000
A4 = 7.91854e−04, A6 = −1.78713e−05, A8 = 1.37930e−06
18th surface k = 0.000
A4 = 1.35150e−03, A6 = 5.19416e−05, A8 = −1.13501e−06
19th surface k = 0.000
A4 = −1.99872e−04, A6 = 8.28693e−06
20th surface k = 0.000
A4 = −2.69595e−03, A6 = 7.85161e−05, A8 = −5.57333e−07

Zoom data

| | Wide angle | Intermediate | Telephoto |
|---|---|---|---|
| Image height | 3.94 | 3.94 | 3.94 |
| Focal length | 4.89 | 10.80 | 23.40 |
| Fno. | 3.50 | 5.76 | 6.97 |
| Angle of field 2ω | 88.08 | 38.53 | 18.33 |
| d8 | 19.30 | 9.24 | 0.71 |
| d14 | 6.18 | 7.09 | 14.92 |
| d16 | 1.16 | 10.47 | 13.24 |
| d18 | 2.54 | 2.35 | 0.40 |
| fb (in air) | 1.72 | 1.72 | 1.72 |
| Lens total length (in air) | 54.73 | 54.73 | 54.73 |

-continued

Unit mm

Unit focal length

| | | | | |
|---|---|---|---|---|
| f1 = −10.14 | f2 = 11.75 | f3 = −13.76 | f4 = 22.34 | f5 = 17.41 |

EXAMPLE 7

Unit mm

Surface data

| Surface no. | r | d | nd | vd |
|---|---|---|---|---|
| Object plane | ∞ | ∞ | | |
| 1* | −7.732 | 0.97 | 1.53110 | 55.91 |
| 2* | 12.844 | 1.86 | | |
| 3 | ∞ | 7.00 | 1.88300 | 40.80 |
| 4 | ∞ | 0.30 | | |
| 5* | −177.135 | 1.50 | 1.63493 | 23.90 |
| 6* | −23.553 | Variable | | |
| 7 (Stop) | ∞ | 0.70 | | |
| 8* | 6.100 | 2.45 | 1.58313 | 59.46 |
| 9* | −13.726 | 0.10 | | |
| 10 | 18.057 | 3.22 | 1.67790 | 55.34 |
| 11 | −17.834 | 0.52 | 1.80000 | 29.84 |
| 12 | 4.573 | Variable | | |
| 13 | 13.533 | 3.35 | 1.51633 | 64.06 |
| 14* | −9.332 | Variable | | |
| 15* | −18.206 | 0.61 | 1.53110 | 55.91 |
| 16 | −18.631 | 0.35 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical surface data

1st surface k = 0.000
A4 = 2.03975e−03, A6 = −3.13927e−05, A8 = 3.28916e−07
2nd surface k = 4.165
A4 = 8.58770e−04, A6 = 1.54895e−05, A8 = −7.16243e−07
5th surface k = 0.000
A4 = −8.33560e−04, A6 = 2.40172e−05
6th surface k = 0.000
A4 = −7.15440e−04, A6 = 1.68215e−05
8th surface k = 0.000
A4 = −5.51470e−04, A6 = −6.20584e−07
9th surface k = 0.000
A4 = 4.69307e−04
14th surface k = 0.000
A4 = 5.20020e−04, A6 = −2.65063e−06

-continued

| Unit mm |
|---|

15th surface k = 0.000
A4 = −4.62715e−04, A6 = 5.83109e−06

| Zoom data | | | |
|---|---|---|---|
| | Wide angle | Intermediate | Telephoto |
| Image height | 4.04 | 4.04 | 4.04 |
| Focal length | 4.93 | 9.99 | 18.55 |
| Fno. | 3.50 | 5.79 | 6.99 |
| Angle of field2ω | 89.07 | 44.36 | 24.21 |
| d6 | 11.45 | 4.47 | 0.40 |
| d12 | 1.58 | 12.34 | 24.08 |
| d14 | 2.93 | 1.66 | 0.42 |
| fb (in air) | 1.74 | 1.74 | 1.74 |
| Lens total length (in air) | 40.32 | 42.77 | 49.22 |

| Unit focal length | | | |
|---|---|---|---|
| f1 = −14.46 | f2 = 13.19 | f3 = 11.26 | f4 = −2999.97 |

EXAMPLE 8

| Unit mm | | | |
|---|---|---|---|
| Surface data | | | |
| Surface no. | r | d | nd | vd |
| Object plane | ∞ | ∞ | | |
| 1* | −7.831 | 0.95 | 1.53110 | 55.91 |
| 2* | 12.001 | 1.92 | | |
| 3 | ∞ | 7.00 | 1.88300 | 40.80 |
| 4 | ∞ | 0.30 | | |
| 5* | −287.847 | 1.51 | 1.63493 | 23.90 |
| 6* | −23.890 | Variable | | |
| 7 (Stop) | ∞ | 0.70 | | |
| 8* | 6.094 | 2.45 | 1.58313 | 59.46 |
| 9* | −13.769 | 0.10 | | |
| 10 | 18.727 | 3.22 | 1.72000 | 46.02 |
| 11 | −11.693 | 0.52 | 1.80000 | 29.84 |
| 12 | 4.561 | Variable | | |
| 13 | 13.324 | 3.33 | 1.51633 | 64.06 |
| 14* | −10.020 | Variable | | |
| 15* | −12.560 | 0.60 | 1.53110 | 55.91 |
| 16 | −12.973 | 0.35 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

| Aspherical surface data |
|---|

1st surface k = 0.000
A4 = 2.07313e−03, A6 = −3.15508e−05, A8 = 3.16680e−07
2nd surface k = 3.578
A4 = 8.36072e−04, A6 = 2.19679e−05, A8 = −8.04809e−07
5th surface k = 0.000
A4 = −8.89903e−04, A6 = 2.56386e−05

-continued

| Unit mm |
|---|

6th surface k = 0.000
A4 = −7.55491e−04, A6 = 1.73458e−05
8th surface k = 0.000
A4 = −5.31694e−04, A6 = −5.99689e−07
9th surface k = 0.000
A4 = 4.86196e−04
14th surface k = 0.000
A4 = 4.43386e−04, A6 = −2.67304e−06
15th surface k = 0.000
A4 = −3.08363e−04, A6 = 4.65425e−06

| Zoom data | | | |
|---|---|---|---|
| | Wide angle | Intermediate | Telephoto |
| Image height | 4.04 | 4.04 | 4.04 |
| Focal length | 4.93 | 10.45 | 18.55 |
| Fno. | 3.50 | 5.95 | 6.99 |
| Angle of field2ω | 88.75 | 42.90 | 24.41 |
| d6 | 11.82 | 4.17 | 0.40 |
| d12 | 1.61 | 13.08 | 24.07 |
| d14 | 3.03 | 1.65 | 0.42 |
| fb (in air) | 1.74 | 1.74 | 1.74 |
| Lens total length (in air) | 40.83 | 43.23 | 49.22 |

| Unit focal length | | | |
|---|---|---|---|
| f1 = −14.46 | f2 = 13.29 | f3 = 11.64 | f4 = −1499.44 |

EXAMPLE 9

| Unit mm | | | |
|---|---|---|---|
| Surface data | | | |
| Surface no. | r | d | nd | vd |
| Object plane | ∞ | ∞ | | |
| 1* | −16.430 | 1.07 | 1.73077 | 40.51 |
| 2* | 9.460 | 1.79 | | |
| 3 | ∞ | 7.00 | 1.88300 | 40.80 |
| 4 | ∞ | 0.30 | | |
| 5* | 28.785 | 1.76 | 1.92286 | 20.88 |
| 6* | −515.445 | Variable | | |
| 7 (Stop) | ∞ | 0.70 | | |
| 8* | 6.370 | 2.35 | 1.49710 | 81.56 |
| 9* | −50.186 | 0.11 | | |
| 10 | 5.991 | 3.06 | 1.55332 | 71.68 |
| 11 | 23.958 | 0.39 | 1.79379 | 31.44 |
| 12 | 3.829 | Variable | | |
| 13 | 13.268 | 2.84 | 1.49710 | 81.56 |
| 14* | −9.095 | Variable | | |
| 15* | −20.000 | 0.61 | 1.53110 | 55.91 |
| 16 | −20.000 | 0.35 | | |
| 17 | ∞ | 0.30 | 1.51633 | 64.14 |
| 18 | ∞ | 0.50 | | |

-continued

Unit mm

| | | | | |
|---|---|---|---|---|
| 19 | ∞ | 0.50 | 1.51633 | 64.14 |
| 20 | ∞ | 0.37 | | |
| Image plane (Light receiving surface) | ∞ | | | |

Aspherical surface data

1st surface k = 0.000
A4 = −2.39012e−04, A6 = 1.88729e−05, A8 = −2.01759e−07
2nd surface k = −1.805
A4 = −5.95052e−04, A6 = 2.97371e−05, A8 = 7.28981e−08
5th surface k = 0.000
A4 = −6.36678e−06, A6 = 1.87173e−05, A8 = 1.39760e−07
6th surface k = 0.000
A4 = 2.45735e−05, A6 = 1.46922e−05, A8 = 3.86559e−07
8th surface k = 0.000
A4 = −1.62460e−04, A6 = −7.89415e−07
9th surface k = 0.000
A4 = 3.91294e−04
14th surface k = 0.000
A4 = 7.41995e−04, A6 = −2.35232e−06
15th surface k = 0.000
A4 = −6.86825e−04, A6 = 1.90452e−05

Zoom data

| | Wide angle | Intermediate | Telephoto |
|---|---|---|---|
| Image height | 3.76 | 4.04 | 4.04 |
| Focal length | 5.10 | 10.85 | 24.51 |
| Fno. | 3.54 | 6.60 | 7.03 |
| Angle of field2ω | 79.15 | 39.30 | 18.17 |
| fb (in air) | 1.74 | 1.74 | 1.74 |
| Lens total length (in air) | 39.97 | 47.21 | 57.44 |
| d6 | 11.34 | 6.48 | 0.35 |
| d12 | 0.98 | 15.55 | 33.25 |
| d14 | 3.92 | 1.44 | 0.40 |

Unit focal length

| | | | |
|---|---|---|---|
| f1 = −15.48 | f2 = 14.61 | f3 = 11.33 | f4 = 3550.96 |

EXAMPLE 10

Unit mm

Surface data

| Surface no. | r | d | nd | vd |
|---|---|---|---|---|
| Object plane | ∞ | ∞ | | |
| 1* | −9.089 | 0.97 | 1.57099 | 50.80 |
| 2* | 10.418 | 1.79 | | |
| 3 | ∞ | 7.00 | 1.88300 | 40.80 |
| 4 | ∞ | 0.30 | | |
| 5* | 27.738 | 1.65 | 1.80486 | 24.74 |
| 6* | −245.969 | Variable | | |
| 7 (Stop) | ∞ | 0.70 | | |
| 8* | 6.094 | 2.35 | 1.49710 | 81.56 |
| 9* | −19.599 | 0.11 | | |
| 10 | 11.310 | 3.49 | 1.76182 | 26.52 |
| 11 | 27.648 | 0.40 | 1.84666 | 23.78 |
| 12 | 4.463 | Variable | | |
| 13 | 12.547 | 2.84 | 1.49710 | 81.56 |
| 14* | −9.246 | Variable | | |
| 15* | −20.000 | 0.61 | 1.53110 | 55.91 |
| 16 | −20.000 | 0.35 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical surface data

1st surface k = 0.000
A4 = 1.24966e−03, A6 = −1.80834e−05, A8 = 1.65562e−07
2nd surface k = 0.054
A4 = 2.76695e−04, A6 = 1.23601e−05, A8 = −3.91111e−07
5th surface k = 0.000
A4 = −1.77183e−04, A6 = 5.78325e−06, A8 = 2.46140e−07
6th surface k = 0.000
A4 = −9.94457e−05, A6 = −7.16642e−09, A8 = 4.66973e−07
8th surface k = 0.000
A4 = −4.95489e−04, A6 = −7.16103e−06
9th surface k = 0.000
A4 = 2.26216e−04
14th surface k = 0.000
A4 = 6.84926e−04, A6 = −1.51451e−06
15th surface k = 0.000
A4 = −7.41285e−04, A6 = 1.80025e−05

Zoom data

| | Wide angle | Intermediate | Telephoto |
|---|---|---|---|
| Image height | 3.76 | 4.04 | 4.04 |
| Focal length | 5.10 | 10.82 | 24.44 |
| Fno. | 3.50 | 6.50 | 7.03 |
| Angle of field2ω | 79.04 | 39.25 | 18.07 |
| d6 | 11.30 | 6.32 | 0.35 |
| d12 | 0.98 | 15.64 | 33.32 |
| d14 | 3.88 | 1.55 | 0.40 |
| fb (in air) | 1.74 | 1.74 | 1.74 |
| Lens total length(in air) | 40.13 | 47.48 | 57.71 |

Unit focal length

| | | | |
|---|---|---|---|
| f1 = −15.74 | f2 = 14.79 | f3 = 11.19 | f4 = 3550.96 |

Aberration diagrams of the zoom lenses according to the first to tenth embodiments in the state in which the zoom lenses are focused on an object point at infinity are shown in FIGS. 11A to 20L.

Aberrations of the zoom lenses according to the first to tenth examples in the state in which the zoom lenses are focused on an object point at infinity are shown in FIGS. 11A to 20L. In these aberrations diagrams, "FIY" represents the largest image height.

FIGS. 11A, 11B, 11C, and 11D show spherical aberration (SA), astigmatism (AS), distortion (DT), and chromatic aberration of magnification (CC) respectively of the zoom lens according to the first example at the wide angle end.

FIGS. 11E, 11F, 11G, and 11H show spherical aberration (SA), astigmatism (AS), distortion (DT), and chromatic aberration of magnification (CC) respectively of the zoom lens according to the first example in the intermediate focal length state.

FIGS. 11I, 11J, 11K, and 11L show spherical aberration (SA), astigmatism (AS), distortion (DT), and chromatic aberration of magnification (CC) respectively of the zoom lens according to the first example at the telephoto end.

FIGS. 12A, 12B, 12C, and 12D show spherical aberration (SA), astigmatism (AS), distortion (DT), and chromatic aberration of magnification (CC) respectively of the zoom lens according to the second example at the wide angle end.

FIGS. 12E, 12F, 12G, and 12H show spherical aberration (SA), astigmatism (AS), distortion (DT), and chromatic aberration of magnification (CC) respectively of the zoom lens according to the second example in the intermediate focal length state.

FIGS. 12I, 12J, 12K, and 12L show spherical aberration (SA), astigmatism (AS), distortion (DT), and chromatic aberration of magnification (CC) respectively of the zoom lens according to the second example at the telephoto end.

FIGS. 13A, 13B, 13C, and 13D show spherical aberration (SA), astigmatism (AS), distortion (DT), and chromatic aberration of magnification (CC) respectively of the zoom lens according to the third example at the wide angle end.

FIGS. 13E, 13F, 13G, and 13H show spherical aberration (SA), astigmatism (AS), distortion (DT), and chromatic aberration of magnification (CC) respectively of the zoom lens according to the third example in the intermediate focal length state.

FIGS. 13I, 13J, 13K, and 13L show spherical aberration (SA), astigmatism (AS), distortion (DT), and chromatic aberration of magnification (CC) respectively of the zoom lens according to the third example at the telephoto end.

FIGS. 14A, 14B, 14C, and 14D show spherical aberration (SA), astigmatism (AS), distortion (DT), and chromatic aberration of magnification (CC) respectively of the zoom lens according to the fourth example at the wide angle end.

FIGS. 14E, 14F, 14G, and 14H show spherical aberration (SA), astigmatism (AS), distortion (DT), and chromatic aberration of magnification (CC) respectively of the zoom lens according to the fourth example in the intermediate focal length state.

FIGS. 14I, 14J, 14K, and 14L show spherical aberration (SA), astigmatism (AS), distortion (DT), and chromatic aberration of magnification (CC) respectively of the zoom lens according to the fourth example at the telephoto end.

FIGS. 15A, 15B, 15C, and 15D show spherical aberration (SA), astigmatism (AS), distortion (DT), and chromatic aberration of magnification (CC) respectively of the zoom lens according to the fifth example at the wide angle end.

FIGS. 15E, 15F, 15G, and 15H show spherical aberration (SA), astigmatism (AS), distortion (DT), and chromatic aberration of magnification (CC) respectively of the zoom lens according to the fifth example in the intermediate focal length state.

FIGS. 15I, 15J, 15K, and 15L show spherical aberration (SA), astigmatism (AS), distortion (DT), and chromatic aberration of magnification (CC) respectively of the zoom lens according to the fifth example at the telephoto end.

FIGS. 16A, 16B, 16C, and 16D show spherical aberration (SA), astigmatism (AS), distortion (DT), and chromatic aberration of magnification (CC) respectively of the zoom lens according to the sixth example at the wide angle end.

FIGS. 16E, 16F, 16G, and 16H show spherical aberration (SA), astigmatism (AS), distortion (DT), and chromatic aberration of magnification (CC) respectively of the zoom lens according to the sixth example in the intermediate focal length state.

FIGS. 16I, 16J, 16K, and 16L show spherical aberration (SA), astigmatism (AS), distortion (DT), and chromatic aberration of magnification (CC) respectively of the zoom lens according to the sixth example at the telephoto end.

FIGS. 17A, 17B, 17C, and 17D show spherical aberration (SA), astigmatism (AS), distortion (DT), and chromatic aberration of magnification (CC) respectively of the zoom lens according to the seventh example at the wide angle end.

FIGS. 17E, 17F, 17G, and 17H show spherical aberration (SA), astigmatism (AS), distortion (DT), and chromatic aberration of magnification (CC) respectively of the zoom lens according to the seventh example in the intermediate focal length state.

FIGS. 17I, 17J, 17K, and 17L show spherical aberration (SA), astigmatism (AS), distortion (DT), and chromatic aberration of magnification (CC) respectively of the zoom lens according to the seventh example at the telephoto end.

FIGS. 18A, 18B, 18C, and 18D show spherical aberration (SA), astigmatism (AS), distortion (DT), and chromatic aberration of magnification (CC) respectively of the zoom lens according to the eighth example at the wide angle end.

FIGS. 18E, 18F, 18G, and 18H show spherical aberration (SA), astigmatism (AS), distortion (DT), and chromatic aberration of magnification (CC) respectively of the zoom lens according to the eighth example in the intermediate focal length state.

FIGS. 18I, 18J, 18K, and 18L show spherical aberration (SA), astigmatism (AS), distortion (DT), and chromatic aberration of magnification (CC) respectively of the zoom lens according to the eighth example at the telephoto end.

FIGS. 19A, 19B, 19C, and 19D show spherical aberration (SA), astigmatism (AS), distortion (DT), and chromatic aberration of magnification (CC) respectively of the zoom lens according to the ninth example at the wide angle end.

FIGS. 19E, 19F, 19G, and 19H show spherical aberration (SA), astigmatism (AS), distortion (DT), and chromatic aberration of magnification (CC) respectively of the zoom lens according to the ninth example in the intermediate focal length state.

FIGS. 19I, 19J, 19K, and 19L show spherical aberration (SA), astigmatism (AS), distortion (DT), and chromatic aberration of magnification (CC) respectively of the zoom lens according to the ninth example at the telephoto end.

FIGS. 20A, 20B, 20C, and 20D show spherical aberration (SA), astigmatism (AS), distortion (DT), and chromatic aberration of magnification (CC) respectively of the zoom lens according to the tenth example at the wide angle end.

FIGS. 20E, 20F, 20G, and 20H show spherical aberration (SA), astigmatism (AS), distortion (DT), and chromatic aberration of magnification (CC) respectively of the zoom lens according to the tenth example in the intermediate focal length state.

FIGS. 20I, 20J, 20K, and 20L show spherical aberration (SA), astigmatism (AS), distortion (DT), and chromatic aberration of magnification (CC) respectively of the zoom lens according to the tenth example at the telephoto end.

Next, values of each expressional condition in each of embodiments are shown as below; Here, a symbol "-" (hyphen) denotes a corresponded value is not existed.

| | | Example 1 | Example 2 | Example 3 | Example 4 |
|---|---|---|---|---|---|
| (1) | $f_{1G}/f_T$ | −0.817 | −0.780 | −0.780 | −0.631 |
| (2) | $0\,\beta_{2T}/\beta_{2W}$ | 2.321 | 2.533 | 2.548 | 2.556 |
| (3) | $f_{1FN}/f_{1G}$ | 0.549 | 0.619 | 0.626 | 0.529 |
| (4) | $f_{1RP}/f_{1G}$ | −2.133 | −2.957 | −3.034 | −1.963 |
| (5) | $(r_{1FNO} + r_{1FNI})/(r_{1FNO} - r_{1FNI})$ | −0.239 | −0.251 | −0.266 | −0.049 |
| (6) | $D_{1FNon}/D_{1FNoff}$ | 0.203 | 0.184 | 0.202 | 0.247 |
| (7) | $D_{1RP}/D_{1G}$ | 0.130 | 0.129 | 0.130 | 0.141 |
| (8) | $N_{1FN} - N_{1RP}$ | −0.104 | −0.104 | −0.104 | −0.234 |
| (9) | $\nu_{1FN} - \nu_{1RP}$ | 32.008 | 32.008 | 32.008 | 26.060 |
| (10) | $(r_{1RPI} + r_{1RNO})/(r_{1RPI} - r_{1RNO})$ | — | — | — | — |
| (11) | $f_{1RN}/f_{1G}$ | — | — | — | — |
| (12) | $N_{1FN} - N_{1RP}$ | −0.104 | −0.104 | −0.104 | — |
| (13) | $\nu_{1FN} - \nu_{1RP}$ | 32.008 | 32.008 | 32.008 | — |
| (14) | $\alpha_{FN}$ | 5.840E−05 | 5.840E−05 | 5.840E−05 | — |
| (15) | $\alpha_{RP}$ | 6.500E−05 | 6.500E−05 | 6.500E−05 | — |
| (16) | $|\alpha_{FN} - \alpha_{RP}|$ | 6.600E−06 | 6.600E−06 | 6.600E−06 | — |
| (17) | $\Delta ASP_{FNO}/f_{FN}$ | −0.00085 | −0.00069 | −0.00067 | — |
| (18) | $\Delta ASP_{FNI}/f_{FN}$ | −0.00047 | −0.00047 | −0.00045 | — |
| (19) | $\beta_{2T}/\beta_{2W}$ | 2.32 | 2.53 | — | — |
| (20) | $\beta_{3T}/\beta_{3W}$ | 1.63 | 1.49 | — | — |
| (21) | $f_W/f_{4G}$ | 0.00143 | 0.00139 | — | — |
| (22) | $f_{2G}/f_T$ | 0.72 | 0.71 | — | — |
| (23) | $f_{3G}/f_T$ | 0.59 | 0.61 | — | — |
| (24) | $D_4/|f_{4G}|$ | 0.00017 | 0.00017 | — | — |
| (25) | $(r_{3O} + r_{3I})/(r_{3O} - r_{3I})$ | 0.19 | 0.17 | — | — |

| | | Example 5 | Example 6 | Example 7 | Example 8 |
|---|---|---|---|---|---|
| (1) | $f_{1G}/f_T$ | −0.617 | −0.433 | −0.779 | −0.779 |
| (2) | $\beta_{2T}/\beta_{2W}$ | 2.639 | 3.125 | 2.533 | 2.543 |
| (3) | $f_{1FN}/f_{1G}$ | 0.525 | 0.726 | 0.618 | 0.607 |
| (4) | $f_{1RP}/f_{1G}$ | −1.936 | −1.914 | −2.948 | −2.832 |
| (5) | $(r_{1FNO} + r_{1FNI})/(r_{1FNO} - r_{1FNI})$ | 0.343 | 0.010 | −0.248 | −0.210 |
| (6) | $D_{1FNon}/D_{1FNoff}$ | 0.308 | 0.168 | 0.187 | 0.178 |
| (7) | $D_{1RP}/D_{1G}$ | 0.148 | 0.113 | 0.129 | 0.129 |
| (8) | $N_{1FN} - N_{1RP}$ | −0.192 | −0.104 | −0.104 | −0.104 |
| (9) | $\nu_{1FN} - \nu_{1RP}$ | 19.630 | 32.008 | 32.008 | 32.008 |
| (10) | $(r_{1RPI} + r_{1RNO})/(r_{1RPI} - r_{1RNO})$ | — | −0.732 | — | — |
| (11) | $f_{1RN}/f_{1G}$ | — | 3.048 | — | — |
| (12) | $N_{1FN} - N_{1RP}$ | — | −0.104 | −0.10383 | −0.10383 |
| (13) | $\nu_{1FN} - \nu_{1RP}$ | — | 32.008 | 32.008 | 32.008 |
| (14) | $\alpha_{FN}$ | — | 5.840E−05 | 5.840E−05 | 5.840E−05 |
| (15) | $\alpha_{RP}$ | — | 6.500E−05 | 6.500E−05 | 6.500E−05 |
| (16) | $|\alpha_{FN} - \alpha_R P|$ | — | 6.600E−06 | 6.600E−06 | 6.600E−06 |
| (17) | $\Delta ASP_{FNO}/f_{FN}$ | — | −0.00198 | −0.00069 | −0.00071 |
| (18) | $\Delta ASP_{FNI}/f_{FN}$ | — | −0.00060 | −0.00048 | −0.00048 |
| (19) | $\beta_{2T}/\beta_{2W}$ | — | — | 2.53 | 2.54 |
| (20) | $\beta_{3T}/\beta_{3W}$ | — | — | 1.49 | 1.48 |
| (21) | $f_W/f_{4G}$ | — | — | −0.00164 | −0.00329 |
| (22) | $f_{2G}/f_T$ | — | — | 0.71 | 0.72 |
| (23) | $f_{3G}/f_T$ | — | — | 0.61 | 0.63 |
| (24) | $D_4/|f_{4G}|$ | — | — | 0.00020 | 0.00040 |
| (25) | $(r_{3O} + r_{3I})/(r_{3O} - r_{3I})$ | — | — | 0.18 | 0.14 |

| Conditional expression | | Example 9 | Example 10 |
|---|---|---|---|
| (3) | $f_{1FN}/f_{1G}$ | 0.52 | 0.53 |
| (4) | $f_{1RP}/f_{1G}$ | −1.91 | −1.97 |
| (5) | $(r_{1FNO} + r_{1FNI})/(r_{1FNO} - r_{1FNI})$ | 0.27 | −0.07 |
| (6) | $D_{1FNon}/D_{1FNoff}$ | 0.27 | 0.28 |
| (7) | $D_{1RP}/D_{1G}$ | 0.15 | 0.14 |
| (8) | $N_{1FN} - N_{1RP}$ | −0.19 | −0.23 |
| (9) | $\nu_{1FN} - \nu_{1RP}$ | 19.63 | 26.06 |
| (19) | $\beta_{2T}/\beta_{2W}$ | 2.61 | 2.56 |
| (20) | $\beta_{3T}/\beta_{3W}$ | 1.84 | 1.87 |
| (21) | $f_W/f_{4G}$ | 0.00144 | 0.00144 |
| (22) | $f_{2G}/f_T$ | 0.60 | 0.61 |
| (23) | $f_{3G}/f_T$ | 0.44 | 0.47 |
| (24) | $D_4/|f_{4G}|$ | 0.00017 | 0.00017 |
| (25) | $(r_{3O} + r_{3I})/(r_{3O} - r_{3I})$ | 0.19 | 0.15 |

(Digital Camera)

The present invention can be applied to an electronic image pickup apparatus, in particular to a digital camera or a video camera. In such an apparatus, an image of an object formed by the zoom lens according to the present invention described above is picked up by an electronic image pickup element such as a CCD. In the following, an embodiment of the electronic image pickup apparatus will be described.

Figure 21:
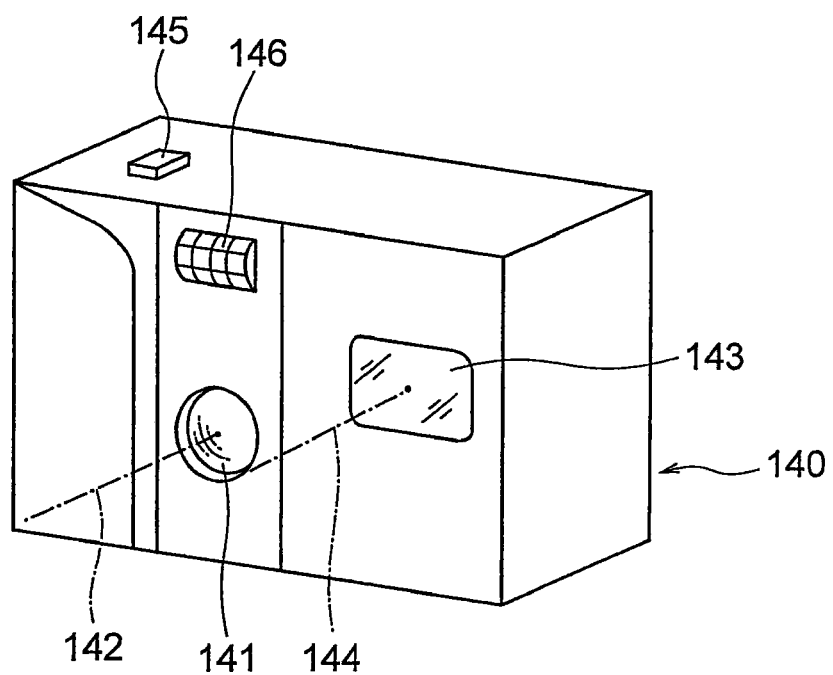
FIG. 21 is a front perspective view showing the outer appearance of a digital camera equipped with a zoom lens according to the present invention.
Figure 22:
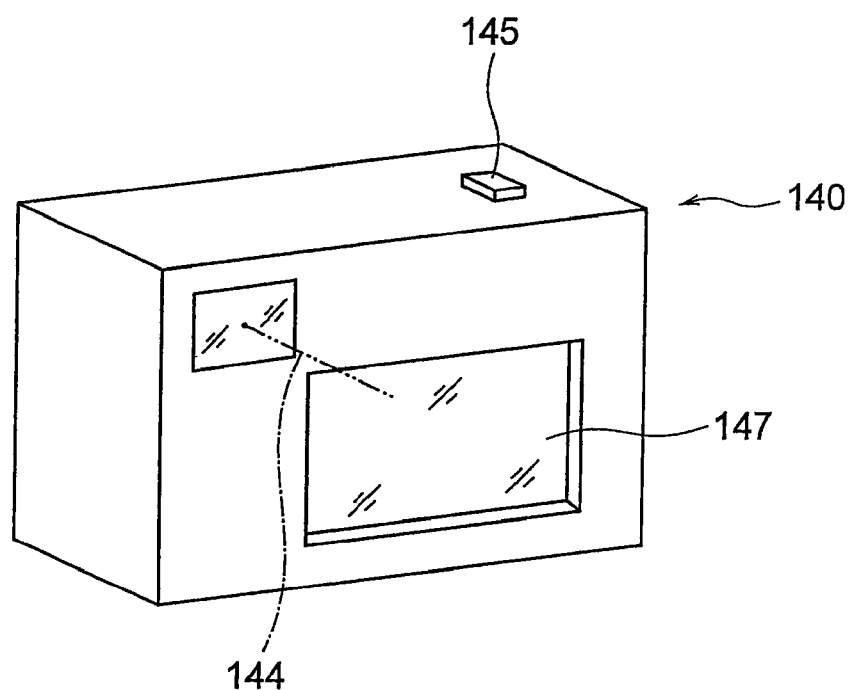
FIG. 22 is a rear perspective view of the digital camera.
Figure 23:
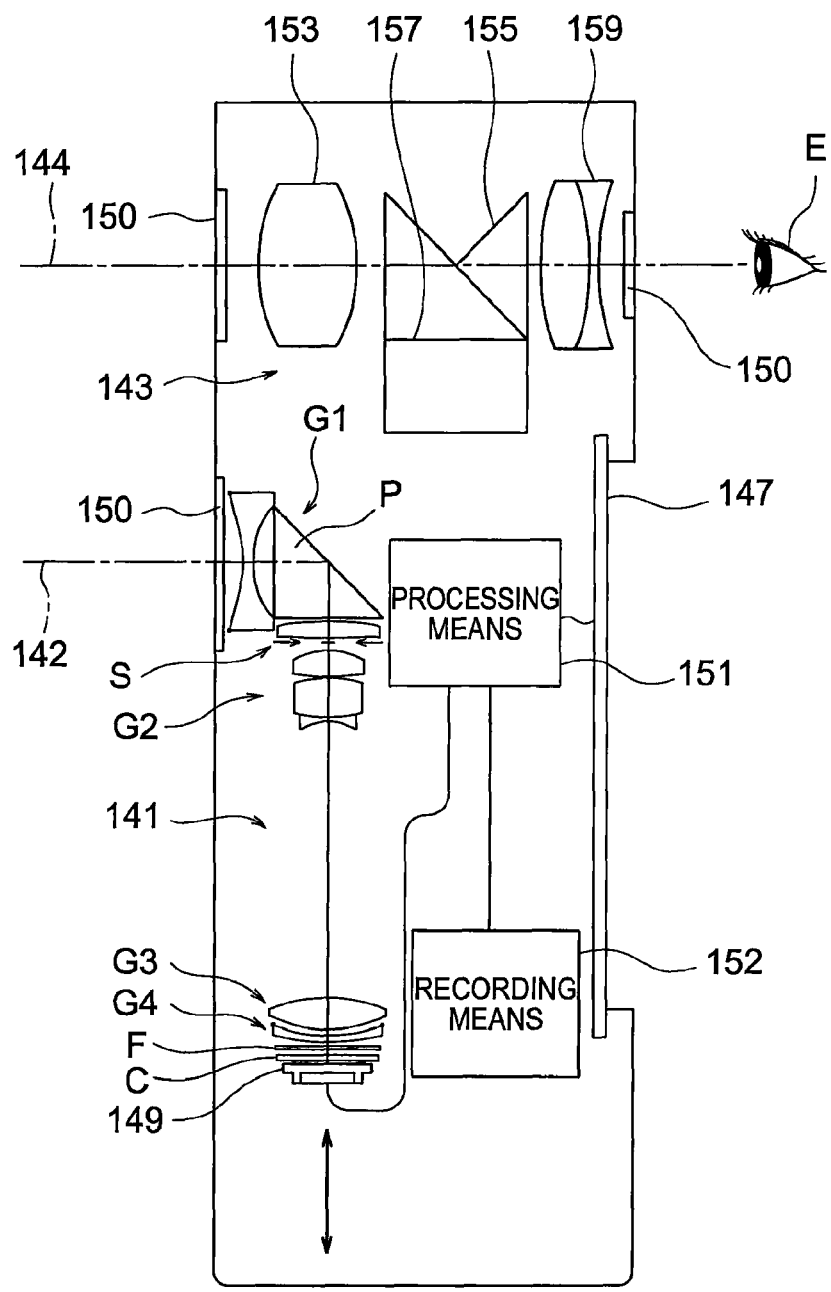
FIG. 23 is a cross sectional view of the digital camera.

FIGS. 21 to 23 schematically illustrate a digital camera equipped with a zoom lens according to the present invention as a taking optical system 141. FIG. 21 is a front perspective view showing the outer appearance of the digital camera 140. FIG. 22 is a rear perspective view of the digital camera 140. FIG. 23 is a cross sectional view of the digital camera 140. The illustrated digital camera 140 has the taking optical system 141 having a taking optical path 142, a viewfinder optical system 143 having a viewfinder optical path 144, a shutter release button 145, a flash 146, and a liquid crystal display monitor 147. In response to depression of the shutter release button 145 provided on the top of the camera 140, shooting through the taking optical system 141, e.g. the zoom lens having a bent optical path according to the first example, is effected. Specifically, an image of an object is formed by the taking optical system 141 on the image pickup surface of the CCD 149 through a near-infrared cut filter and an optical low pass filter F. The image of the object picked up by the CCD 149 is processed by a processing unit 151 and displayed as an electronic image on the liquid crystal display monitor 147 provided on the back of the camera. The processing unit 151 is connected with a storage unit 152, in which picked-up electronic images can be stored. The storage unit 152 may be provided separately from the processing unit 151. The storage unit 152 may be an electrically writable medium such as a flexible disk, memory card, or MO. The camera may be a film camera that uses a film in place of the CCD 149.

A viewfinder objective optical system 153 is provided in the viewfinder optical path 144. An image of an object formed by the viewfinder objective optical system 153 is formed in the viewfinder frame 157 of a Porro prism 155, which serves as an image erecting member. An eyepiece optical system 159 for delivering the erected image to the observer's eye E is provided in rear of the Porro prism 155. In addition, cover members 150 are provided at the entrance of the taking optical system 141, at the entrance of the viewfinder objective optical system 153, and at the exit of the eyepiece optical system 159 respectively.

The taking optical system 141 of the digital camera 140 having the above-described configuration is a zoom lens having a high zoom ratio of approximately 5 (five) and having high optical performance. Therefore, an inexpensive, high-performance digital camera that is very slim in depth can be realized.

The digital camera illustrated in FIG. 23 has plane parallel plates serving as the cover members 150, they may be eliminated.

(Internal Circuit Configuration)

Figure 24:
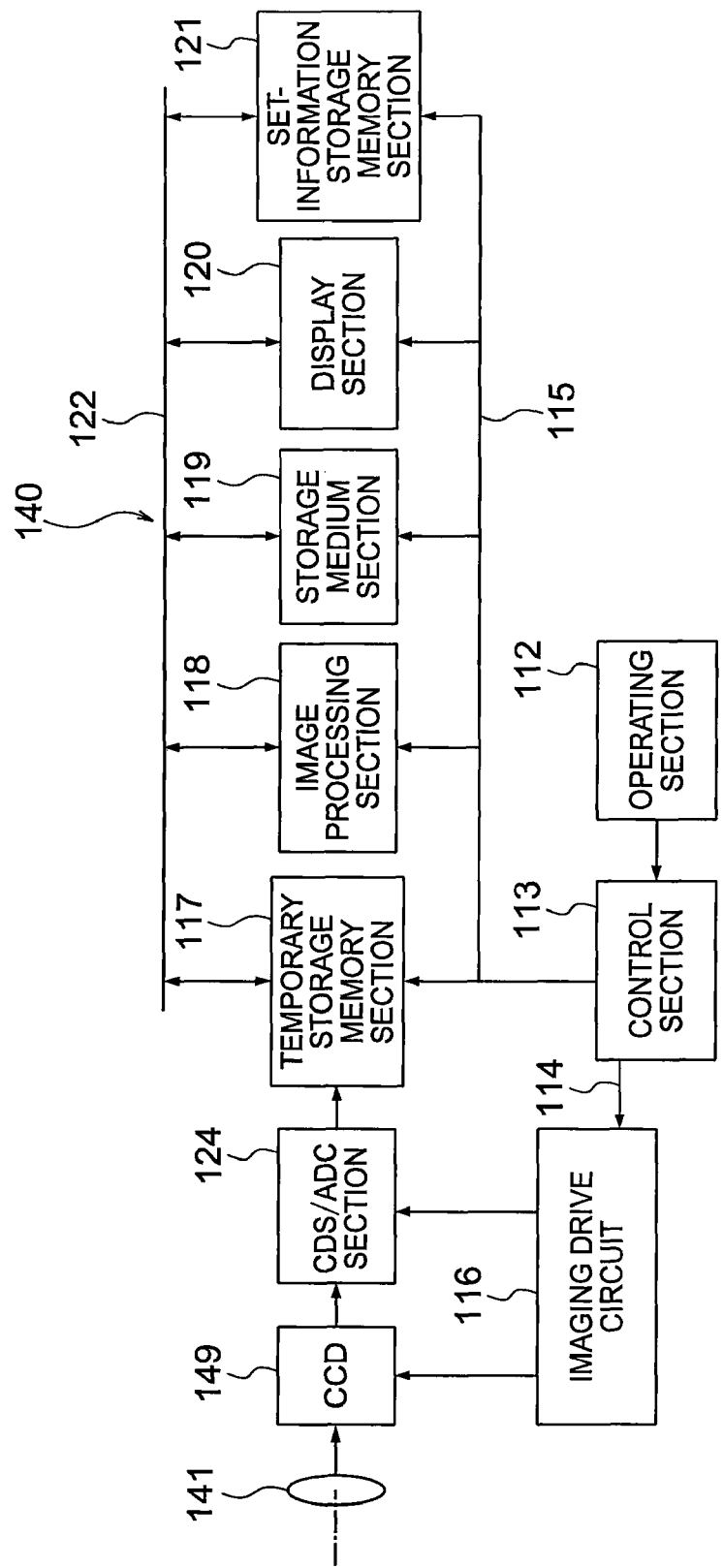
FIG. 24 is a block diagram showing the basic internal circuit configuration of the digital camera.

FIG. 24 is a block diagram of a relevant internal circuit of the digital camera 140. In the case described here, the processing unit described above includes for instance, a CDS/ADC section 124, a temporary storage memory 117, and an image processing section 118, and the storage unit includes a storage medium 119 for example.

As shown in FIG. 20, the digital camera 140 has an operating section 112 and a control section 113 connected to the operating section 112. The digital camera 140 also has an image pickup drive circuit 116, the temporary storage memory 117, the image processing section 118, the storage medium 119, a display section 120, and a set-information storage memory section 121, which are connected to control signal output ports of the control section 113 via buses 114 and 115.

The temporary storage memory 117, the image processing section 118, the storage medium section 119, the display section 120, and the set-information storage memory section 121 are configured to be capable of mutually inputting and outputting data via a bus 122. Moreover, the CCD 149 and the CDS/ADC section 124 are connected to the image pickup drive circuit 116.

The operating section 112 is a circuit equipped with various entry buttons and switches. The operating section 112 informs the control section of event information entered from outside (by a user of the camera) through the entry buttons and switches.

The control section 113 is, for example, a central processing unit (CPU) and has a built-in program memory, which is not shown in the drawings. The control section 113 is a circuit that controls the entire digital camera 140 according to a program stored in the program memory in response to instructions and commands entered by the user of the camera through the operating section 112.

The CCD 149 receives an image of the object formed by the taking optical system 141 according to the present invention. The CCD 149 is an image pickup element that is driven and controlled by the image pickup drive circuit 116 to convert the quantity of light of the object image into an electrical signal on a pixel-by-pixel basis and output it to the CDS/ADC section 124.

The CDS/ADC section 124 is a circuit that amplifies the electrical signal input from the CCD 149, carries out analog-to-digital conversion, and outputs to the temporary storage memory 117 raw image data (or Bayer data, which will be hereinafter referred to as "RAW data") that has undergone only amplification and digital conversion.

The temporary storage memory 117 serves as a buffer and may consist of an SDRAM for example. The temporary storage memory 117 is a memory device that temporarily stores the RAW data output from the CDS/ADC section 124. The image processing section 118 is a circuit that reads the RAW data stored in the temporary storage memory 117 or the RAW data stored in the storage medium section 119 and performs various electrical image processing including distortion correction based on image-quality parameters specified by the control section 113.

The storage medium section 119 allows a detachable mounting of a recording medium such as a card-type or stick-type flash memory. The storage medium section 119 is a control circuit of the apparatus that records or writes the RAW data transferred from the temporary storage memory 117 and image data having been processed in the image processing section 118 in the card-type or stick-type flash memory to have the data stored in it.

The display section 120 is equipped with the liquid-crystal display monitor and causes it to display images and operation menu etc. The set-information storage memory section 121 includes a ROM section in which various image-quality parameters are stored in advance and a RAM section for storing image quality parameters selected by an entry (ies) made through the operating section 112 from among the image quality parameters read from the ROM section. The set-information storage memory section 121 is a circuit that controls the input/output to/from the memories.

As described above, the zoom lens according to the present invention is advantageous for attaining high optical performance and achieving cost reduction and particularly suitable for use as an optical system of an image pickup apparatus equipped with an electronic image pickup element such as a CCD or CMOS.

What is claimed is:

1. A zoom lens comprising, in order from the object side to the image side:
    a first lens unit having a negative refractive power;
    a second lens unit having a positive refractive power;
    a third lens unit having a positive refractive power; and
    a fourth lens unit comprising a lens component, wherein
    the distance between the first lens unit and the second lens unit is smaller at the telephoto end than at the wide angle end,
    the distance between the second lens unit and the third lens unit is larger at the telephoto end than at the wide angle end,
    the distance between the third lens unit and the fourth lens unit is smaller at the telephoto end than at the wide angle end,
    the first lens unit comprises an optical path bending member,
    the third lens unit comprises a lens component having a positive refractive power,
    the total number of lens components in the third lens unit is one,
    the zoom lens is a four-unit zoom lens, and
    the zoom lens satisfies the following conditional expressions (19), (20), and (21):

$$1.3 < \beta_{2T}/\beta_{2w} < 3.8 \quad (19),$$

$$1.1 < |\beta_{3T}/\beta_{3w}| < 4.0 \quad (20),$$

and $$-0.23 < f_w/f_{4G} < 0.23 \quad (21),$$

where $\beta_{2T}$ is the lateral magnification of the second lens unit at the telephoto end, $\beta_{2w}$ is the lateral magnification of the second lens unit at the wide angle end, $\beta_{3T}$ is the lateral magnification of the third lens unit at the telephoto end, $\beta_{3w}$ is the lateral magnification of the third lens unit at the wide angle end, $f_{4G}$ is the focal length of the fourth lens unit, $f_w$ is the focal length of the entire four-unit zoom lens at the wide angle end, and the lens component refers to a lens member whose effective surfaces that are in contact with air include only two surfaces, one being an object side surface and the other being an image side surface.

2. The zoom lens according to claim 1,
    wherein the second lens unit and the third lens unit satisfy at least one of the following conditional expressions (22) and (23):

$$0.2 < f_{2G}/f_T < 0.85 \quad (22),$$

and $$0.1 < f_{3G}/f_T < 1.5 \quad (23),$$

where $f_{2G}$ is the focal length of the second lens unit, $f_{3G}$ is the focal length of the third lens unit, and $f_T$ is the focal length of the entire four-unit zoom lens system at the telephoto end.

3. The zoom lens according to claim 1,
    wherein the total number of lens components in the fourth lens unit is one.

4. The zoom lens according to claim 1,
    wherein the object side surface of the fourth lens unit is a concave surface, and
    the image side surface of the fourth lens unit is a convex surface.

5. The zoom lens according to claim 1,
    wherein the fourth lens unit satisfies the following conditional expression (24):

$$0.000001 < D_4/|f_{4G}| < 0.07 \quad (24),$$

where $D_4$ is the thickness of the fourth lens unit on the optical axis.

6. The zoom lens according to claim 1,
    wherein the fourth lens unit has an aspheric surface.

7. The zoom lens according to claim 1,
    wherein all the lens components in the fourth lens unit are single lenses.

8. The zoom lens according to claim 1,
    wherein the fourth lens unit is fixed on the optical axis relative to an image pickup surface during zooming from the wide angle end to the telephoto end.

9. The zoom lens according to claim 1,
    wherein the lens component in the third lens unit is a single lens.

10. The zoom lens according to claim 1,
    wherein the total number of positive lenses in the second lens unit is two or less, and
    the total number of negative lenses in the second lens unit is one or zero.

11. The zoom lens according to claim 1, wherein
    the first lens unit consists, in order from the object side, of a front sub lens unit having a negative refractive power, an optical path bending member, and a rear sub lens unit having a positive refractive power,
    the front sub lens unit comprises a biconcave single lens,
    the rear sub lens unit comprises a positive single lens,
    the total number of lenses in the front sub lens unit is one,
    the total number of lenses in the rear sub lens unit is two or less, and
    the total number of positive lenses in the rear sub lens unit is one.

12. An image pickup apparatus comprising:
    a zoom lens according to claim 1;
    an image pickup element disposed on the image side of the zoom lens; and
    an image processing section that processes a signal output from the image pickup element.

13. The zoom lens according to claim 1,
    wherein the lens component in the third lens unit has a biconvex shape.

14. The zoom lens according to claim 13,
    wherein the lens component in the third lens unit satisfies the following conditional expression (25):

$$0.01 < (r_{3O} + r_{3I})/(r_{3O} - r_{3I}) < 0.4 \quad (25),$$

where $r_{3O}$ is the paraxial radius of curvature of the object side surface of the lens component in the third lens unit, and $r_{3I}$ is the paraxial radius of curvature of the image side surface of the lens component in the third lens unit.

* * * * *